United States Patent [19]

Kawasaki et al.

[11] Patent Number: 5,748,977
[45] Date of Patent: May 5, 1998

[54] MULTIPLY CONNECTABLE MICROPROCESSOR AND MICROPROCESSOR SYSTEM

[75] Inventors: Shumpei Kawasaki, Kodaira; Kaoru Fukada, Koganei; Mitsuru Watabe, Uridura; Kouki Noguchi, Kokubunji; Kiyoshi Matsubara, Higashimurayama; Isamu Mochizuki, Tachikawa; Kazufumi Suzukawa, Ichikawa; Shigeki Masumura, Kodaira; Yasushi Akao, Kokubunji; Eiji Sakakibara, Kodaira, all of Japan

[73] Assignees: Hitachi, Ltd.; Hitachi Microcomputer System Ltd.; Hitachi ULSI Engineering Corp., all of Tokyo, Japan

[21] Appl. No.: 628,241

[22] Filed: Apr. 4, 1996

Related U.S. Application Data

[63] Continuation of Ser. No. 517,151, Aug. 21, 1995, Pat. No. 5,530,965.

[30] Foreign Application Priority Data

Nov. 6, 1992 [JP] Japan .................. 4-322598

[51] Int. Cl.$^6$ .................. G06F 12/00; G06F 13/00
[52] U.S. Cl. .................. 395/800; 395/402; 395/403; 395/404; 395/405; 395/411; 395/421.01; 395/421.02; 395/307; 395/823
[58] Field of Search .................. 395/402, 403, 395/404, 405, 421.01, 800, 411, 421.02, 307, 823

[56] References Cited

U.S. PATENT DOCUMENTS

| | | | |
|---|---|---|---|
| 4,332,008 | 5/1982 | Shima et al. | 395/800 |
| 4,757,504 | 7/1988 | Stambaugh et al. | 371/49 |
| 4,967,352 | 10/1990 | Keida et al. | 395/550 |
| 5,048,012 | 9/1991 | Gulick et al. | 370/77 |
| 5,086,407 | 2/1992 | McGarity et al. | 395/800 |
| 5,151,986 | 9/1992 | Langan et al. | 395/550 |
| 5,262,998 | 11/1993 | Mnich | 365/222 |
| 5,287,481 | 2/1994 | Lin | 395/462 |
| 5,293,562 | 3/1994 | Pope | 365/189.02 |
| 5,331,475 | 7/1994 | Matsunaga | 360/14.2 |
| 5,341,481 | 8/1994 | Tsukamoto | 395/287 |
| 5,359,717 | 10/1994 | Bowles et al. | 395/309 |
| 5,420,995 | 5/1995 | Taguri | 395/421.01 |

FOREIGN PATENT DOCUMENTS

WO 91/02311  2/1991  WIPO.

*Primary Examiner*—Tod R. Swann
*Assistant Examiner*—Denise Tran
*Attorney, Agent, or Firm*—Fay Sharpe Beall Fagan Minnich & McKee

[57] ABSTRACT

A microcomputer that is easy to use and connected direct to such memories as dynamic and static RAM's and to other peripheral circuits. The microcomputer has strobe signal output terminals CASH*, CASL* and RAS* for direct connection to a dynamic RAM, and chip select signal output terminals CS0* through CS6* for outputting a chip select signal in parallel with the output from the strobe signal output terminals. The microcomputer further includes address output terminals for outputting a non-multiplexed or multiplexed address signal as needed, and data I/O terminals for selectively outputting the address signal to comply with a multiple-bus interface scheme.

1 Claim, 70 Drawing Sheets

FIG. 22

(I/O REQUEST COMMANDS DIRECTED TO BUS STATE CONTROLLER)

| I/O COMMAND | | | | DESCRIPTION OF I/O REQUEST COMMAND |
|---|---|---|---|---|
| BCMD3 | BCMD2 | BCMD1 | BCMD0 | |
| 0 | 0 | 0 | 1 | WRITE DATA 8 bits (B) |
| 0 | 0 | 1 | 0 | WRITE DATA 16 bitS (W) |
| 0 | 0 | 1 | 1 | WRITE DATA 32 bits (L) |
| 0 | 1 | 0 | 0 | CONTINUOUS 1F |
| 0 | 1 | 0 | 1 | READ DATA 8 bits (B) |
| 0 | 1 | 1 | 0 | READ DATA 16 bits (W) |
| 0 | 1 | 1 | 1 | READ DATA 32 bits (L) |
| 1 | 0 | 0 | 1 | FOR REFRESH CONTROLLER |
| 1 | 0 | 1 | 1 | MULTIPLY & WRITE DATA 32 bits (L) |
| 1 | 1 | 0 | 0 | FORCED 1F (FETCH JUMP DESTINATION INSTRUCTION) |
| 1 | 1 | 0 | 1 | MODIFY & READ DATA 8 bits (B) |
| 1 | 1 | 1 | 0 | MULTIPLY & READ DATA 16 bits (W) |
| 1 | 1 | 1 | 1 | MULTIPLY & READ DATA 32 bits (L) |

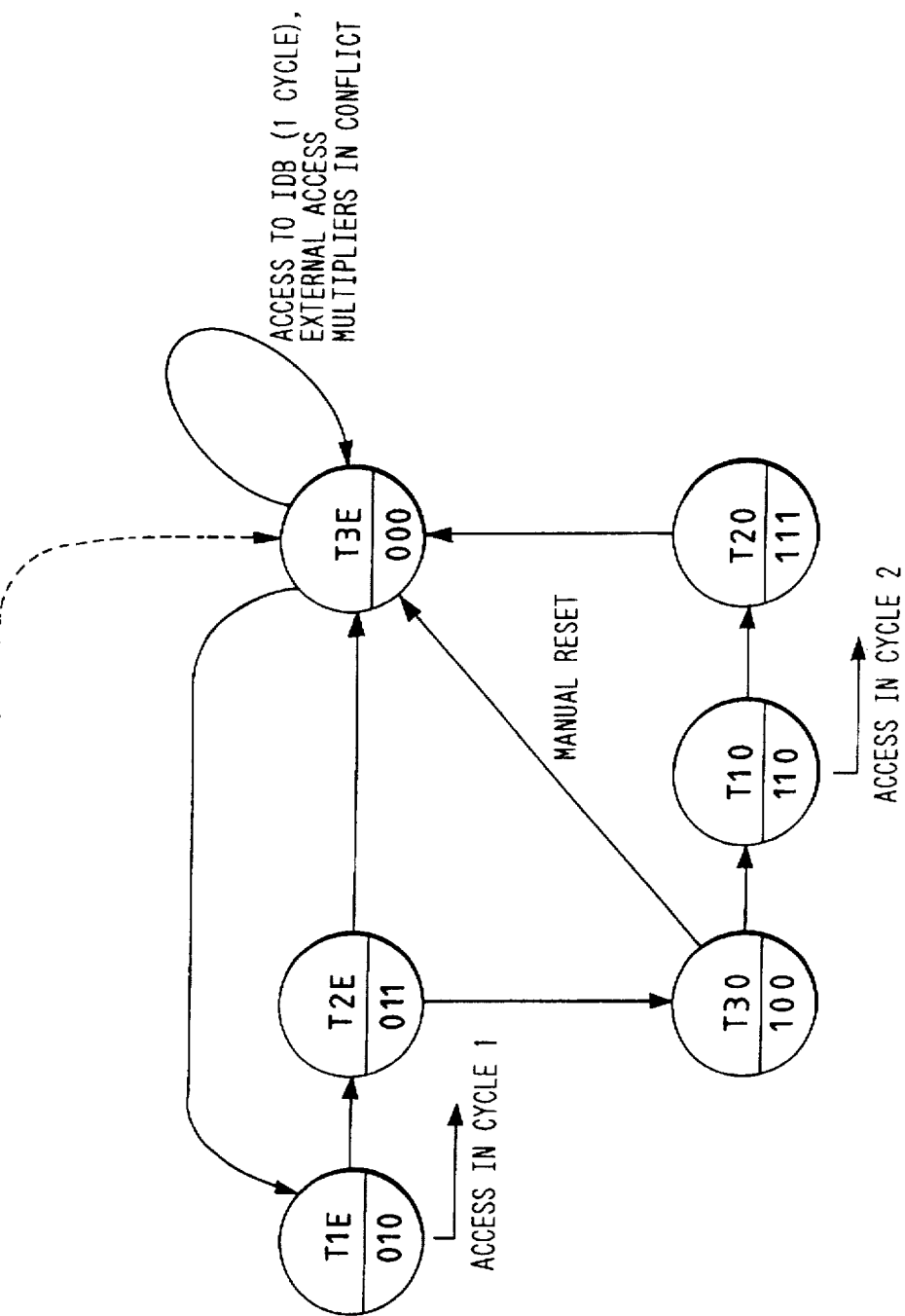

| | | | | | COMMENT | | | | | | | | | | | | |
|---|---|---|---|---|---|---|---|---|---|---|---|---|---|---|---|---|---|
| | | | | BUSRDY | | | | | | >T3E | | >T3E | >T3E | >T3E | >T3E | >T3E | >T3E |
| OUTPUT | NEXT AC-CESS STATE | | C2BiA1 | BiBRDY | — | * | * | * | * | — | — | — | * | * | * | — | * |
| | | | C2BiA2 | BiNBC0 | — | * | * | * | * | — | — | — | * | * | * | — | * |
| | | | C2BiA3 | BiNBC1 | — | * | * | * | * | — | — | — | * | * | * | — | * |
| | | | C2BiA4 | BiNBC2 | — | * | * | * | * | — | — | — | * | * | * | — | * |
| INPUT | MULTI-PLIER | φ1 | | BMW0 | * | | | | | | | | | | | | * |
| | | φ1 | | BMW1 | * | | | | | | | | | | | | * |
| | BiPD | I/O COMMAND | φ1 | | BiBCD0 | * | O | — | O | * | * | — | O | * | O | — | O | — | * |
| | | | φ1 | | BiBCD1 | * | O | O | — | — | O | — | * | — | O | — | * |
| | | | φ1 | | BiBCD2 | * | O | * | O | O | — | — | O | O | — | — | * |
| | | | φ1 | | BiBCD3 | * | * | * | * | — | O | — | * | O | * | * | * |
| | | SPACE | φ1 | | BiMSP0 | * | * | * | | O | | | — | | | | * |
| | | | φ1 | | BiMSP1 | * | O | — | | | — | | | — | | | | * |
| | PERIPH-ERAL | φ2 | C1BiA1 | RSTPM | — | * | | | | | | | | | | | * |
| | | φ2 | C1BiA2 | RST | — | O | | | | | | | | | | | * |
| | ACCESS STATE | φ1 | | BiBSC0 | — | | | | | | | | | | | | — |
| | | φ1 | | BiBSC1 | — | | | | | | | | | | | | O |
| | | φ1 | | BiBSC2 | — | | | | | | | | | | | | * |

(WAVEFORMS IN EFFECT IN DRAM BUS CYCLE AND IN FULL ACCESS NO-WAIT STATE (SHORT PITCH))

(WAVEFORMS IN EFFECT IN DRAM BUS CYCLE AND IN FULL ACCESS ONE-WAIT STATE)

(WAVEFORMS IN EFFECT IN DRAM BUS CYCLE AND IN FULL ACCESS NO-WAIT STATE (2 × Tp))

(WAVEFORMS IN EFFECT IN BASIC BUS CYCLE AND IN TWO-STATE PLUS WAIT ACCESS)

(WAVEFORMS IN EFFECT IN BASIC BUS CYCLE
AND IN THREE-STATE AND WAIT ACCESS)

(OPERATION TIMING WAVEFORMS OF DUTY RATIO CORRECTING CIRCUIT)

FIG. 58

ADDRESSING MODES AND CALCULATIONS OF EFFECTIVE ADDRESSES

| NOTATION/NAME OF ADDRESSING MODE | DESCRIPTION |
|---|---|
| Rn<br>REGISTER DIRECT | THE OPERAND IS SIGN-EXTENDED LONG-WORD DATA |
| @Rn<br>REGISTER INDIRECT | THE EFFECTIVE ADDRESS IS THE CONTENT OF THE REGISTER Rn<br><br>Rn ⟶ OPERAND |
| @Rn+<br>REGISTER INDIRECT WITH POST-INCREMENT | THE EFFECTIVE ADDRESS IS THE CONTENT OF THE REGISTER Rn<br>A CONSTANT IS ADDED TO Rn AFTER INSTRUCTION EXECUTION<br>THE VALUE TO BE ADDED IS 1 FOR A BYTE, 2 FOR A WORD AND 4 FOR A LONG WORD<br><br>Rn ⟶ OPERAND |
| @-Rn<br>REGISTER INDIRECT WITH PRE-DECREMENT | THE EFFECTIVE ADDRESS IS THE CONTENT OF THE REGISTER Rn FROM WHICH A CONSTANT WAS SUBTRACTED BEFOREHAND.<br>THE VALUE TO BE SUBTRACTED IS 1 FOR A BYTE, 2 FOR A WORD AND 4 FOR A LONG WORD<br>$Rn-(1\ or\ 2\ or\ 4)$<br>↓<br>RESULT OF CALCULATION ⟶ OPERAND |
| @(disp:4, Rn)<br>REGISTER INDIRECT WITH DISPLACEMENT | THE EFFECTIVE ADDRESS IS THE CONTENT OF THE REGISTER Rn TO WHICH A FOUR-BIT DISPLACEMENT "disp" IS ADDED.<br>AFTER ZERO EXTENSION, THE DISPLACEMENT "disp" IS MULTIPLIED DEPENDING ON OPERAND SIZE: BY 1 FOR A BYTE, BY 2 FOR A WORD AND BY 4 FOR A LONG WORD<br>$Rn+disp \times (1\ or\ 2\ or\ 4)$<br>↓<br>RESULT OF CALCULATION ⟶ OPERAND |

FIG. 59

| NOTATION/NAME OF ADDRESSING MODE | DESCRIPTION |
|---|---|
| @(R0, Rn) REGISTER INDIRECT WITH INDEX | THE EFFECTIVE ADDRESS IS THE CONTENT OF THE REGISTER Rn TO WHICH R0 IS ADDED<br>Rn + R0<br>↓<br>RESULT OF CALCULATION → OPERAND |
| @(disp:8, GBR) GBR INDIRECT WITH DISPLACEMENT | THE EFFECTIVE ADDRESS IS THE CONTENT OF THE REGISTER GBR TO WHICH AN EIGHT-BIT DISPLACEMENT "disp" IS ADDED. AFTER ZERO EXTENSION, THE DISPLACEMENT "disp" IS MULTIPLIED DEPENDING ON OPERAND SIZE: BY 1 FOR A BYTE, BY 2 FOR A WORD AND BY 4 FOR A LONG WORD<br>GBR + disp×(1 or 2 or 4)<br>↓<br>RESULT OF CALCULATION → OPERAND |
| @(R0, GBR) GBR INDIRECT WITH INDEX | THE EFFECTIVE ADDRESS IS THE CONTENT OF THE REGISTER GBR TO WHICH R0 IS ADDED<br>GBR + R0<br>↓<br>RESULT OF CALCULATION → OPERAND |

FIG. 60

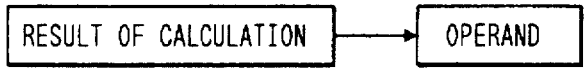

| NOTATION/NAME OF ADDRESSING MODE | DESCRIPTION |
|---|---|
| @(disp:8, PC) PC INDIRECT WITH DISPLACEMENT | THE EFFECTIVE ADDRESS IS THE CONTENT OF THE REGISTER PC TO WHICH AN EIGHT-BIT DISPLACEMENT "disp" IS ADDED. AFTER ZERO EXTENSION, THE DISPLACEMENT "disp" IS MULTIPLIED DEPENDING ON OPERAND SIZE: BY 2 FOR A WORD AND BY 4 FOR A LONG WORD. IN ADDITION, THE LOW-ORDER 2 BITS OF THE REGISTER PC ARE MASKED FOR THE LONG WORD<br>PC&H'FFFFFFFC+disp×4<br>or PC+disp×2<br>↓<br>RESULT OF CALCULATION → OPERAND |
| PC RELATIVE disp: 8 | AN EIGHT-BIT DISPLACEMENT "disp" OF THE CONDITIONAL BRANCH INSTRUCTION IS DOUBLED AFTER SIGN EXTENSION |
| disp: 12 | A 12-BIT DISPLACEMENT "disp" OF THE UNCONDITIONAL BRANCH INSTRUCTION IS DOUBLED AFTER SIGN EXTENSION |
| IMMEDIATE #imm: 8 | EIGHT-BIT IMMEDIATE DATA "imm" OF THE TST, AND, OR OR XOR INSTRUCTION IS EXTENDED BY ZERO |
| #imm: 8 | EIGHT-BIT IMMEDIATE DATA "imm" OF THE MOV, ADD OR CMP/EQ INSTRUCTION IS SIGN-EXTENDED |
| #imm: 8 | IMMEDIATE DATA "imm" OF THE TRAPA INSTRCTION IS MULTIPLIED BY 4 AFTER ZERO EXTENSION |

FIG. 61

| INSTRUCTION | CODE | OPERATION | EXECUTION STATE |
|---|---|---|---|
| EACH INSTRUCTION IS GIVEN IN MNEMONIC<br><br>DESCRIPTION OF SYMBOLS<br>OP.Sz SRC, DEST<br>        ↓ DESTINATION<br>   SOURCE<br>  SZE<br>OP CODE<br><br>reg: SOURCE REGISTER<br>RED: DESTINATION REGISTER<br>imm: IMMEDIATE DATA<br>disp: DISPLACEMENT | THE BITS MAKING UP EACH CODE ARE SHOWN FROM MSB TO LSB, IN THAT ORDER<br><br>DESCRIPTION OF SYMBOLS<br>rrrr: SOURCE REGISTER<br>RRRR: DESTINATION<br>     ↓ REGISTER<br>0000: R0<br>0001: R1<br>    ↓<br>1111: R15<br>iiii: IMMEDIATE DATA<br>dddd: DISPLACEMENT | WHAT EACH INSTRUCTION DOES IS OUTLINED<br><br>DESCRIPTION OF SYMBOLS<br>→: DIRECTION OF TRANSFER<br>(xx): MEMORY OPERAND<br>M/Q/T: FLAG BIT IN SR<br>&: AND PER BIT<br>\|: OR PER BIT<br>^: EXCLUSIVE OR PER BIT<br>~: NOR PER BIT<br><<n, >>n: n-BIT SHIFT | THE STATE COUNT IN NO-WAIT ACCESS IS GIVEN |

FIG. 62

DATA TRANSFER INSTRUCTIONS

| INSTRUCTION | CODE | OPERATION | EXECUTION STATE |
|---|---|---|---|
| MOV #imm, REG | 1110RRRRiiiiiiii | #imm→SIGN EXTENSION→REG | 1 |
| MOV.W @(disp,PC), REG | 1001RRRRdddddddd | (disp+PC) →SIGN EXTENSION→REG | 1 |
| MOV.L @(disp,PC), REG | 1101RRRRdddddddd | (disp+PC) →REG | 1 |
| MOV reg, REG | 0110RRRRrrrr0011 | reg →REG | 1 |
| MOV.B reg, @REG | 0010RRRRrrrr0000 | reg → (REG) | 1 |
| MOV.W reg, @REG | 0010RRRRrrrr0001 | reg → (REG) | 1 |
| MOV.L reg, @REG | 0010RRRRrrrr0010 | reg → (REG) | 1 |
| MOV.B @reg, REG | 0110RRRRrrrr0000 | (reg) →SIGN EXTENSION→REG | 1 |
| MOV.W @reg, REG | 0110RRRRrrrr0001 | (reg) →SIGN EXTENSION→REG | 1 |
| MOV.L @reg, REG | 0110RRRRrrrr0010 | (reg) →REG | 1 |
| MOV.B reg, @-REG | 0010RRRRrrrr0100 | REG-1 →REG, reg → (REG) | 1 |
| MOV.W reg, @-REG | 0010RRRRrrrr0101 | REG-2 →REG, reg → (REG) | 1 |
| MOV.L reg, @-REG | 0010RRRRrrrr0110 | REG-4 →REG, reg → (REG) | 1 |
| MOV.B @reg+, REG | 0110RRRRrrrr0100 | (reg) →SIGN EXTENSION→REG, reg+1 →reg | 1 |
| MOV.W @reg+, REG | 0110RRRRrrrr0101 | (reg) →SIGN EXTENSION→REG, reg+2 →reg | 1 |
| MOV.L @reg+, REG | 0110RRRRrrrr0110 | (reg) →REG, reg+4 →reg | 1 |
| MOV.B R0, @(disp,reg) | 10000000rrrrdddd | R0→ (disp+reg) | 1 |
| MOV.W R0, @(disp,reg) | 10000001rrrrdddd | R0→ (disp+reg) | 1 |
| MOV.L reg, @(disp,REG) | 0001RRRRrrrrdddd | reg → (disp+REG) | 1 |
| MOV.B @(disp,reg), R0 | 10000100rrrrdddd | (disp+reg) →SIGN EXTENSION→R0 | 1 |
| MOV.W @(disp,reg), R0 | 10000101rrrrdddd | (disp+reg) →SIGN EXTENSION→R0 | 1 |

FIG. 63

DATA TRANSFER INSTRUCTIONS

| INSTRUCTION | CODE | OPERATION | EXECUTION STATE |
|---|---|---|---|
| MOV.L @(disp,reg),REG | 0101RRRRrrrrdddd | (disp+reg)→REG | 1 |
| MOV.B reg,@(R0,REG) | 0000RRRRrrrr0100 | reg → (R0+REG) | 1 |
| MOV.W reg,@(R0,REG) | 0000RRRRrrrr0101 | reg → (R0+REG) | 1 |
| MOV.L reg,@(R0,REG) | 0000RRRRrrrr0110 | reg → (R0+REG) | 1 |
| MOV.B @(R0,reg),REG | 0000RRRRrrrr1100 | (R0+reg)→SIGN EXTENSION→REG | 1 |
| MOV.W @(R0,reg),REG | 0000RRRRrrrr1101 | (R0+reg)→SIGN EXTENSION→REG | 1 |
| MOV.L @(R0,reg),REG | 0000RRRRrrrr1110 | (R0+reg)→REG | 1 |
| MOV.B R0,@(disp,GBR) | 11000000dddddddd | R0→(disp+GBR) | 1 |
| MOV.W R0,@(disp,GBR) | 11000001dddddddd | R0→(disp+GBR) | 1 |
| MOV.L R0,@(disp,GBR) | 11000010dddddddd | R0→(disp+GBR) | 1 |
| MOV.B @(disp,GBR),R0 | 11000100dddddddd | (disp+GBR)→SIGN EXTENSION→R0 | 1 |
| MOV.W @(disp,GBR),R0 | 11000101dddddddd | (disp+GBR)→SIGN EXTENSION→R0 | 1 |
| MOV.L @(disp,GBR),R0 | 11000110dddddddd | (disp+GBR)→R0 | 1 |
| MOVA @(disp,PC),R0 | 11000111dddddddd | disp+PC →R0 | 1 |
| MOVT REG | 0000RRRR00101001 | T →REG | 1 |
| SWAP.B reg,REG | 0110RRRRrrrr1000 | reg →SWAP UPPER AND LOWER BYTES IN LOW-ORDER 2 BYTES →REG | 1 |
| SWAP.W reg,REG | 0110RRRRrrrr1001 | reg →SWAP UPPER AND LOWER WORDS→REG | 1 |
| XTRCT reg,REG | 0010RRRRrrrr1101 | reg: MIDDLE 32 BITS OF REG→REG | 1 |

FIG. 64

ARITHMETIC OPERATION INSTRUCTIONS

| INSTRUCTION | CODE | OPERATION | EXECUTION STATE |
|---|---|---|---|
| ADD reg, REG | 0011RRRRrrrr1100 | REG+reg →REG | 1 |
| ADD #imm, REG | 0011RRRRiiiiiiii | REG+imm →REG | 1 |
| ADDC reg, REG | 0011RRRRrrrr1110 | REG+reg+T →REG, CARRY →T | 1 |
| ADDV reg, REG | 0011RRRRrrrr1111 | REG+reg →REG, OVERFLOW→T | 1 |
| CMP/EQ #imm, R0 | 10001000iiiiiiii | 1 →T WHEN R0=imm | 1 |
| CMP/EQ reg, REG | 0011RRRRrrrr0000 | 1 →T WHEN REG=reg | 1 |
| CMP/HS reg, REG | 0011RRRRrrrr0010 | 1 →T WHEN UNSIGNED REG ≧reg | 1 |
| CMP/GE reg, REG | 0011RRRRrrrr0011 | 1 →T WHEN SIGNED REG ≧reg | 1 |
| CMP/HI reg, REG | 0011RRRRrrrr0110 | 1 →T WHEN UNSIGNED REG > reg | 1 |
| CMP/GT reg, REG | 0011RRRRrrrr0111 | 1 →T WHEN SIGNED REG > reg | 1 |
| CMP/PZ REG | 0100RRRR00010001 | 1 →T WHEN REG≧0 | 1 |
| CMP/PL REG | 0100RRRR00010101 | 1 →T WHEN REG > 0 | 1 |
| CMP/STR reg, REG | 0010RRRRrrrr1100 | 1 →T WHEN ANY ONE BYTE IS EQUAL | 1 |
| DIV1 reg, REG | 0011RRRRrrrr0100 | 1 STEP DIVISION (REG÷reg) | 1 |
| DIVOS reg, REG | 0010RRRRrrrr0111 | REG MSB →Q, reg MSB→M, M^Q→T | 1 |
| DIVOU | 0000000000011001 | 0 →M/Q/T | 1 |

FIG. 65

ARITHMETIC OPERATION INSTRUCTIONS

| INSTRUCTION | CODE | OPERATION | EXECUTION STATE |
|---|---|---|---|
| EXTS.B reg,REG | 0110RRRRrrrr1110 | reg SIGN-EXTENDED FROM BYTE →REG | 1 |
| EXTS.W reg,REG | 0110RRRRrrrr1111 | reg SIGN-EXTENDED FROM WORD →REG | 1 |
| EXTU.B reg,REG | 0110RRRRrrrr1100 | reg EXTENDED BY 0 FROM BYTE →REG | 1 |
| EXTU.W reg,REG | 0110RRRRrrrr1101 | reg EXTENDED BY 0 FROM WORD →REG | 1 |
| MAC.W @reg+,@REG+ | 0100RRRRrrrr1111 | SIGNED (REG) × (reg) + MAC →MAC | 1) 2 |
| MULS reg,REG | 0010RRRRrrrr1111 | SIGNED REG×reg →MAC | 1 |
| MULU reg,REG | 0010RRRRrrrr1110 | UNSIGNED REG×reg →MAC | 1 |
| NEG reg,REG | 0110RRRRrrrr1011 | 0-reg →REG | 1 |
| NEGC reg,REG | 0110RRRRrrrr1010 | 0-reg-T →REG, BORROW→T | 1 |
| SUB reg,REG | 0011RRRRrrrr1000 | REG-reg →REG | 1 |
| SUBC reg,REG | 0011RRRRrrrr1010 | REG-reg-T →REG, BORROW→T | 1 |
| SUBV reg,REG | 0011RRRRrrrr1011 | REG-reg →REG, UNDERFLOW →T | 1 |

NOTE 1) THIS IS THE NUMBER OF EXECUTION STATES IN EFFECT WHEN THE INSTRUCTION IS USED ALONE. CONTINUOUS USE OF THE INSTRUCTION INVOLVES 3 STATES

FIG. 66

LOGIC OPERATION INSTRUCTIONS

| INSTRUCTION | CODE | OPERATION | EXECUTION STATE |
|---|---|---|---|
| AND reg, REG | 0010RRRRrrrr1001 | REG & reg →REG | 1 |
| AND #imm, R0 | 11001001iiiiiiii | R0 & imm→R0 | 1 |
| AND.B #imm, @(R0, GBR) | 11001101iiiiiiii | (R0+GBR) & imm→(R0+GBR) | 3 |
| NOT reg, REG | 0110RRRRrrrr0111 | ~ reg→REG | 1 |
| OR reg, REG | 0010RRRRrrrr1011 | REG\|reg →REG | 1 |
| OR #imm, R0 | 11001011iiiiiiii | R0\|imm→R0 | 1 |
| OR.B #imm, @(R0, GBR) | 11001111iiiiiiii | (R0+GBR)\|imm→(R0+GBR) | 3 |
| TAS.B @REG | 0100RRRR00011011 | 1 →T WHEN (REG) IS 0, 1→MSBof (REG) | 4 |
| TST reg, REG | 0010RRRRrrrr1000 | REG & reg, 1→T WHEN RESULT IS 0 | 1 |
| TST #imm, R0 | 11001000iiiiiiii | R0 & imm, 1 →T WHEN RESULT IS 0 | 1 |
| TST.B #imm, @(R0, GBR) | 11001100iiiiiiii | (R0+GBR) & imm, 1 →T WHEN RESULT IS 0 | 3 |
| XOR reg, REG | 0010RRRRrrrr1010 | REG^reg →REG | 1 |
| XOR #imm, R0 | 11001010iiiiiiii | R0^imm→R0 | 1 |
| XOR.B #imm, @(R0, GBR) | 11001110iiiiiiii | (R0+GBR)^imm→(R0+GBR) | 3 |

FIG. 67

SHIFT INSTRUCTIONS

| INSTRUCTION | CODE | OPERATION | EXECUTION STATE |
|---|---|---|---|
| ROTL REG | 0100RRRR00000100 | T←REG←MSB | 1 |
| ROTR REG | 0100RRRR00000101 | LSB→REG→T | 1 |
| ROTCL REG | 0100RRRR00100100 | T←REG←T | 1 |
| ROTCR REG | 0100RRRR00100101 | T→REG→T | 1 |
| SHAL REG | 0100RRRR00100000 | T←REG←0 | 1 |
| SHAR REG | 0100RRRR00100001 | MSB→REG→T | 1 |
| SHLL REG | 0100RRRR00000000 | T←REG←0 | 1 |
| SHLR REG | 0100RRRR00000001 | 0→REG→T | 1 |
| SHLL2 REG | 0100RRRR00001000 | REG<<2→REG | 1 |
| SHLR2 REG | 0100RRRR00001001 | REG>>2→REG | 1 |
| SHLL8 REG | 0100RRRR00011000 | REG<<8→REG | 1 |
| SHLR8 REG | 0100RRRR00011001 | REG>>8→REG | 1 |
| SHLL16 REG | 0100RRRR00101000 | REG<<16→REG | 1 |
| SHLR16 REG | 0100RRRR00101001 | REG>>16→REG | 1 |

FIG. 68

BRANCH INSTRUCTIONS

| INSTRUCTION | CODE | OPERATION | EXECUTION STATE |
|---|---|---|---|
| BF disp | 10001011dddddddd | disp+PC →PC WHEN T=0, NOP WHEN T=1 | 3/1 |
| BT disp | 10001001dddddddd | disp+PC →PC WHEN T=1, NOP WHEN T=0 | 3/1 |
| BRA disp | 1010dddddddddddd | DELAYED BRANCH, disp+PC →PC | 2 |
| BSR disp | 1011dddddddddddd | DELAYED BRANCH, PC→PR, disp+PC→PC | 2 |
| JMP @REG | 0100RRRR00101011 | DELAYED BRANCH, REG →PC | 2 |
| JSR @REG | 0100RRRR00001011 | DELAYED BRANCH, PC→PR, REG→PC | 2 |
| RTS | 0000000000001011 | DELAYED BRANCH, PR→PC | 2 |

FIG. 69

SYSTEM CONTROL INSTRUCTIONS

| INSTRUCTION | CODE | OPERATION | EXECUTION STATE |
|---|---|---|---|
| CLRT | 0000000000001000 | 0 → T | 1 |
| CLRMAC | 0000000000101000 | 0 → MAC | 1 |
| LDC REG, SR | 0100RRRR00001110 | REG → SR | 1 |
| LDC REG, GBR | 0100RRRR00011110 | REG → GBR | 1 |
| LDC REG, VBR | 0100RRRR00101110 | REG → VBR | 1 |
| LDC.L @REG+, SR | 0100RRRR00000111 | (REG) →SR, REG+4 →REG | 3 |
| LDC.L @REG+, GBR | 0100RRRR00010111 | (REG) →GBR, REG+4 →REG | 3 |
| LDC.L @REG+, VBR | 0100RRRR00100111 | (REG) →VBR, REG+4 →RE | 3 |
| LDS REG, MACH | 0100RRRR00001010 | REG →MACH | 1 |
| LDS REG, MACL | 0100RRRR00011010 | REG →MACL | 1 |
| LDS REG, PR | 0100RRRR00101010 | REG →PR | 1 |
| LDS.L @REG+, MACH | 0100RRRR00000110 | (REG) →MACH, REG+4 →REG | 1 |
| LDS.L @REG+, MACL | 0100RRRR00010110 | (REG) →MACL, REG+4 →REG | 1 |
| LDS.L @REG+, PR | 0100RRRR00100110 | (REG) →PR, REG+4 →REG | 1 |

FIG. 70

SYSTEM CONTROL INSTRUCTIONS

| INSTRUCTION | CODE | OPERATION | EXECUTION STATE |
|---|---|---|---|
| NOP | 0000000000001001 | NO OPERATION | 1 |
| RTE | 0000000000101011 | DELAYED BRANCH, STACK AREA→PC/SR | 4 |
| SETT | 0000000000011000 | 1 → T | 1 |
| SLEEP | 0000000000011011 | SLEEP | 1)3 |
| STC SR,REG | 0000RRRR00000010 | SR→REG | 1 |
| STC GBR,REG | 0000RRRR00010010 | GBR→REG | 1 |
| STC VBR,REG | 0000RRRR00100010 | VBR→REG | 1 |
| STC.L SR,@-REG | 0100RRRR00000011 | REG-4→REG, SR→(REG) | 2 |
| STC.L GBR,@-REG | 0100RRRR00010011 | REG-4→REG, GBR→(REG) | 2 |
| STC.L VBR,@-REG | 0100RRRR00100011 | REG-4→REG, VBR→(REG) | 2 |

NOTE 1) THIS IS THE NUMBER OF EXECUTION STATES IN EFFECT BEFORE THE SLEEP STATE IS REACHED

FIG. 71

SYSTEM CONTROL INSTRUCTIONS

| INSTRUCTION | CODE | OPERATION | EXECUTION STATE |
|---|---|---|---|
| STS MACH, REG | 0000RRRR00001010 | MACH→REG | 1 |
| STS MACL, REG | 0000RRRR00011010 | MACL→REG | 1 |
| STS PR, REG | 0000RRRR00101010 | PR→REG | 1 |
| STS.L MACH, @-REG | 0100RRRR00000010 | REG-4 →REG, MACH→ (REG) | 1 |
| STS.L MACL, @-REG | 0100RRRR00010010 | REG-4 →REG, MACL→ (REG) | 1 |
| STS.L PR, @-REG | 0100RRRR00100010 | REG-4 →REG, PR→ (REG) | 1 |
| TRAPA #imm | 11000011iiiiiiii | PC/SR →STACK AREA, (imm) →PC | 8 |

MULTIPLY CONNECTABLE MICROPROCESSOR AND MICROPROCESSOR SYSTEM

This application is a continuation of U.S. application Ser. No. 08/517,151, filed Aug. 21, 1995, now U.S. Pat. No. 5,530,965.

BACKGROUND OF THE INVENTION

The present invention relates to a single-chip microcomputer to which a dynamic random access memory (called dynamic RAM or DRAM) may be connected directly.

Past publications about microcomputers to which a DRAM may be directly connected include Japanese Patent Laid-Open No. SHO/61-127056 (which corresponds to U.S. Pat. No. 4,792,891, issued on Dec. 20, 1988, assigned to Hitachi, Ltd.). The microcomputer disclosed in the above publication has a refresh address counter, a control signal generating circuit and a register. The refresh address counter generates refresh addresses. The control signal generating circuit generates strobe signals such as RAS* (row address strobe signal) and CAS* (column address strobe signal). The register is used to specify either a dynamic RAM or a static RAM is to be accessed. The address output format is varied depending on the content of the register. Thus not only the static RAM but also the dynamic RAM may be accessed and the dynamic RAM may be refreshed. The register is designed to specify the range of addresses in the dynamic RAM to be used and the memory capacity thereof, i.e., the number of bits constituting the address signals. Such settings make it possible to change to a certain extent the memory capacity of each DRAM to be used and the number of DRAM's that may be configured in a system. (In the description that follows, an asterisk attached to a signal name (e.g., RAS*, CAS*) indicates that the signal is an inverted signal.)

SUMMARY OF THE INVENTION

Intensive research on single-chip microcomputers equipped with a dynamic RAM interface led the inventors to find it desirable for the above kind of microcomputer to meet the following requirements:

(1) The single-chip microcomputer should incorporate a DRAM controller supporting a dynamic RAM self-refresh function. When the user sets appropriate data to a particular register in the DRAM controller, that function will execute the signals RAS* and CAS* in a predetermined sequence to put the DRAM in a self-refresh mode.

(2) A scheme should be provided to perform parity check on the data in the DRAM.

(3) A multiple-bus interface should be provided to let an SCSI (small computer serial interface) controller or a hard disk controller (HDC) connect directly to the single-chip microcomputer.

(4) In addition to incorporating more peripheral functions, the single-chip microcomputer should permit one-clock pulse access to a high-speed page mode DRAM (access time: 45 ns) operating at a frequency of 16 MHz.

It is therefore an object of the present invention to provide an easy-to-use microcomputer that may be connected directly to such memories as dynamic and static RAM's and to other peripheral circuits.

It is another object of the invention to provide a microcomputer capable of supporting a dynamic RAM refresh operation best suited for a low-power consumption mode of the system such as a battery backup mode.

It is a further object of the invention to provide a microcomputer having a dynamic RAM interface capable of high-speed access in a dynamic RAM page mode.

It is a still further aspect of the invention to provide a microcomputer that accomplishes the above objects with a minimum number of external terminals.

Other objects, features and advantages of the present invention will become apparent in the following specification and accompanying drawings.

Outlined below are representative features of the invention to be disclosed in this specification:

(1) The single-chip microcomputer according to the invention is equipped with strobe signal output terminals for direct connection to a dynamic RAM. Also furnished is a chip select signal output terminal that outputs a chip select signal in parallel with the signal output from the strobe signal output terminals. The chip select signal allows a static RAM or other peripheral circuits to connect directly to the single-chip microcomputer. The microcomputer is further provided with address output terminals and data I/O terminals. The address output terminals output non-multiplexed or multiplexed address signals as needed. The data I/O terminals selectively permit address signals output to comply with a multiple-bus interface.

(2) A control register arrangement is furnished to select either a CAS-before-RAS refresh mode or a self-refresh mode in which the dynamic RAM is addressed using the strobe signals output from the strobe signal output terminals.

(3) The duty factor of a column address strobe signal, output as the strobe signal from the strobe signal output terminal, is set to less than 40% (e.g., 35%). Alternatively, the duty factor of the column address strobe signal is set either to less than 40% or to 50%. This arrangement is intended to have a high-speed page mode DRAM accessed at high speeds illustratively in units of one clock pulse at an operating frequency of 16 MHz.

(4) A parity data output terminal and a parity data input terminal are provided. The parity data output terminal outputs parity data generated by a parity data generating circuit built in the microcomputer, the generated parity data being used in conjunction with the data to be output. The parity data input terminal admits externally furnished parity data into an internal parity check circuit of the microcomputer.

(5) The single-chip microcomputer is equipped with a strobe signal output terminal. This terminal outputs a chip select signal corresponding to any one of a plurality of areas divided from a controllable linear address space of the microcomputer. Each of the areas may be assigned a chip select signal which, when output, is multiplexed with the strobe signal for the above-mentioned dynamic RAM.

(6) A particular bit in an access target address signals is used to select a desired unit number of bits in which to access the above-described areas (e.g., data accessed in units of 8 bits or 16 bits).

With the above features, the invention offers the following major benefits:

(1) Because the microcomputer incorporates both the interface for the dynamic RAM and that for the static RAM and other peripheral circuits, a desired system centering on the microcomputer is configured in a flexible manner.

(2) Because the self-refresh mode is selectively designated in place of the CAS-before-RAS refresh mode, it is possible to support the dynamic RAM refresh operation best suited for a low-power consumption mode of the system such as a battery backup mode.

(3) With the duty factor of the column address strobe signal set to less than 40% (e.g., 35%), a dynamic RAM supporting a high-speed page mode, with an access time of 45 ns is accessed in units of one clock cycle at an operating frequency of 16 MHz.

(4) The internal function for parity check on the dynamic RAM allows the single-chip microcomputer easily to deal with systems that require high reliability such as hard disk(disc) drives.

(5) The number of external terminals is minimized while the functionality of the microcomputer is enhanced. This is made possible by the three features: (i) the chip select signal assigned to any one of the divided multiple areas constituting the linear address space is output after being multiplexed with the strobe signal for the dynamic RAM; (ii) the address signal output terminals are used to output the non-multiplexed or multiplexed address signals as needed; and (iii) the data I/O terminals selectively permits address signals output.

(6) Because a particular bit in the access target address signals is used to select a desired unit number of bits for access to the above-described areas (e.g., data accessed in units of 8 bits or 16 bits), it is possible to let a desired number of 8-bit and 16-bit memories coexist in a single memory area.

BRIEF DESCRIPTION OF THE DRAWINGS

FIG. 22 is a view showing typical I/O request command assignments in connection with the embodiment;

FIG. 23 is a state transition diagram of an internal access bus state machine in the embodiment;

FIG. 24 is a table listing access state codes, next access state codes and the processes corresponding to these codes in connection with the embodiment;

FIG. 25 is another table listing access state codes, next access state codes and the processes corresponding thereto;

FIG. 26 is another table listing access state codes, next access state codes and the processes corresponding thereto;

FIG. 27 is another table listing access state codes, next access state codes and the processes corresponding thereto;

FIG. 58 is a first table listing addressing modes and calculations of effective addresses in connection with the embodiment;

FIG. 59 is a second table listing addressing modes and calculations of effective addresses;

FIG. 60 is a third table listing addressing modes and calculations of effective addresses;

FIG. 61 is a table giving explanatory notes on how instructions are described in connection with the embodiment;

FIG. 62 is a first table listing data transfer instructions;

FIG. 63 is a second table listing data transfer instructions;

FIG. 64 is a first table listing arithmetic operation instructions;

FIG. 65 is a second table listing arithmetic operation instructions;

FIG. 66 is a table listing logic operation instructions;

FIG. 67 is a table listing shift instructions;

FIG. 68 is a table listing branch instructions;

FIG. 69 is a first table listing system control instructions;

FIG. 70 is a second table listing system control instructions; and

FIG. 71 is a third table listing system control instructions.

DESCRIPTION OF THE PREFERRED EMBODIMENT

Figure 1:
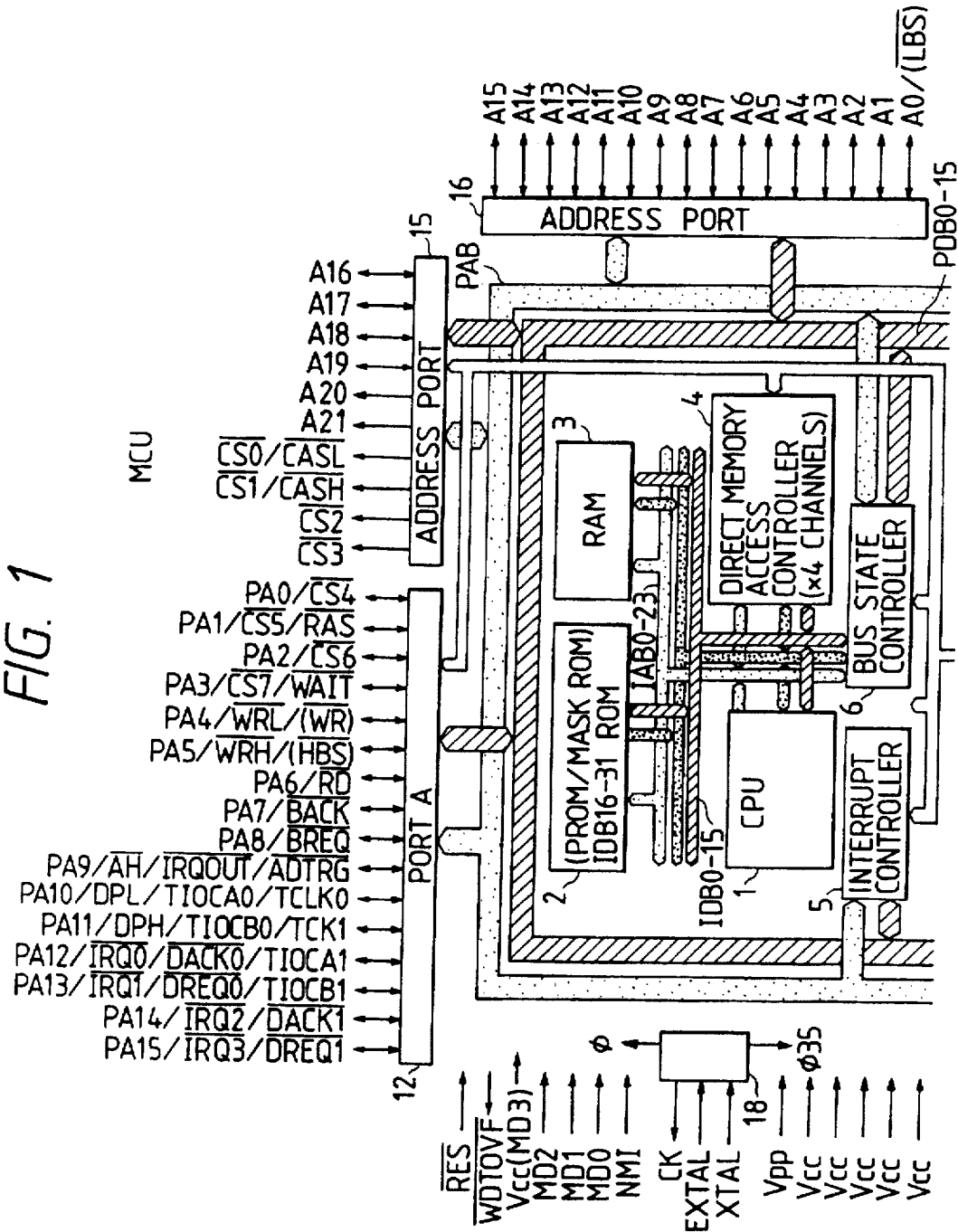
FIG. 1 is a block diagram showing the upper half of a microcomputer practiced as the preferred embodiment of the present invention.

The preferred embodiment of the invention will be described under the following headings:
1. Overall block diagram of the microcomputer
2. Terminal arrangement of the microcomputer
3. Chip layout of the microcomputer
4. Bus state controller
5. External access bus state machine
6. Control registers of the bus state controller
7. State transition diagram of the internal access bus state machine
8. State transition diagram of the external access bus state machine
9. Operations of the bus state controller
10. Microcomputer system
11. Timing charts of external access
12. Clock signal generation for generating strobe signals (to correct duty factor)
13. Register constitution and data structure in the microcomputer
14. Descriptions of microcomputer instructions <1. Overall block diagram of the microcomputer>

Figure 2:
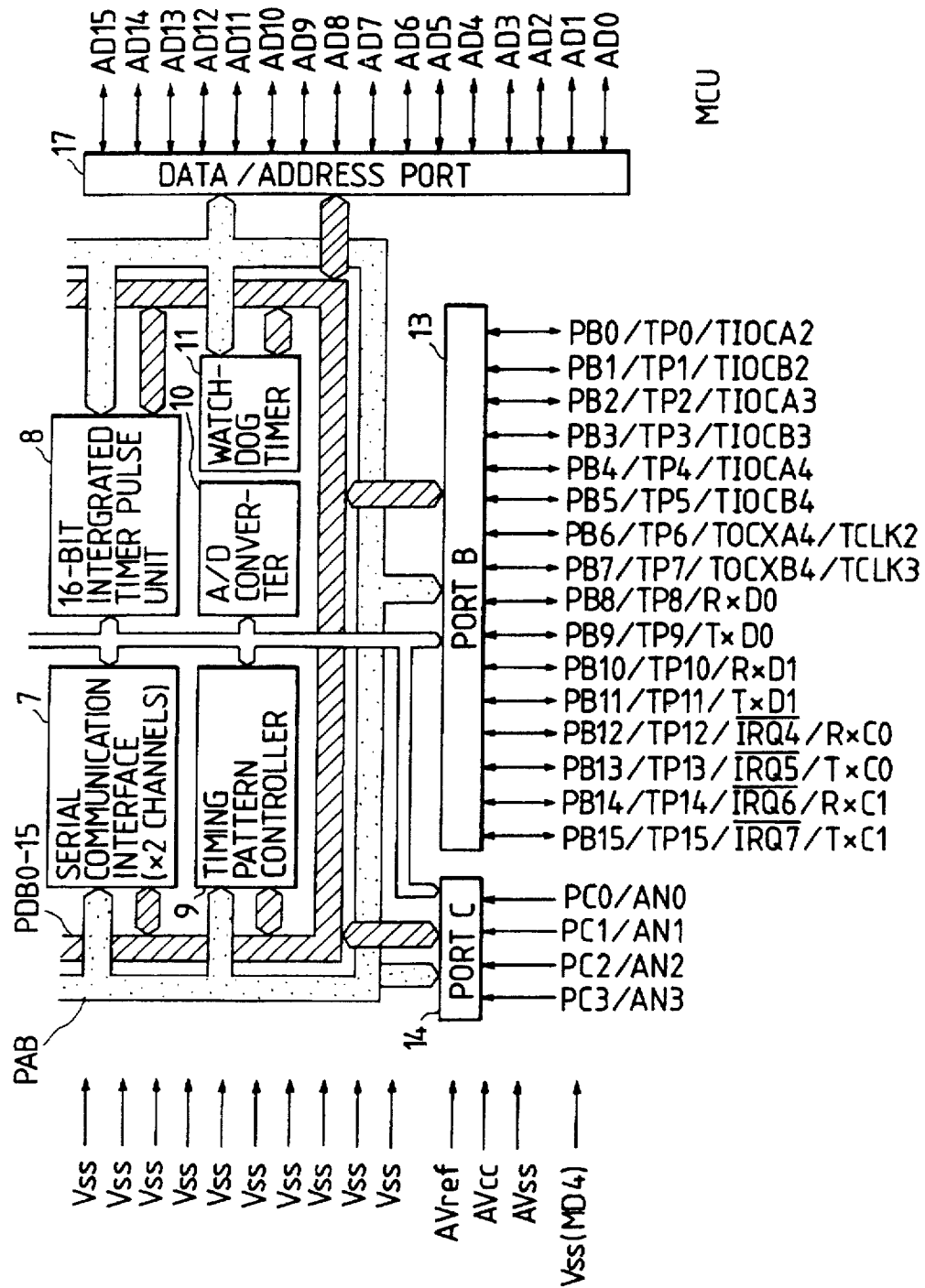
FIG. 2 is a block diagram showing the lower half of the embodiment.

FIGS. 1 and 2 are block diagrams showing the upper and lower halves of the microcomputer embodying the invention. The microcomputer MCU comprises a central processing unit (CPU) 1, a read-only memory (ROM) 2 that stores programs including those for operating the CPU 1, a random access memory (RAM) 3 that serves as a working area of the CPU or as a temporary data storage area, a direct memory access controller (DMAC) 4, and peripheral circuits. These components are connected to internal buses and are positioned on a single semiconductor substrate illustratively made of single crystal silicon. The peripheral circuits include, and are not limited to, an interrupt controller (INT) 5, a bus state controller 6, serial communication interface (SCI) 7, an integrated timer pulse unit (ITU) 8, a timing pattern controller 9, an A/D converter 10, a watchdog timer (WDT) 11, and I/O circuits which interface to the outside of the chip. The I/O circuits comprise a port A 12, a port B 13 and a port C 14 which also double as terminals; ports 15 and 16 for addressing purposes; and a data/address port 17. In FIG. 1, reference numeral 18 denotes a clock pulse generating circuit. The internal buses of the microcomputer include a 32-bit internal data bus IDB0-31, a 24-bit internal address bus IAB0-23, a peripheral data bus PDB0-15 for internal peripheral circuits, and a peripheral address bus PAB for internal peripheral circuits.

<2. Terminal arrangement of the microcomputer>

Figure 3:
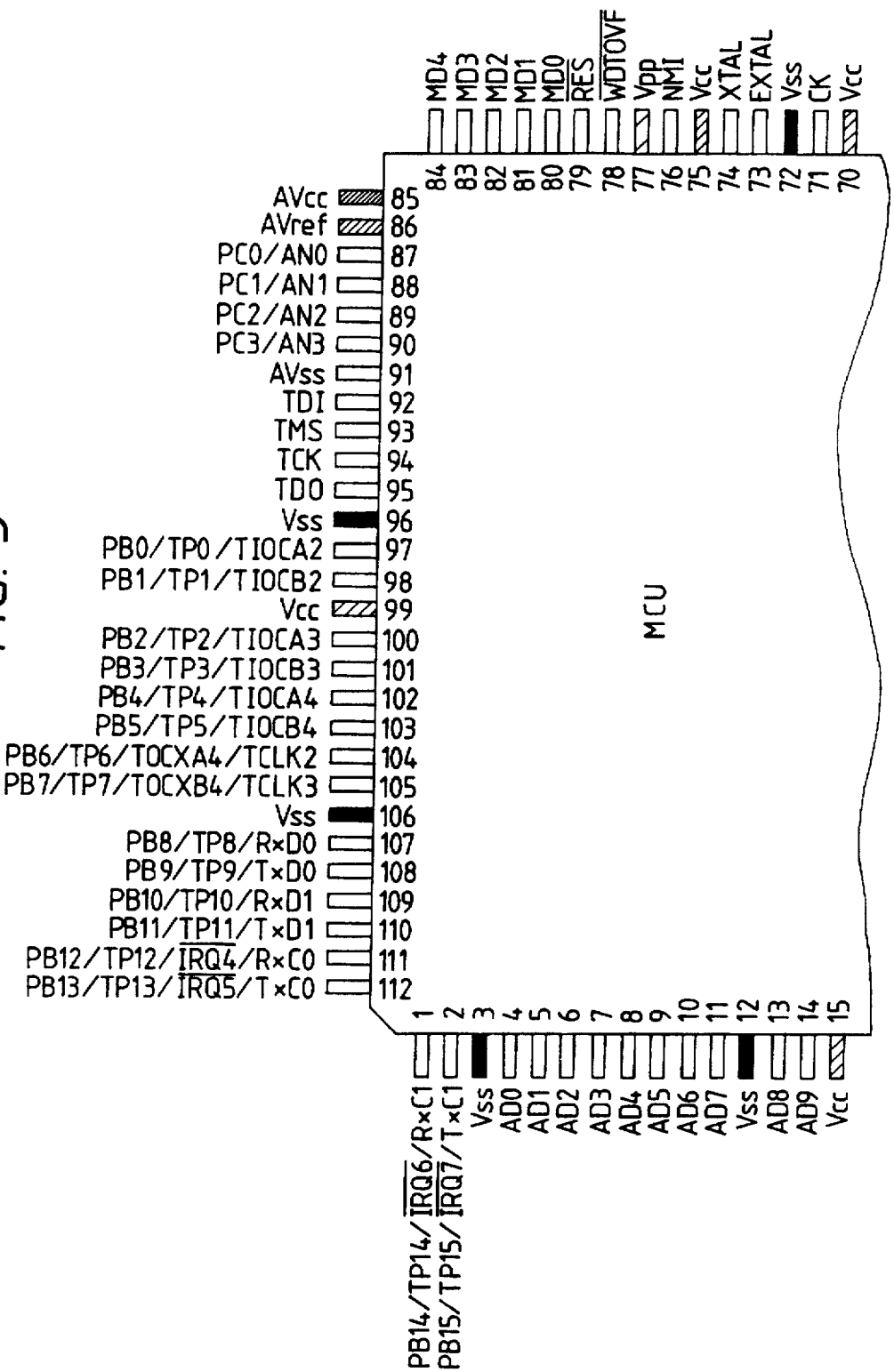
FIG. 3 is a view depicting a typical arrangement of terminals in the upper half of a package containing a microcomputer chip according to the invention.
Figure 4:
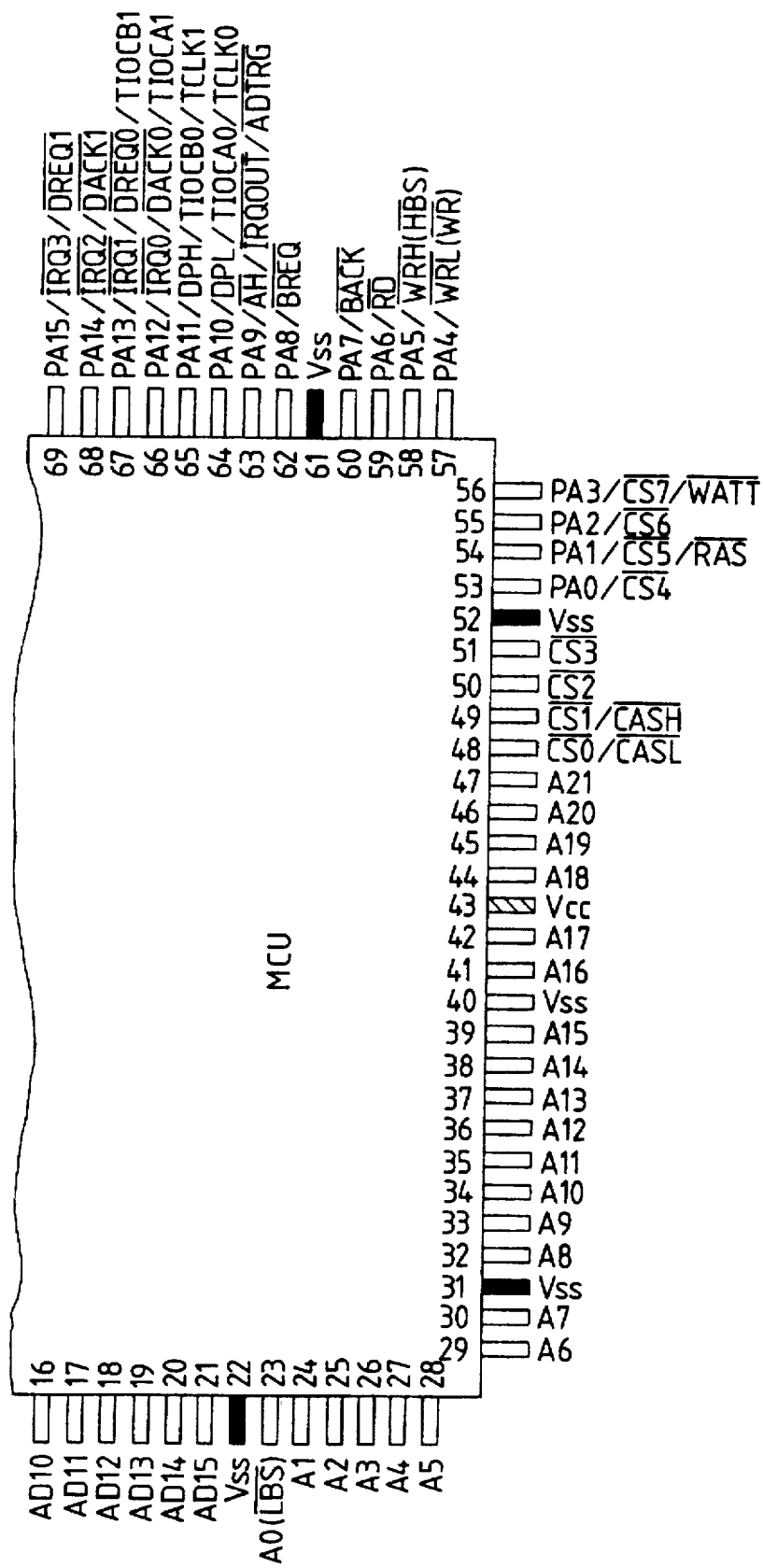
FIG. 4 is a view depicting a typical arrangement of terminal in the lower half of the package containing the microcomputer chip.

FIGS. 3 and 4 are views depicting a typical arrangement of terminals (i.e., lead terminals) in the upper and lower halves of a package containing a chip of the microcomputer according to the invention. The signal names in FIGS. 3 and 4 correspond to those in FIGS. 1 and 2.

What follows is a description of major signals and terminals shown in FIGS. 1 through 4. A power supply terminal Vcc is connected to a system power supply (2.7-5.6 V). A power supply terminal Vss is connected to another system power supply (0 V). An input terminal Vpp is connected to a program power supply (e.g., 12.5 V) for use with a programmable ROM. Terminals EXTAL and XTAL are connected to a crystal oscillator each. An external clock signal is admitted through the terminal EXTAL. An output terminal CK outputs a clock signal destined to peripheral devices. A reset signal RES* brings about a power-on reset state if brought Low when a signal NMI, to be described later, remains High. (An asterisk "*" suffixed to a signal or terminal name means that the signal is a low enable signal or that the terminal is a low enable signal terminal. In some drawings, the asterisk is replaced by a bar drawn above the signal or terminal name.) Bringing the reset signal RES* Low brings about a manual reset state when the signal NMI is Low. A signal WDTOVF* is a watchdog timer overflow signal. A signal BACK* is a bus right request acknowledge signal indicating that the bus right is now released to an external device. Signals MD0 through MD3 are mode signals. A terminal NMI* is an input terminal that admits a non-maskable interruption, i.e., a request for an interruption that cannot be masked. Terminals IRQ0* through IRQ7* are interrupt request input terminals. A signal IRQOUT* is a slave time interrupt request output indicating that an interrupt request has occurred. Terminals A21 through A0 are address I/O terminals which output addresses when the bus right is acquired and which admits addresses when the bus right is released for access to the internal RAM. Terminals AD15 through AD0 constitute 16-bit bidirectional data terminals that permit data multiplexing with the low-order 16 bits of the address. A signal DPH is parity data corresponding to the high-order eight bits of data, and a signal DPL is parity data corresponding to the low-order eight bits of data. A signal WAIT* is a wait signal that inserts a wait cycle when an external address space is accessed. A signal RAS* is a row address strobe timing signal for an external dynamic random access memory (DRAM). A signal CASH* is a DRAM high-order column address strobe timing signal activated when the high-order eight bits of data are accessed in the DRAM. A signal CASL* is a DRAM low-order column address strobe timing signal activated when the low-order eight bits of data are accessed in the DRAM. A signal RD* is a read signal indicating an external read operation. A signal WRH* is a high-order write signal indicating that the external high-order eight bits of data are written. A signal WRL* is a low-order write signal indicating that the external low-order eight bits of data are written. Signals CS0 through CS7 are chip select signals for use with external memories or external devices. A signal AH* is an address hold signal indicating the address hold timing for a device that uses an address/data multiplexing bus. Signals HBS* and LBS* are a high-order and a low-order byte strobe signal, respectively (doubling as WRH* and A0). A signal WR* is a write signal that is output for a write operation, doubling as the signal WRL* already mentioned.

<3. Chip layout of the microcomputer>

Figure 5:
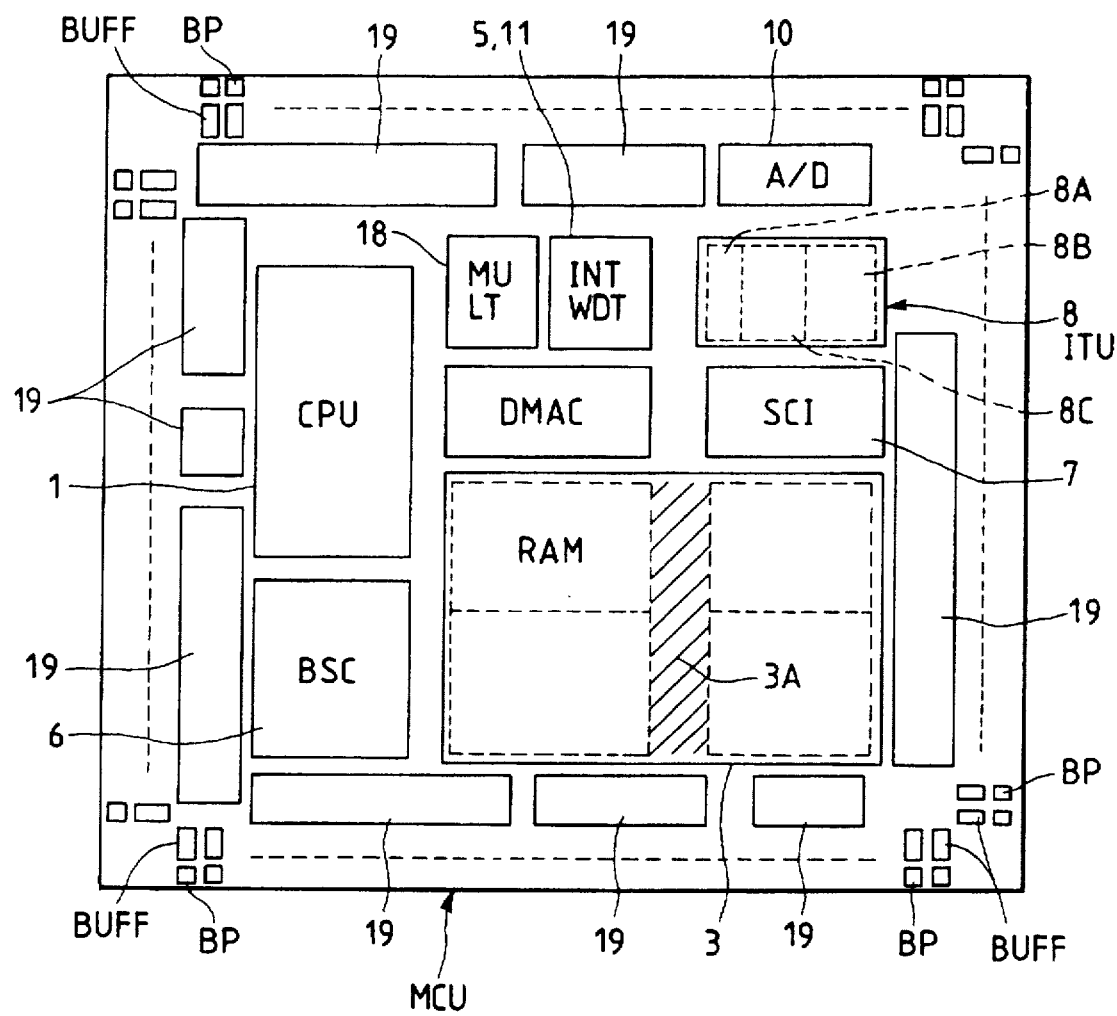
FIG. 5 is a layout view of major internal circuit modules of the embodiment.

FIG. 5 is a layout view of major internal circuit modules of the microcomputer MCU embodying the invention. In FIG. 5, a reference numeral 18 denotes a multiplier (MULT) that is omitted in FIGS. 1 and 2. Whereas FIG. 2 shows the ROM 2, the microcomputer MCU of FIG. 5 is shown to have the area of the ROM 2 assigned to a RAM 3. The chip of the microcomputer MCU is surrounded in its periphery with numerous bonding pads BP's located correspondingly opposite to buffer circuits BUFF's for input, output, or input/output purposes. Inside the surrounding bonding pads BP's and buffer circuits BUFF's are port circuits 19 that constitute the above-mentioned ports 12 through 17. In the middle of the chip are circuit modules such as the CPU 1. The layout of FIG. 5 has the following features:

(a) The A/D converter 10 is located between the port circuits 19. Its location allows the I/O converter 10 to receive inputs from nearby external terminals such as the bonding pads. This prevents the distortion or attenuation of input analog signal waveforms.

(b) The area occupied by the CPU 1 in the chip is small. This is because the CPU 1 has a RISC (reduced instruction set computer) architecture in the embodiment. Illustratively, the chip area of the microcomputer MCU is 10.4×10 square millimeters, whereas the chip area occupied by the CPU 1 is 6.6 square millimeters. When the chip area occupied by the CPU 1 is reduced to a minimum, there may be provided an increased amount of peripheral circuits to choose from when various models of microcomputers are manufactured on an ASIC (application specific integrated circuit) basis.

(c) The multiplier 18 is provided as a circuit module independent of the CPU 1. This allows microcomputer manufacturers to develop more easily, on an ASIC basis, varieties of microcomputers for applications having no need for digital signal processing.

(d) Between memory mats of the RAM 3 are signal lines not directly associated with the RAM 3. Illustratively, an area 3A between the memory mats accommodates internal buses leading to the port circuits. This arrangement minimizes those extra lengths of internal lines which need to be contained in the chip.

(e) The four-kilobyte chip area of the RAM is substantially the same as a 64-kilobyte chip area of an EPROM. This feature minimizes in advance the constraints on the selection of the chip layout.

(f) In the integrated timer pulse unit (ITU) 8, a group of eight-bit-long registers is separated from a group of 16-bit-long registers when they are laid out. For example, as shown in FIG. 5, the eight-bit-long register group 8A is located to the left of the ITU 8 while the 16-bit-long register group 8B is positioned to the right. Between the two register groups is a timer control circuit 8C. The layout allows shortened, orderly control signal lines to connect the control circuit 8C to the register groups 8A and 8B with ease. The routing of the control signal lines can become complicated if 16-bit-long and eight-bit-long registers are left to coexist in a disorganized manner.

<4. Bus state controller>

Figure 6:
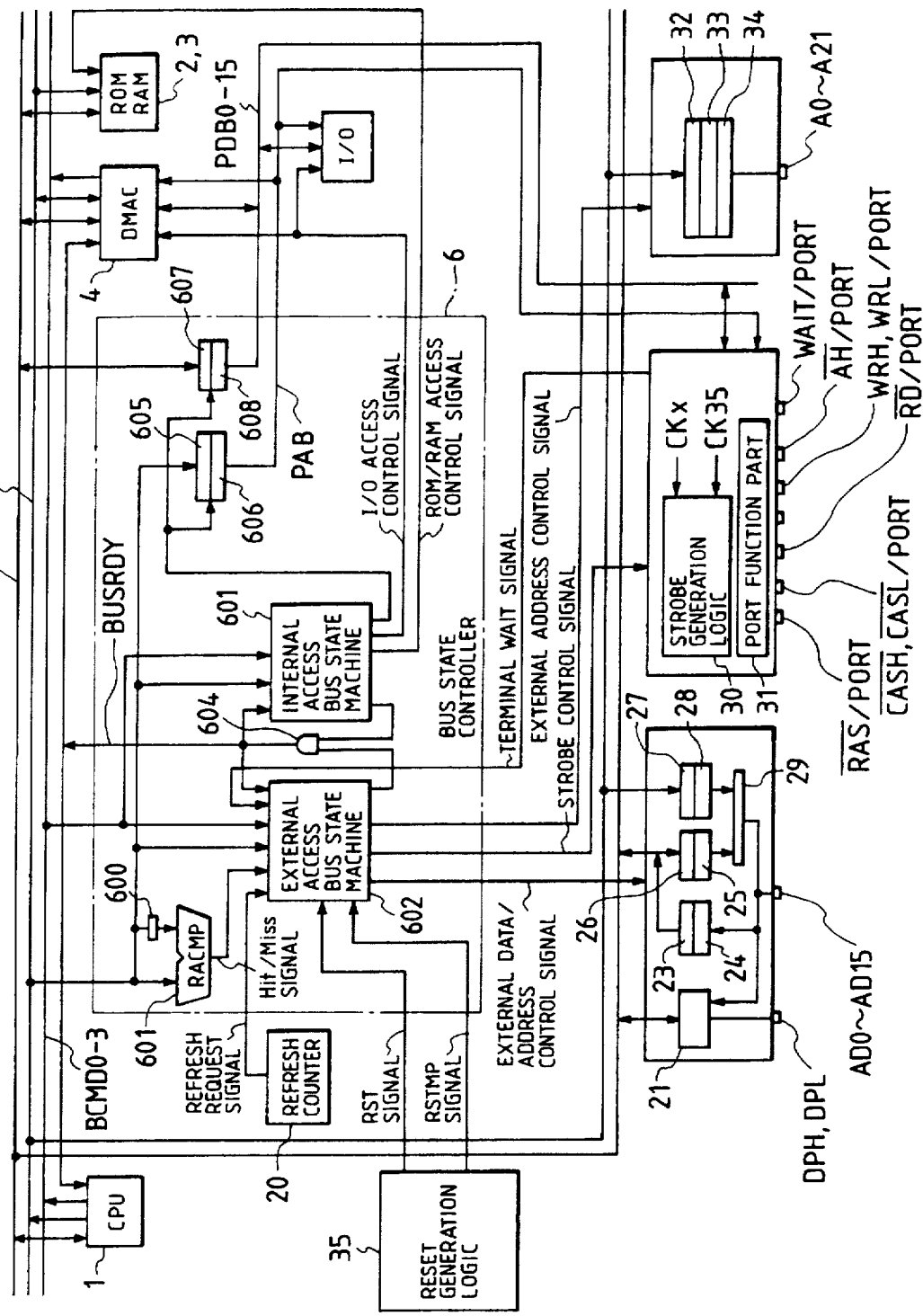
FIG. 6 is a block diagram of the embodiment with its components centering around a bus state controller.

FIG. 6 is a block diagram of the embodiment with its components centering around the bus state controller 6. In FIG. 6, reference characters IDB0-31 stand for a 32-bit internal data bus, IAB0-23 for a 24-bit internal address bus, BCMD0-3 for a four-bit bus control command bus, PDB0-15 for a 16-bit I/O bus (for access to peripheral circuits), and PAB for a peripheral access address bus. Signals PDB and PAB are control signals for controlling the data bus and address bus for access to peripheral circuits. An I/O access control signal is sent to each peripheral circuit for access thereto. A ROM/RAM access control signal is a control signal used to access the ROM 2 and RAM 3 which are mounted on the chip. A terminal wait signal allows an external terminal to control the number of memory wait states by admitting necessary signals therethrough. An external data/address control signal is used to control an external data bus. The external data/address control signal has its name because an address can be placed on the data bus during access to an external multiplex I/O device. A strobe control signal is used to transmit control signals necessary for generating control signals by which to carry out memory access and I/O access operations. A Hit/Miss signal indicates whether post-write high-speed page mode of the DRAM is hit or missed. A refresh request signal designates the timing of the refresh operations originating from a refresh counter. An RST signal indicates whether a reset state or a normal state is in effect. An RSTMP signal indicates whether a manual reset or a power-on reset is in effect when the RST signal is asserted.

The CPU 1 is regarded as a bus master that runs autonomously to issue memory access requests in conjunction with programs or in response to interrupt requests. In addition to having the 24-bit address bus (for output) and 32-bit data bus (for input and output), the CPU 1 is equipped with the four-bit bus control command bus BCMD0-3 (for output). Upon receipt of a bus transfer end sync signal BUSRDY from the bus state controller 6, the CPU 1 enters a wait state. The DMAC 4 is regarded as a bus master that runs autonomously to issue memory access requests in response to DMA requests. Besides having the 24-bit address bus (for output) and 16-bit data bus (for input and output), the DMAC 4 is furnished with the fourbit bus command bus (for output). The DMAC 4 enters a wait state upon receiving the bus transfer end sync signal BUSRDY from the bus state machine 602 or 603 through an OR gate 604.

In FIG. 6, the bus state controller 6 includes, and is not limited by, a latch 600, a row address comparator (RACMP) 601, the external access bus state machine 602, the internal access bus state machine 603, the OR gate 604, a latch 605, a low-order bit converter 606, a latch 607, and an aligner 608. The internal access bus state machine 603 is a state machine that generates control signals by which to access the internal memory of the chip or I/O circuits (those peripheral circuits other than the internal memory) therein. The state machine 603 has six states and comprises 10 state transitions. The external access bus state machine 602 is a state machine that generates control signals by which to access a memory or I/O circuits outside the chip. The state machine 602 comprises a DRAM state machine, bus size arbitration state machine, external wait generation state machine, normal space access state machine, normal space access substate flag and I/O MUX access state machine. These state machines have their states interact with one another during operation. The states and state transitions applicable to these state machines will be described later. The basic mode of control operation of the bus state controller 6 is determined by the I/O request command coming from the bus control command bus BCMD0-3. FIG. 22 shows typical I/O request command assignments in connection with the embodiment.

The row address comparator 601 is a comparative logical circuit that checks to see, upon access to an external DRAM, if the currently accessed address therein belongs to the same row address as that in the preceding access. Given the result of the comparison, the external access bus state machine 602 determines whether the DRAM is to be accessed in high-speed page mode or "full access" thereof is to be carried out. Full access means a series of a precharge operation, a row address output and a column address output carried out consecutively. High-speed page mode refers to a mode in which the DRAM is accessed by continuously varying the address signal and CAS* (CASL*, CASH*) while RAS* is being asserted. The low address at which the DRAM was accessed most recently is held by the latch 600. The low address comparator 601 compares the address held by the latch 600 with the internal address on the internal address bus IAB0-23.

The aligner 608 performs data alignment during a write operation illustratively from the internal data bus IDB to the internal memory. The data latch 607 whose output is connected to the input of the aligner 608 receives write data sent from the CPU 1 in units of 16 or 32 bits, and writes the data to internal peripheral circuits in units of eight or 16 bits. The latch 605 is a static address latch circuit that temporarily accommodates an address when there is a time difference between the operation of the internal address bus IAB0-23 and that of the peripheral address bus PAB. The low-order bit converter 606 is a logical circuit that generates a low-order address to comply with each word or byte access operation when the CPU 1 generates only one address for access to a 32-bit operand in a 16-bit space or to a 16- or 32-bit operand in an eight-bit space.

The refresh counter 20 shown in FIG. 6 is an interval timer that generates a timing signal for refreshing the DRAM. The counter 20 varies the interval depending on the setting of its internal register. As mentioned earlier, the I/O circuits are separate from the internal memory and refer to the circuit modules that have internal peripheral functions. Specifically, the I/O circuits include the interrupt controller, bus state controller, serial communication interface, bit integrated timer pulse unit, watchdog timer, A/D converter, timing pattern controller and ports.

In FIG. 6, reference numeral 21 denotes a logical block for parity check code generation and parity check, generating parity check codes destined to memory data and detecting parity errors therefrom. An aligner 22 carries out operand alignment in reading operands of 8, 16 or 32 bits from an external memory arranged in 8 or 16 bits. A data latch 23 temporarily accommodates data read in units of 8 or 16 bits and sends the data to the CPU 1 as a 16- or 32-bit operand. For that purpose, the data latch 23 is designed to be a static data latch circuit, illustratively taking 32 bits as one word. An aligner 25 performs operand alignment in writing operands of 8, 16, or 32 bits to an external memory arranged in 8 or 16 bits. A data latch 26 whose output is connected to the input of the aligner 25 temporarily accommodates write data sent from the CPU 1 in units of 16 or 32 bits and writes the data to an external location in units of 8 or 16 bits. The output of the data latch 23 is connected to the high-order 16 bits of the internal data bus IDB0-31. The input of the data latch 26 is connected to the low-order 16 bits of the internal data bus IDB0-31. An address latch 27 and a low-order bit converter 28 are used to output address data onto the internal address bus IAB0-23. The data output of the aligner 25 and that of the low-order bit converter 28 are fed to the terminals AD0 through AD15 via a multiplexer 29.

A strobe generation logic circuit 30 is provided to generate various strobe signals. The strobe logic generation circuit 30 uses the strobe control signal mentioned earlier in generating the diverse strobe signals output to such peripheral circuits as an externally connected address multiplexed DRAM, an address non-multiplexed ROM and a static RAM (SRAM). A port function part 31 comprises port logic by which to multiplex strobe and port functions for connection to the external memory as well as to other peripheral circuits.

A row/column address selector 32 connected to the internal address bus IAB0-23 is a logic circuit that implements switching between row and column addresses during access to the external DRAM. An address latch 33 is a static latch circuit that temporarily accommodates an address when there is a time difference between internal and external bus operations (e.g., writing to a buffer in warp mode, single cycle DMA, writing to DRAM). A low-order bit converter 34 is a logical circuit that generates a low-order address to comply with each word or byte access operation when the CPU 1 generates only one address for access to a 32-bit operand in a 16-bit space or to a 16- or 32-bit operand in an eight-bit space. The row/column address selector 32, the address latch 33 and the low-order bit converter 34 are controlled by the external address control signals output from the external access bus state machine 602. A reset generation logic circuit 35 resets the entire chip by generating the RST and RSTMP signals in an external terminal state. Although the RST and RSTMP signals are shown to be fed only to the external access bus state machine 602 in FIG. 6, this is not limitative of the invention.

<5. External access bus state machine>

Figure 7:
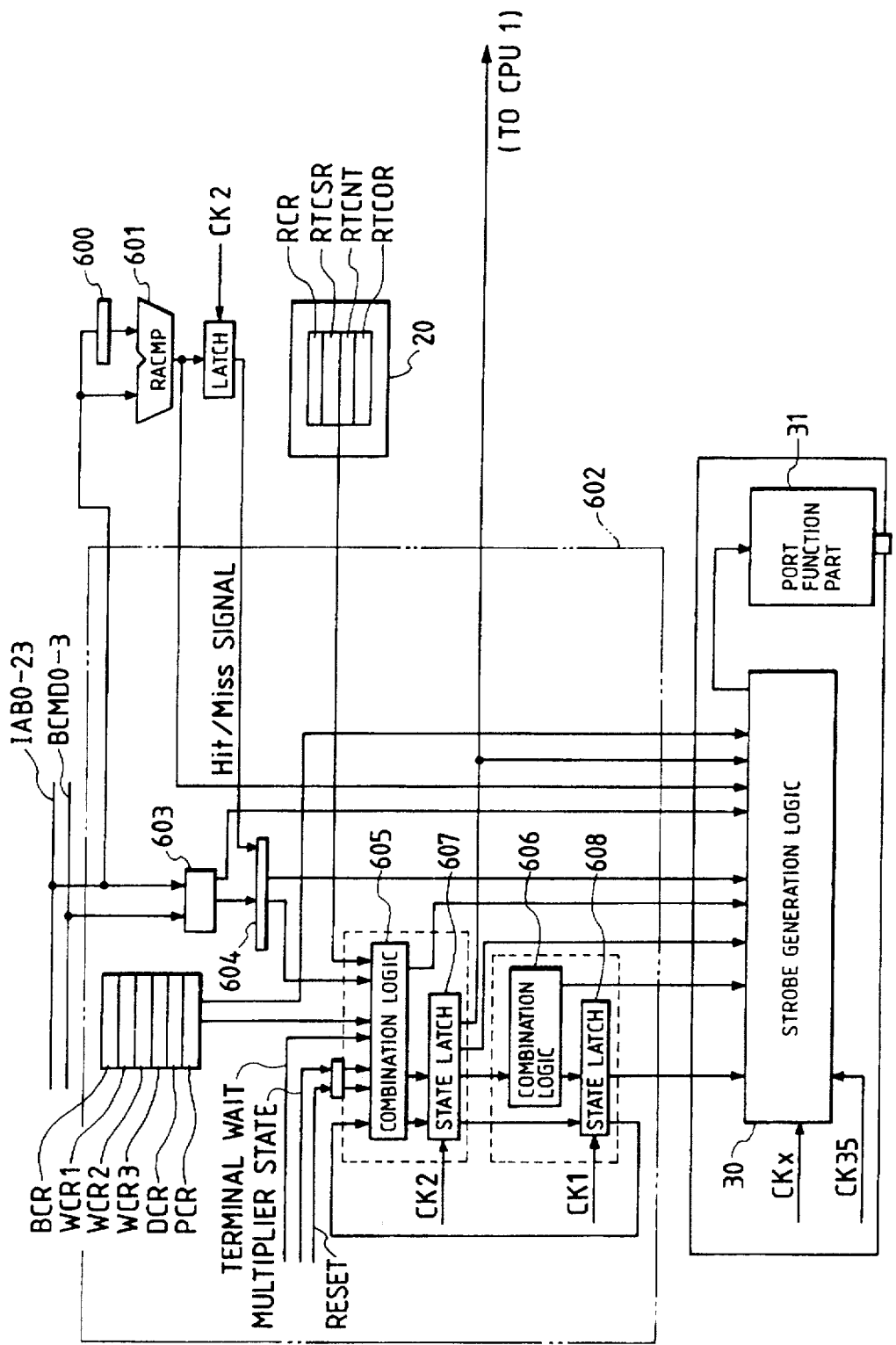
FIG. 7 is a more detailed block diagram of the bus state controller with its components centering around an external access bus state machine.
Figure 8:
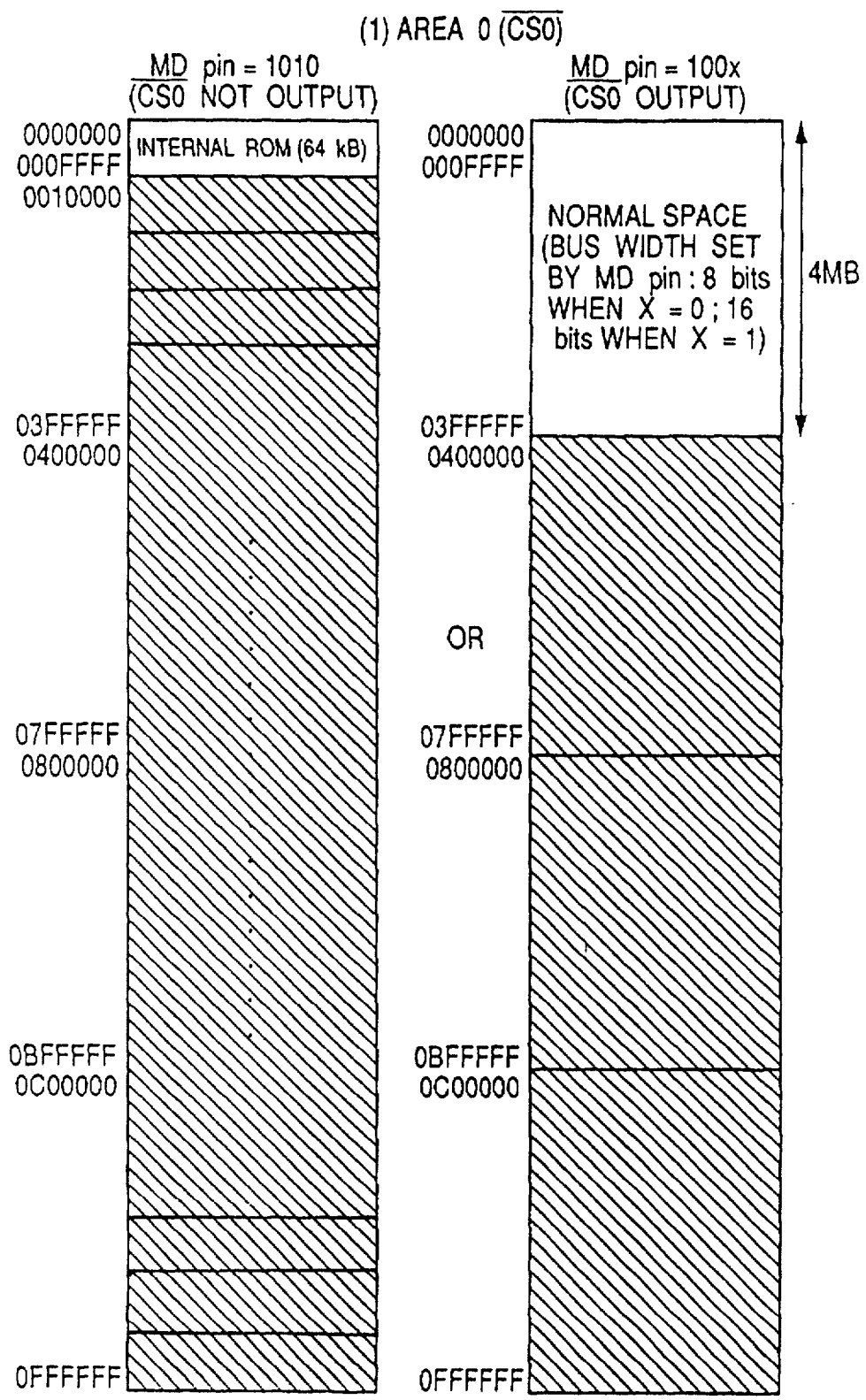
FIG. 8 is an address map of area 0 after division of the address space in the embodiment.
Figure 9:
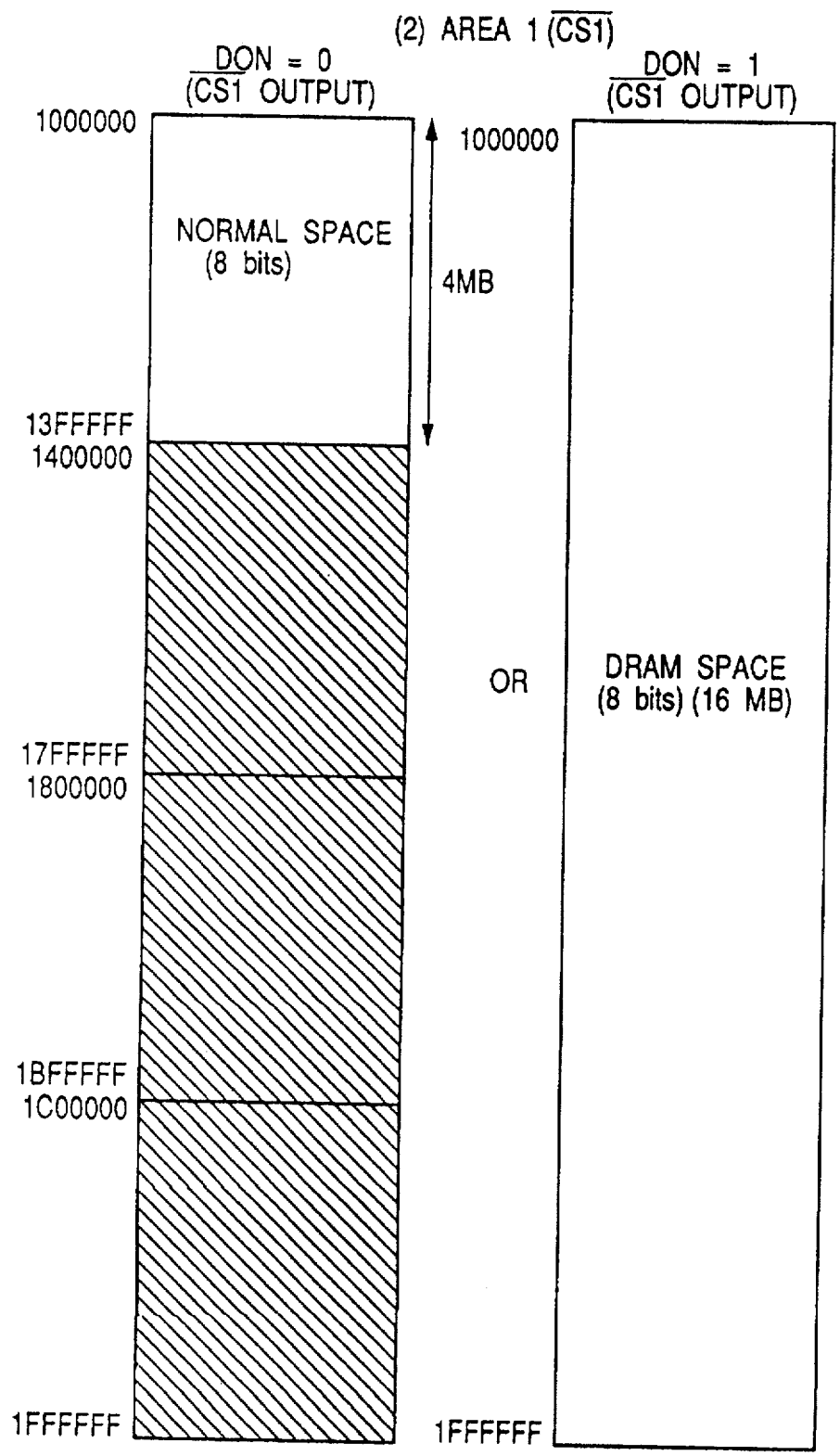
FIG. 9 is an address map of area 1 after address space division.
Figure 10:
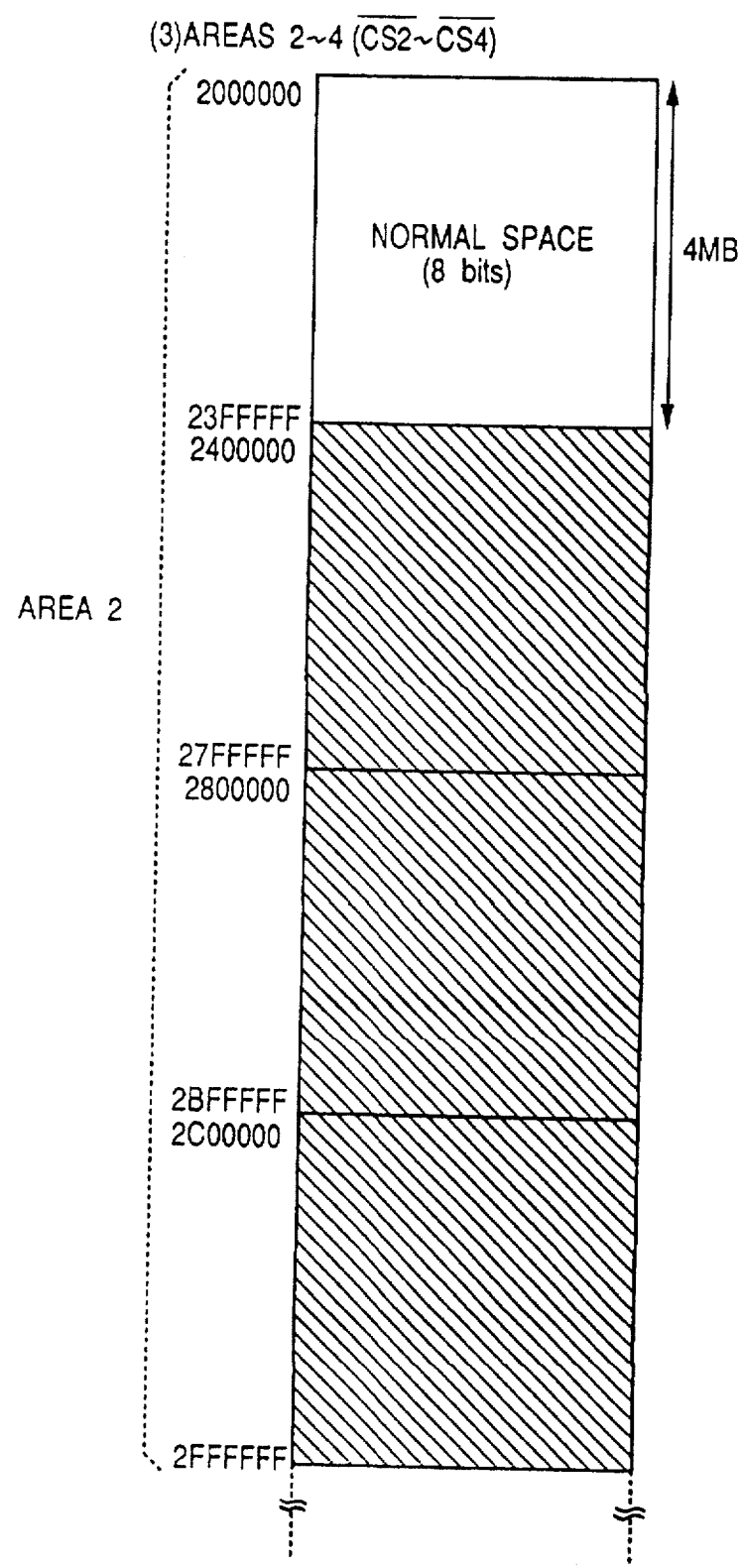
FIG. 10 is an address map of area 2 after address space division.
Figure 11:
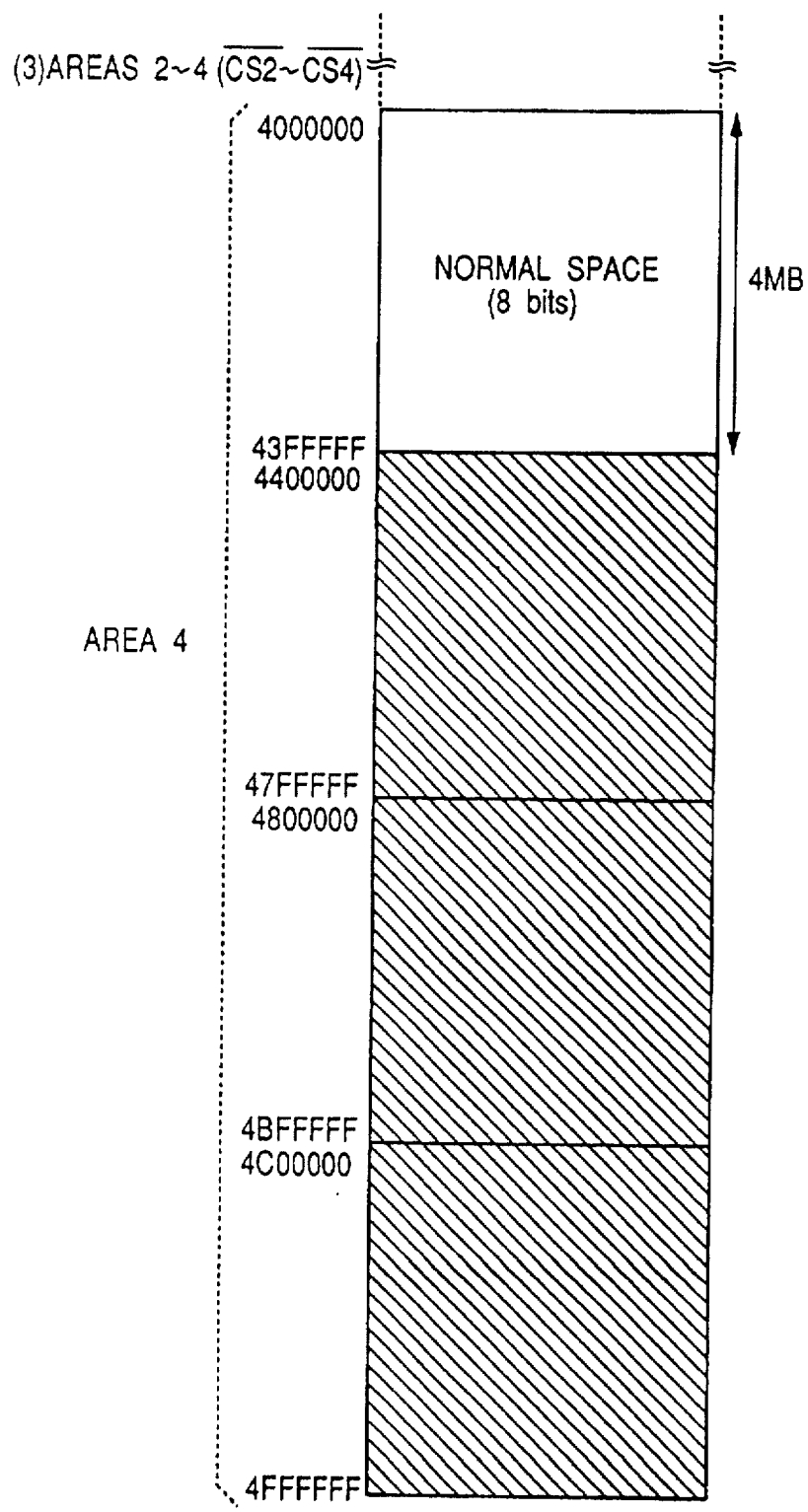
FIG. 11 is an address map of area 4 after address space division.
Figure 12:
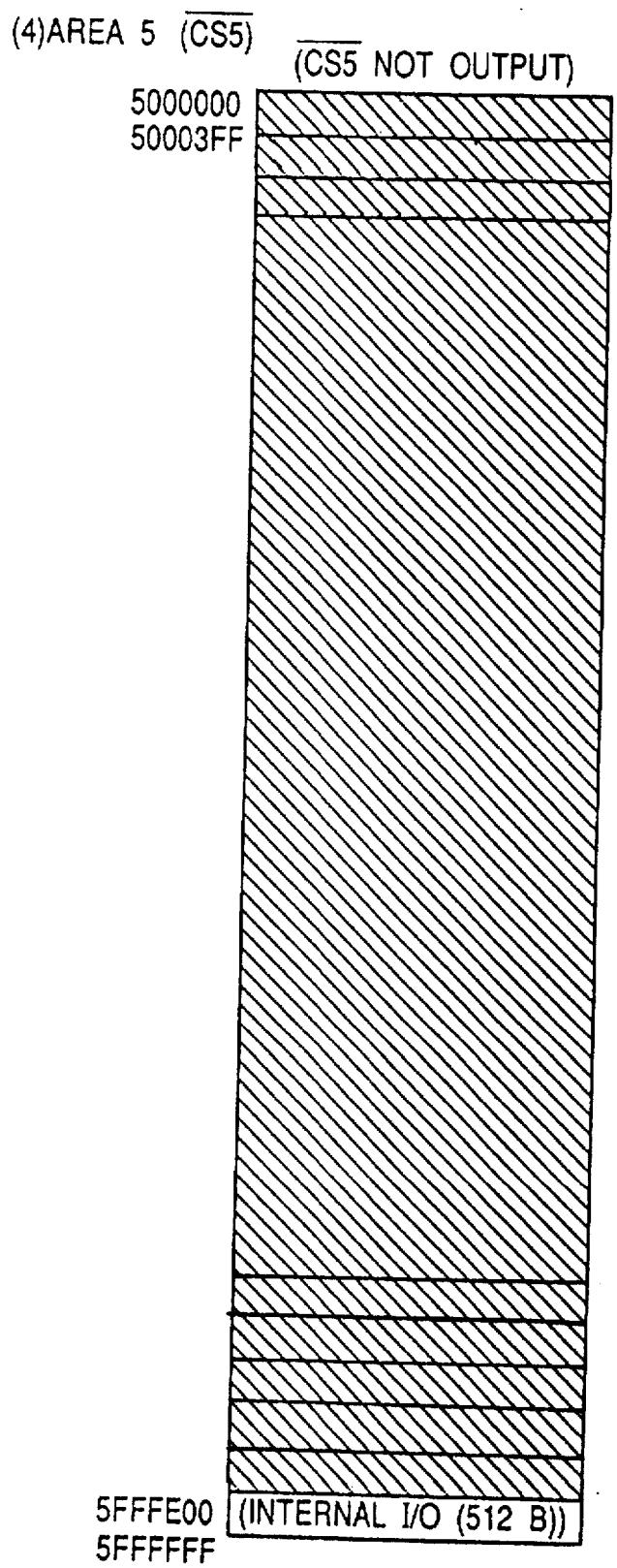
FIG. 12 is an address map of area 5 after address space division.
Figure 13:
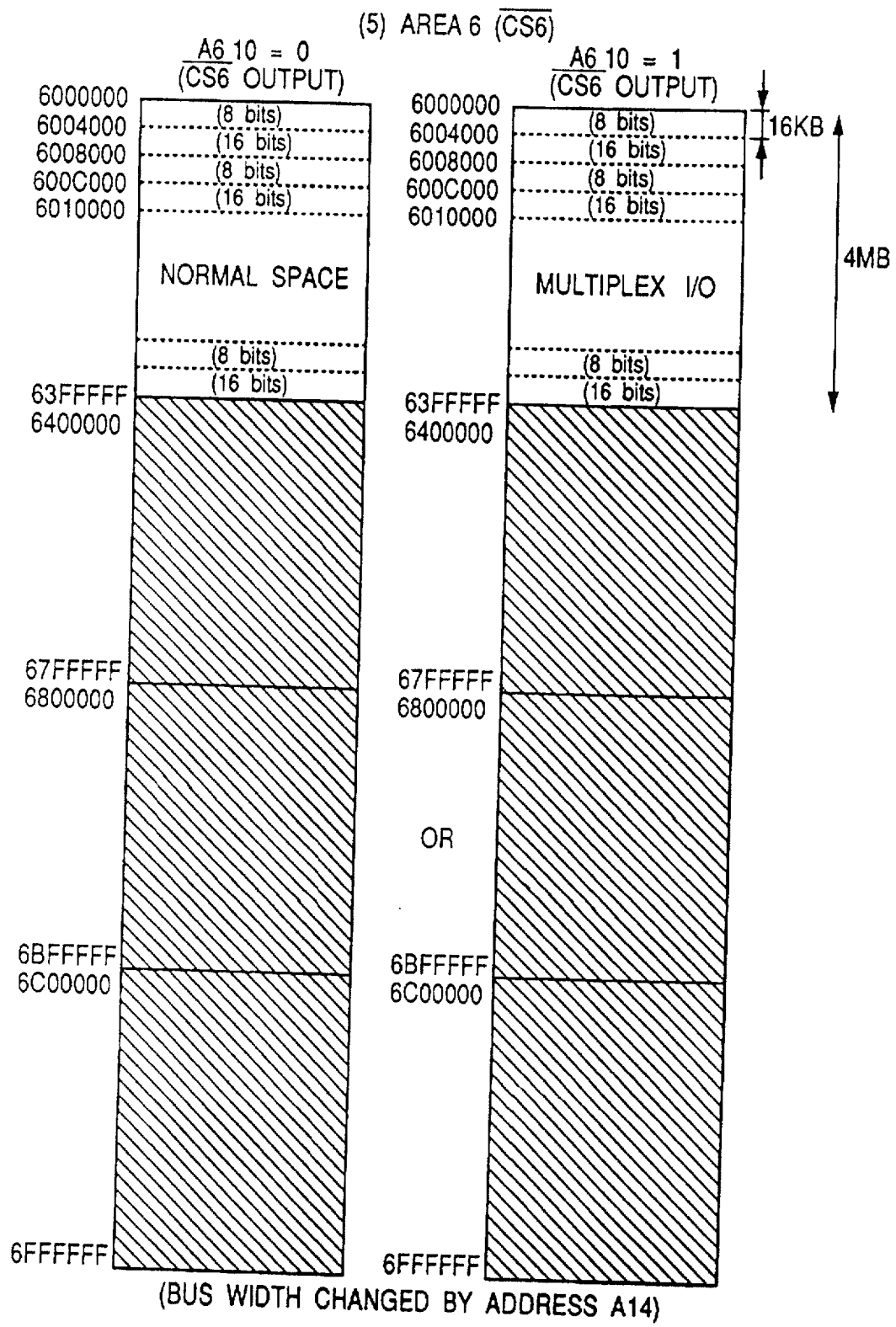
FIG. 13 is an address map of area 6 after address space division.
Figure 14:
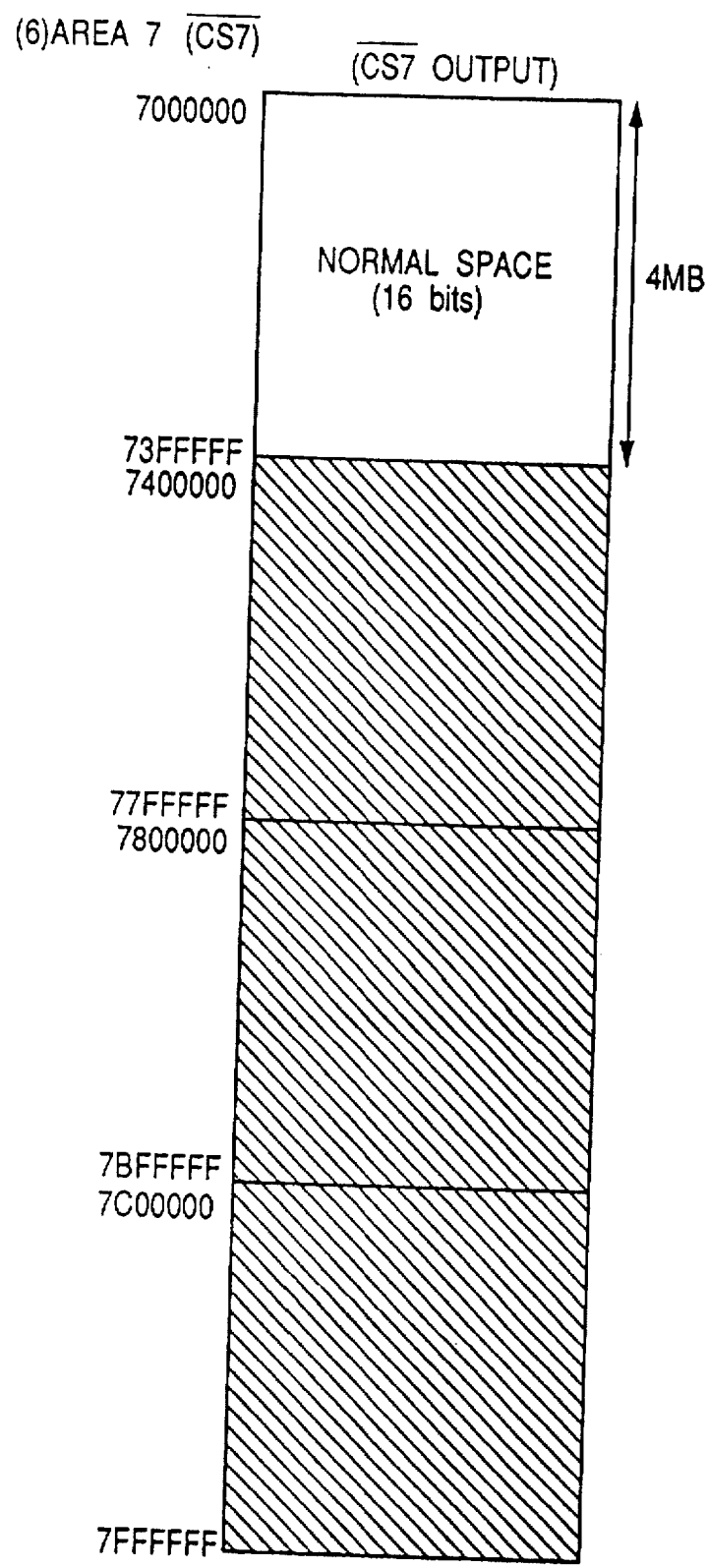
FIG. 14 is an address map of area 7 after address space division.
Figure 15:
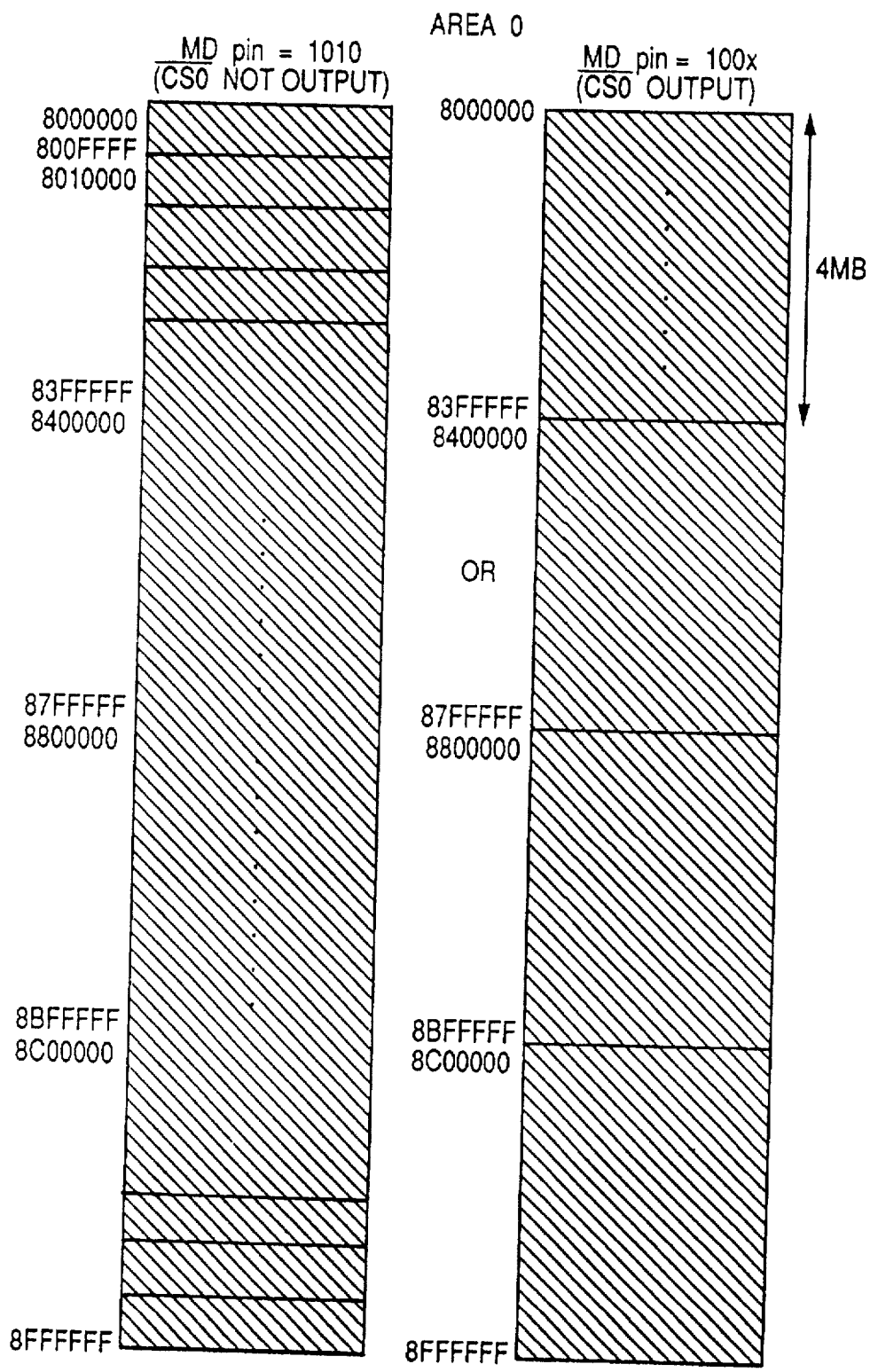
FIG. 15 is another address map of area 0 after address space division.
Figure 16:
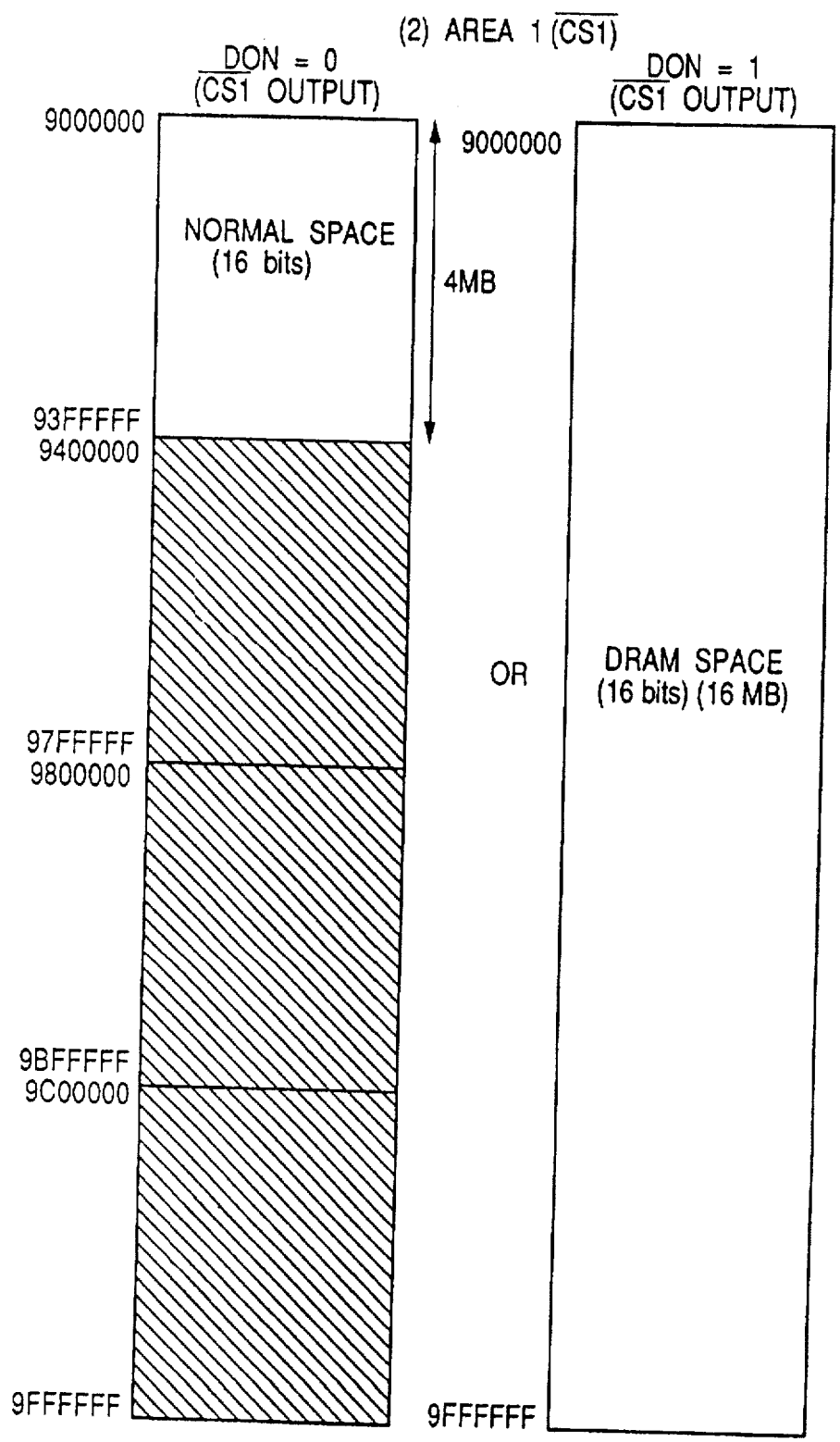
FIG. 16 is another address map of area 1 after address space division.
Figure 17:
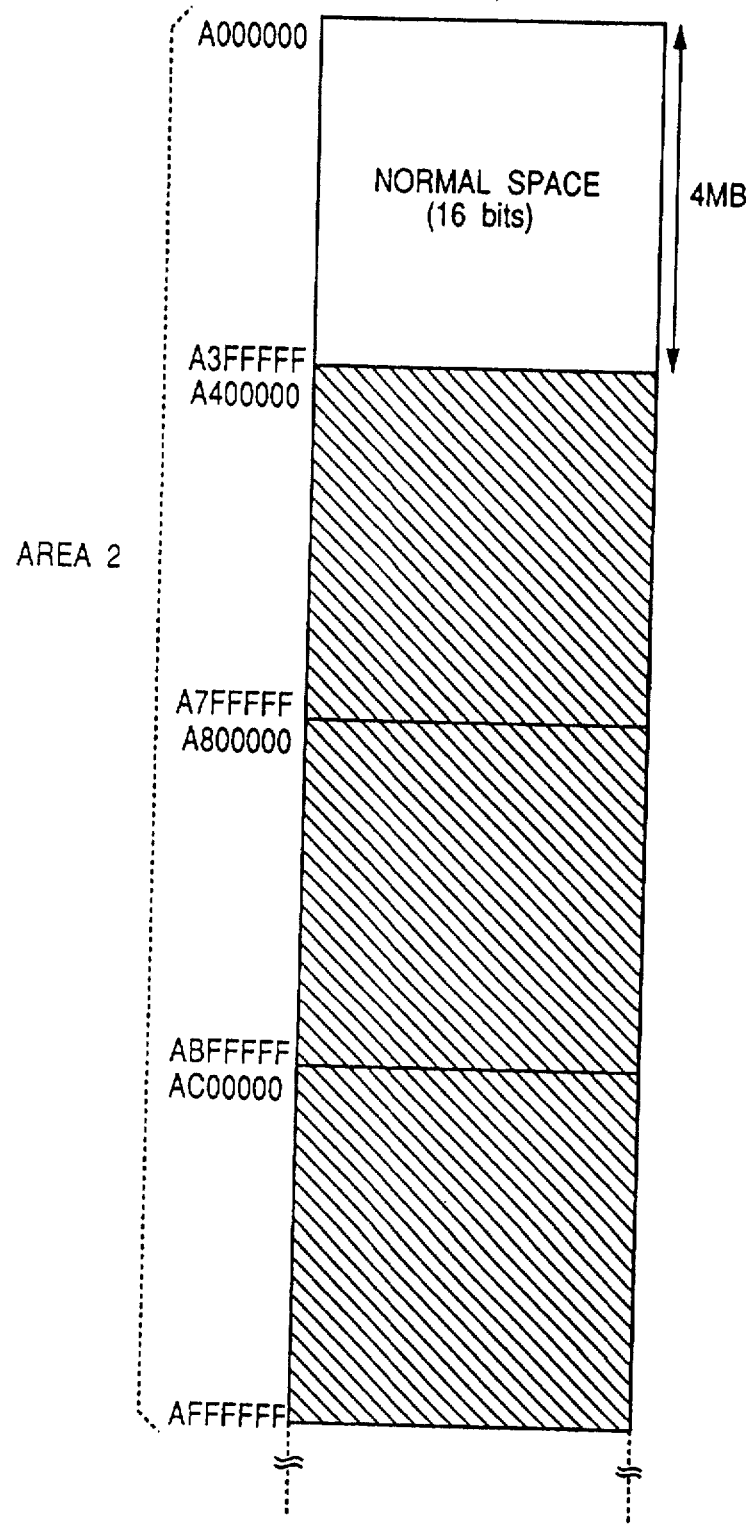
FIG. 17 is another address map of area 2 after address space division.
Figure 18:
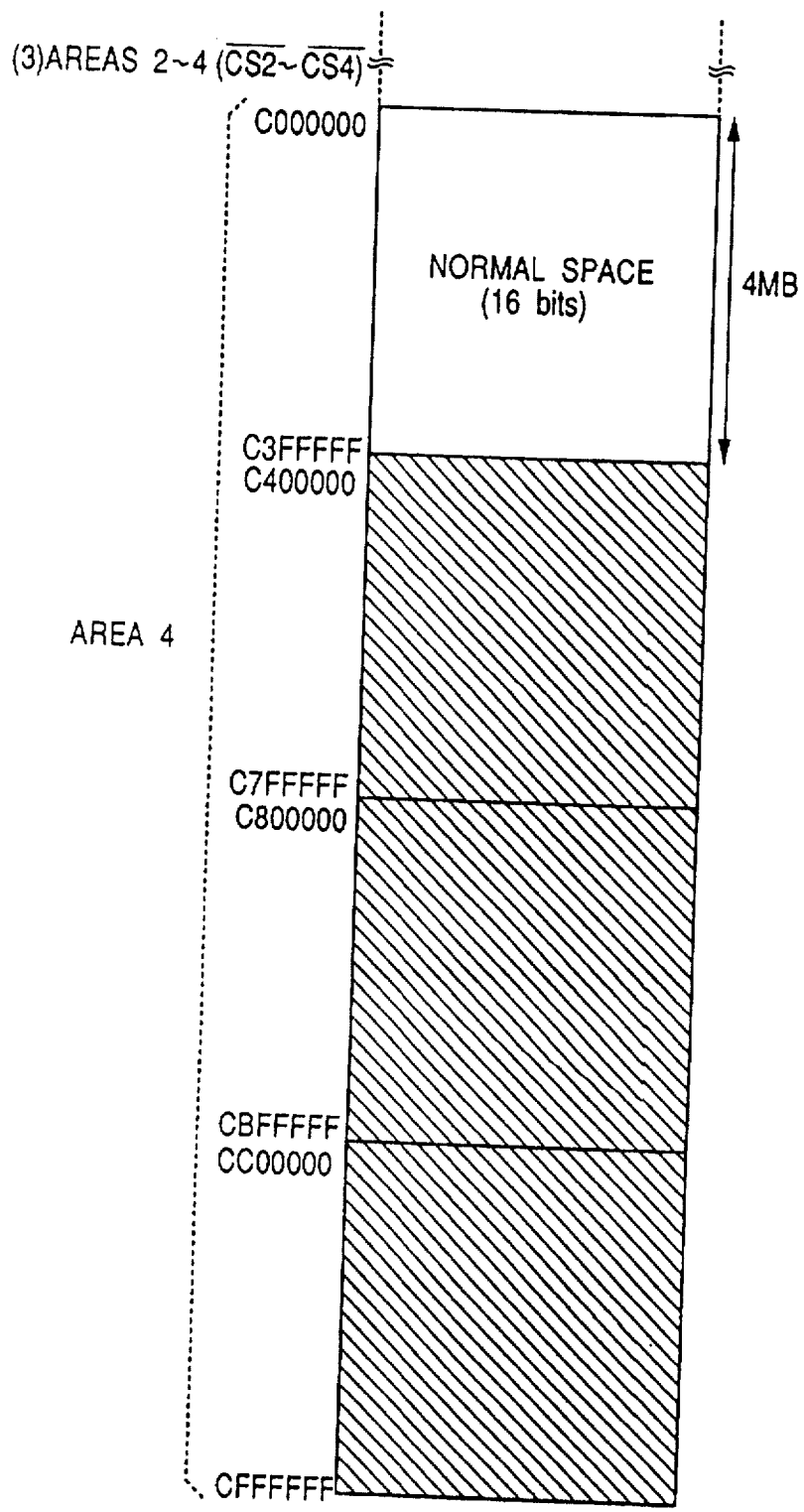
FIG. 18 is another address map of area 4 after address space division.
Figure 19:
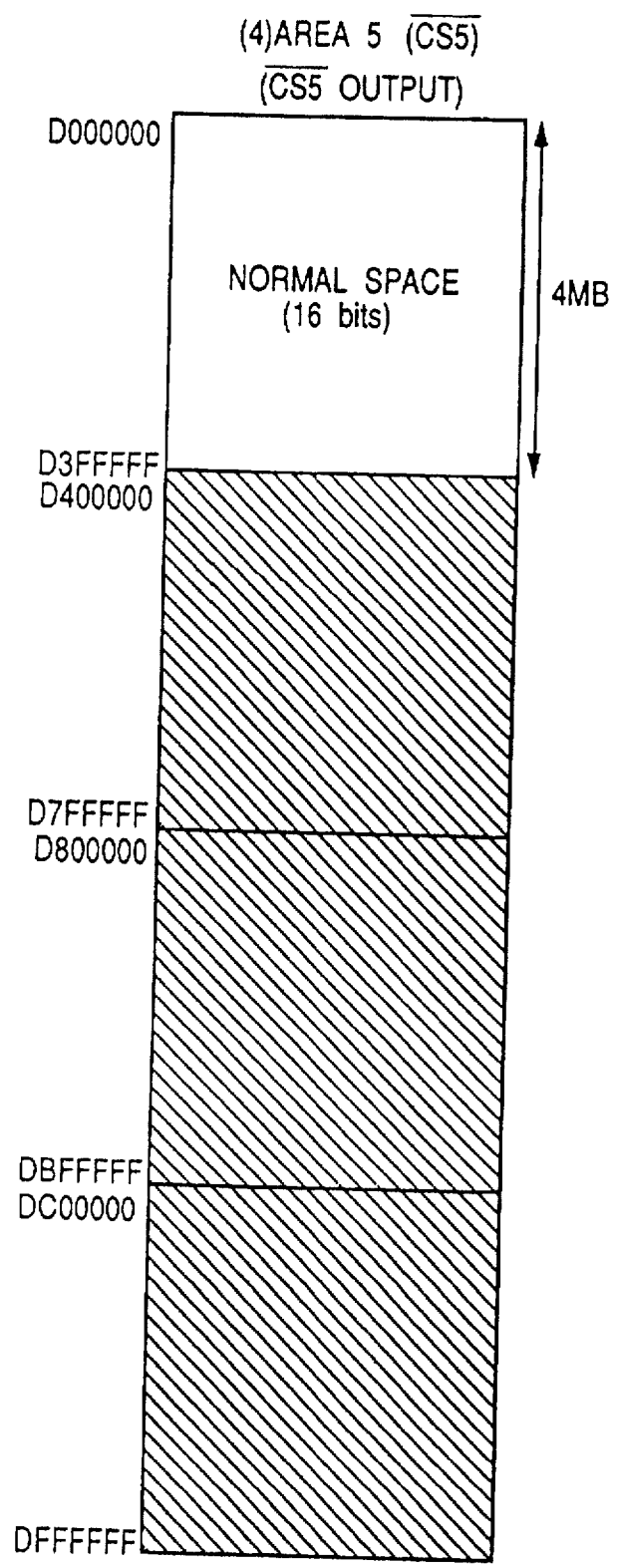
FIG. 19 is another address map of area 5 after address space division.
Figure 20:
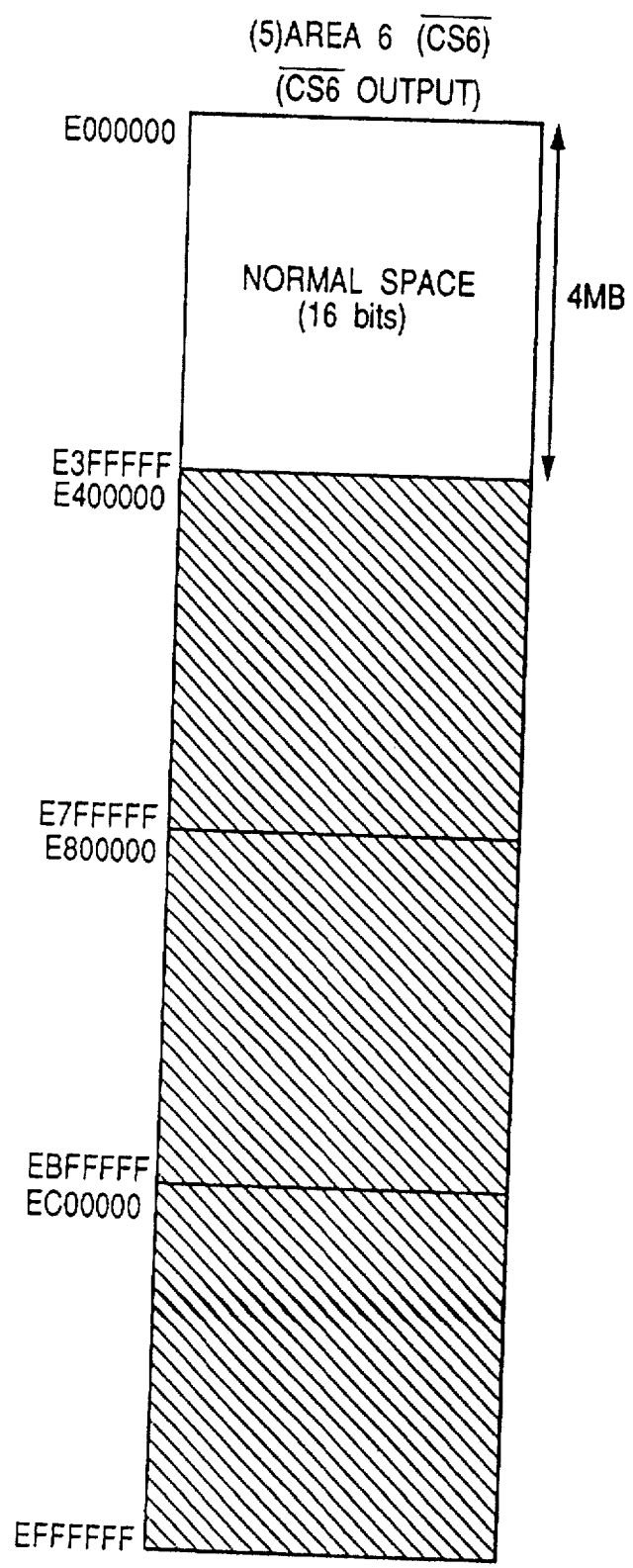
FIG. 20 is another address map of area 6 after address space division.
Figure 21:
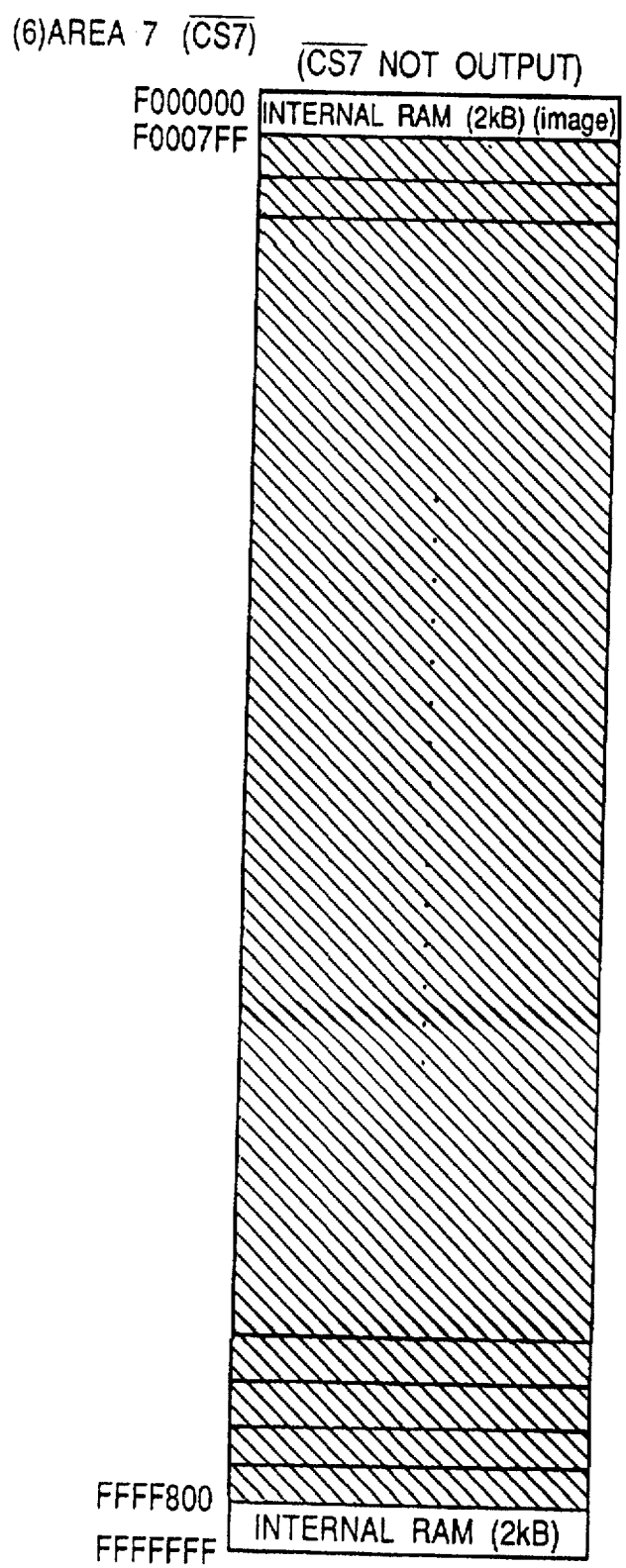
FIG. 21 is another address map of area 7 after address space division.

FIG. 7 is a more detailed block diagram of the bus state controller 6 with its components centering around the external access bus state machine 602. The bus state controller 6 will be described in more detail with reference to FIG. 7.

In FIG. 7, the bus state controller 6 comprises a decoder 603; a latch 604 that receives the output of the decoder; control registers BCR, WCR1, WCR2, WCR3, DCR and PCR; combination logic circuits 605 and 606; and state latches 607 and 608. The decoder 603 acquires basic information necessary for external bus access control by decoding appropriate bits in the I/O bus command and address signal coming from the bus control command bus BCMD0-3. The acquired information designates illustratively which of the areas resulting from address space division, to be described later, is to be accessed. Alternatively, the result of decoding the I/O command received specifies a Hit/Miss signal state reflecting the result of the comparison by the low-address comparator 601. The result thus acquired is held by the latch 604. The control registers BCR, WCR1, WCR2, WCR3, DCR and PCR have control bits for setting various functions of the bus state controller, as will be described later. These control bits are set as needed by the CPU 1. The combination logic circuits 605 and 606 as well as the state latches 607 and 608 receive the data held by the latch 604, the set values from the control registers BCR, WCR1, WCR2, WCR3, DCR and PCR, the output of the refresh counter 20, and the terminal wait state, in order to generate various control signals for generating the strobe signals for external access. With this embodiment, the control signals are generated in accordance with the state transition, to be described later. Illustratively, with the combination logic divided into two circuits, the state obtained from the output of each combination logic circuit is made to synchronize with a predetermined timing (i.e., in synchronism with the non-overlapping two-phase clock signals CK1 and CK2) and is latched by the state latches 607 and 608 before being fed back. The functions of the bus state controller 6 constituted as described above will now be described in detail.

The bus state controller 6 incorporated in the microcomputer MCU embodying the invention offers the following main features:

(1) Eight areas of an 4 MB linear space each may be supported. It should be noted that the DRAM has a space of 16 MB.

(2) An on-chip memory may be accessed in units of 32 bits in a single state.

(3) For each area, one chip select signal and an optimum memory interface signal corresponding to that area are output. Direct connection to the DRAM, SRAM or a peripheral chip is available without the intervention of glue logic.

(4) A DRAM direct connection interface is provided to support high-speed data transfer, to implement the CAS-before-RAS refresh scheme with efficiency, and to support a self-refresh mode (Icc of the DRAM=100 µA) which is also called battery backup mode. This contributes to reducing power dissipation not only in the microcomputer alone but also in the user's system as a whole.

(5) An I/O direct connection interface is provided to support an address/data multiplexing function as well as the address hold signal (AH*).

(6) Independent operations of external and internal access by the bus state machines (in a warp mode) are supported. This allows a store buffer arrangement (of one stage) to execute external memory I/O write operations and internal memory I/O access operations in parallel. It is also possible to carry out in parallel a cycle steal single DMA transfer operation and an internal memory I/O access operation by the CPU 1.

(7) A parity check function is supported so as to comply with systems requiring high levels of reliability such as hard disk (disc) drives (HDD's).

The state of the mode terminals MD3 through MD0 determines the kind of address map which shows the eight areas (0–7; 4 MB each) constituting the linear space supported by the microcomputer. For example, the state of the terminals MD3, MD2, MD1, MD0=1010 represents a mode with an internal ROM present; the state of the terminals MD3, MD2, MD1, MD0=1000 denotes a mode in which the bus width of area 0 is 8 bits with no internal ROM present; and the state of the terminals MD3, MD2, MD1, MD0=1001 stands for a mode in which the bus width of area 0 is 16 bits with no internal ROM present. FIGS. 8 through 21 show examples of address maps indicating each of the areas involved. Addresses in these address maps are arranged hexadecimally. FIGS. 8 through 14 sketch typical address maps of areas 0 through 7 ranging from address 0000000 to address 7FFFFFF, and FIGS. 15 through 21 illustrate typical address maps of areas 0 through 7 ranging from address 8000000 to address FFFFFFF. Whereas the former range of addresses in FIGS. 8 through 14 deals with an address space arranged in 8 bits, the latter range of addresses in FIGS. 15 through 21 covers an address space arranged in 16 bits. An address map of an area not using up the maximum space of 16 MB is not subject to the decoding of all address bits assigned thereto. In such a case, the address map apparently contains theoretical regions called shadows. The chip select signals CS1* through CS7 corresponding to the respective areas are output by decoding address bits A26 through A24. The switching between the bus widths of 8 and 16 bits is controlled by an address bit A27 (except for area 0 and areas 5 through 7). "DON=0" corresponds to "DRAM enable bit (DRAME)=0," which means that area 1 is used as a normal space. "DON=1" corresponds to "DRAME=1," which means that area 1 is used as a DRAM space.

The type of access with the microcomputer embodying the invention is identified by the type of the area to be accessed, i.e., by the way in which the linear space is divided with respect to the current operation mode. There are two types of access: (1) DRAM access and I/O access operations are carried out in specific areas. When a predetermined control bit DON is set (e.g., to 0), these areas are allowed to be used as a normal space. (2) The switching between 8-bit and 16-bit access (i.e., between 8-bit bus width and 16-bit bus width) is achieved using the bit A27 of the access address. This scheme allows any number of 8- and 16-bit memory regions to coexist in a single area.

The DRAM interface comprises address multiplexing and byte control functions. Specifically, an address multiplexing circuit is incorporated to output row addresses to the DRAM space. The address multiplexing circuit is implemented by use of the row/column address selector 32 of FIG. 6. Representative DRAM multiplexing requirements are met by furnishing an 8-bit/9-bit/10-bit multiplexing function. The byte control function involves selecting either a two-CAS signal scheme (CASL* and CASH*) or a two-WE signal scheme (WRH* and WRL*) as a byte control signal scheme to be in effect upon direct connection to a DRAM arranged in 16 or 18 bits.

There are two precharge cycles regarding the DRAM to choose from. That is, either one precharge cycle (of 1 state) or two precharge cycles (of 2 states) is to be selected. This scheme is provided to deal subsequently with cases in which the clock frequency of the CPU 1 is so raised and the period per cycle so shortened that a sufficient precharge period for the DRAM will not be secured.

A DRAM burst mode is also supported. The microcomputer embodying the invention includes a DRAM row address comparator allowing DRAM burst transfers to occur when DRAM access operations are performed consecutively to the same row address. That DRAM row address comparator is implemented using the row address comparator 601 of FIG. 1. When an access operation to an address in the DRAM area involves the same row address as that of the preceding access to the DRAM area, a burst access (high-speed page access) operation is started.

Figure 35:
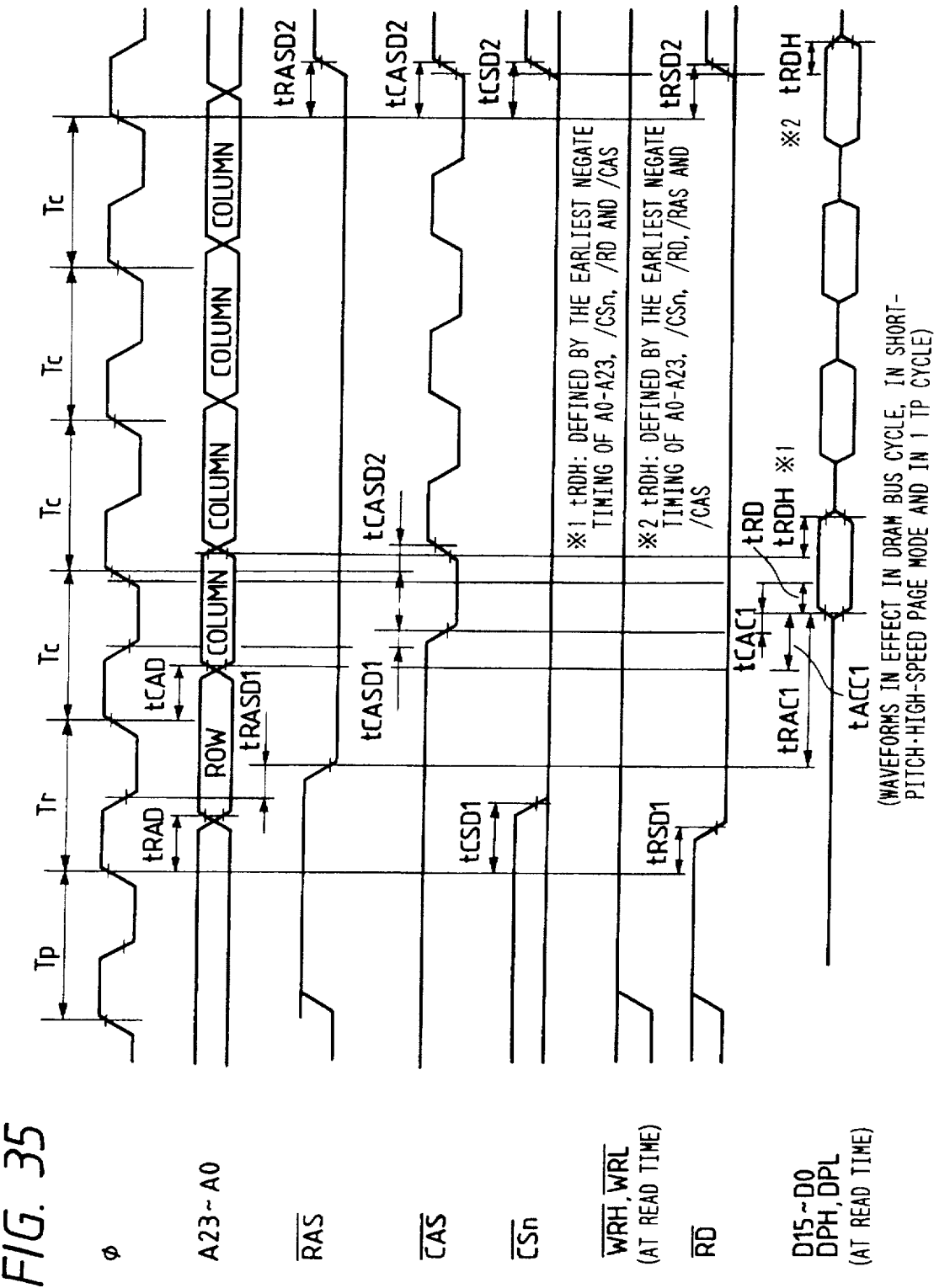
FIG. 35 is a typical read operation timing chart in effect in short-pitch high-speed page mode.
Figure 36:
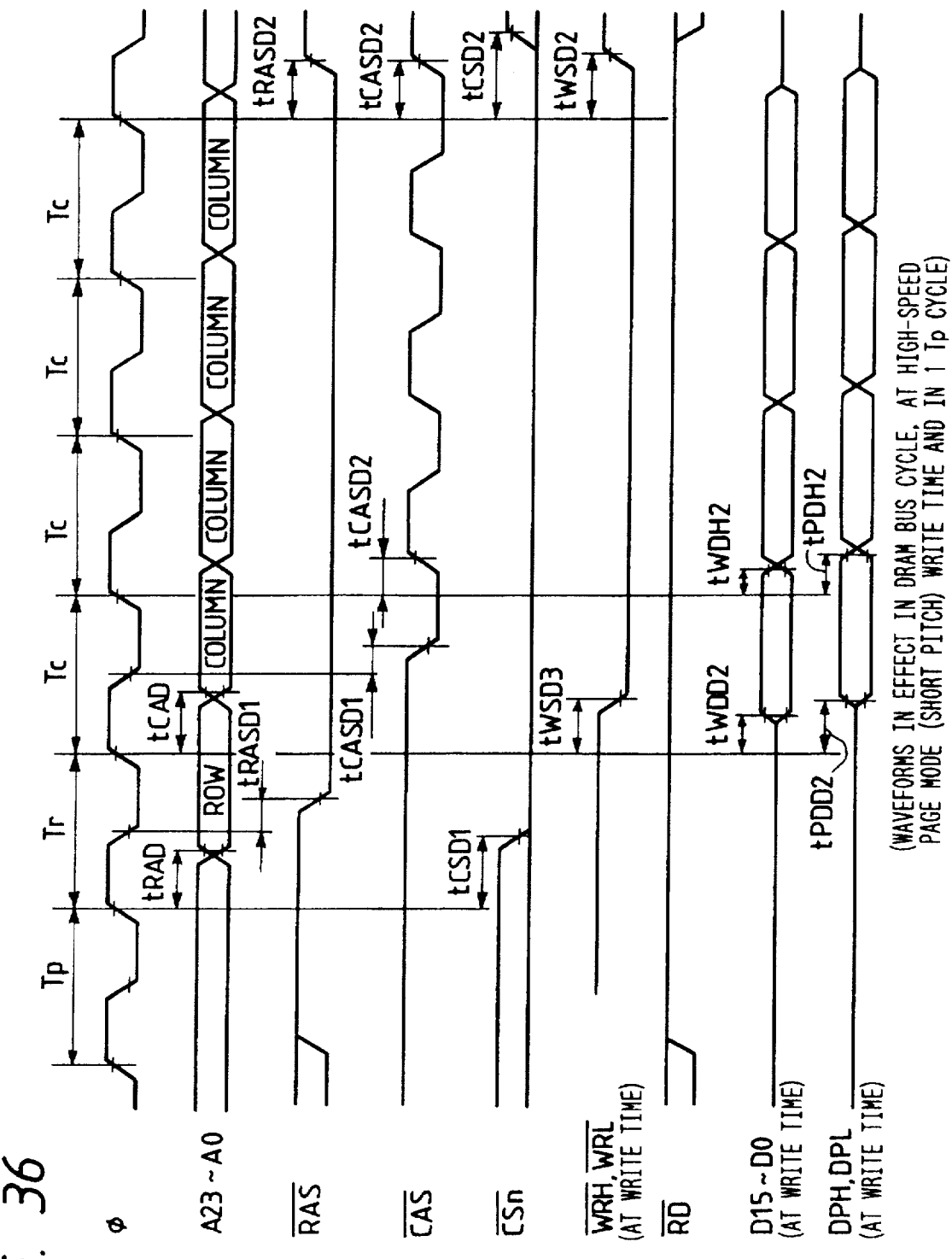
FIG. 36 is a typical write operation timing chart in effect in short-pitch high-speed page mode.

The following two schemes of burst access to the DRAM are provided:

(1) A short-pitch high-speed page mode is provided to output, one pulse per cycle, the column address strobe signals CASL* and CASH* as long as the row address remains the same. This mode is used when the memory speed is high compared with the operating frequency of the CPU 1. An interface scheme based on this mode may be used for a DRAM that supports high-speed page mode. That is, the DRAM may be accessed for read and write operations performed in a single cycle each. FIG. 35 is a typical read operation timing chart in effect in short-pitch high-speed page mode, and FIG. 36 is a typical write operation timing chart in effect in the same mode.

Figure 37:
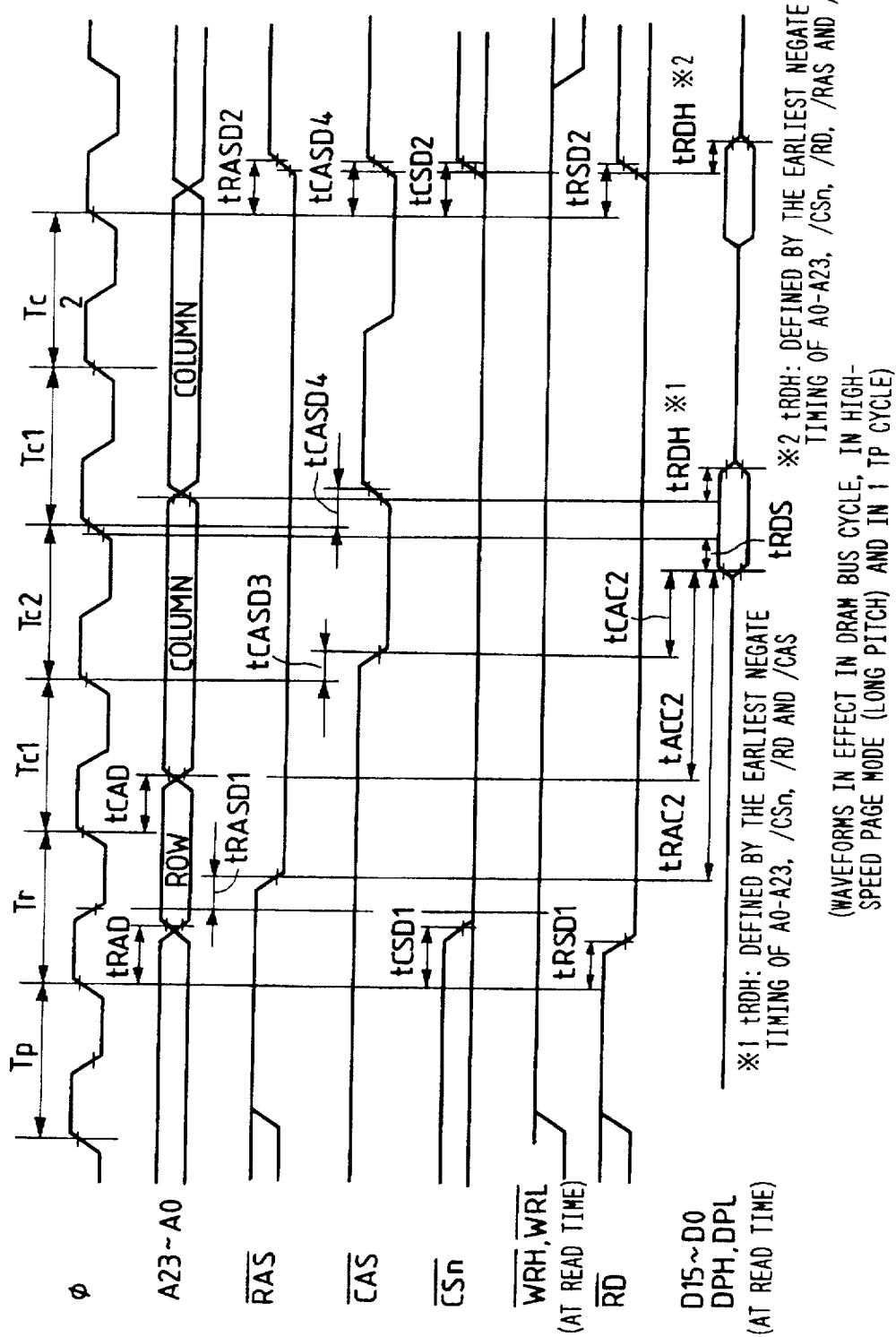
FIG. 37 is a typical read operation timing chart in effect in long-pitch high-speed page mode.

(2) A long-pitch high-speed page mode is provided to output the column address strobe signals CASL* and CASH* at double the CK (clock) frequency as long as the row address remains the same. This mode is used when the speed of the CPU 1 is high compared with the DRAM access time. An interface scheme based on this mode may be used for a DRAM that supports high-speed page mode. Such a DRAM may be accessed for read and write operations performed in two cycles each. FIG. 37 is a typical read operation timing chart in effect in long-pitch high-speed page mode.

The bus state controller 6 has RAS down-wait and RAS up-wait functions. If instructions alone are placed in the DRAM, the hit rate becomes very high but it remains unknown whether or not requests continue for access to the DRAM space. Thus the next access to the DRAM space is awaited while the DRAM row address strobe signal RAS* is being asserted. This is called RAS down-wait mode. In this mode, burst transfers may be carried out even if a request is made for access to another space halfway during access to the DRAM space. The user may optionally select either RAS down-wait mode or RAS up-wait mode. In RAS up-wait mode, burst transfers are performed only if continuous requests are made for access to the DRAM. In RAS down-wait mode, the row address strobe signal RAS* is negated (i.e., held at the High level) after a CAS-before-RAS refresh operation is completed and until the next request for access to the DRAM arrives.

The bus state controller 6 has DRAM self-refresh mode. Some DRAM's have self-refresh mode as a sort of standby mode in which the refresh timing and refresh address are generated. These DRAM's enter self-refresh mode by bringing Low the column and row address strobe signals in a predetermined sequence. To access a DRAM area in self-refresh mode involves effecting the sequence in which the access operation is started in self-refresh mode followed by full access and finished in self-refresh mode. Self-refresh mode is reached automatically after the access.

A refresh controller is provided to refresh the DRAM on a CAS-before-RAS basis. The refresh interval and the format of refresh control may be set by a refresh control register (RCR).

The bus state controller 6 has a function for inserting a wait state during access to the DRAM. The wait state inserting function, applicable to DMA single cycles alone, makes it unnecessary to match the number of states for access to a given space region with the slowest I/O circuit when I/O circuits of low DMA transfer rates are accessed in single cycles.

The bus state controller also has a function for multiplexing addresses onto the data bus to permit direct interface to many peripheral chips. The multiplexing function reduces the number of the pins involved although it lowers the bus cycle speed. When an application-specific IC (ASIC) is interfaced, the function reduces the number of pins on the ASIC side. This kind of I/O connecting feature is implemented by:

(1) incorporating an interface for multiplexing addresses onto the data bus;

(2) supporting the address hold signal (at the AH* pin); and (3) supporting individually the read and write enable signals at the RD* and WR* pins.

The number of bus cycles is 4 for read and write operations. The insertion of a terminal wait state is possible regardless of the value of the WS or RS bit in the bus control register.

The bus state controller 6 supports warp mode. Warp mode is a mode in which the microcomputer and DMAC are run at their highest speeds when an externally attached memory is used. In warp mode, the external and internal buses overlap in their operations during part of their bus cycles. (It should be noted that one cycle of the internal bus is always consumed.) Setting the warp bit (WARP) in the bus control register (BCR) causes warp mode to be entered. In warp mode, the internal ROM/RAM and I/O access operations 1 are made to overlap when executed by the CPU 1. In warp mode, the write operation to an external location is performed by suitably managing a one-stage store buffer arrangement. In cycle steal mode, a single DMA transfer to an external memory consumes the internal bus bandwidth by only one cycle. Thereafter, the bus right is passed from the DMAC to the CPU 1. Normal mode is entered when the warp bit (WARP) in the bus control register (BCR) is set. After this, external and internal bus operations are carried out serially.

<6. Control registers of the bus state controller>

The control registers for setting the above-mentioned functions include the bus control register BCR, wait state control registers WCR1, WCR2 and WCR3, DMA area control register DCR, parity control register PCR, refresh control register RCR, a refresh timer control/status register RTCSR, a refresh timer counter RTCNT, and a refresh time constant register RTCOR.

The bus control register BCR is used to set area-wise controls. The register has the following five effective bits:

(1) A DRAM enable bit {DRAME}

The DRAM enable bit is used to designate whether area 1 is to be used as a normal space or as a DRAM space. Setting this bit to 1 enables the strobe signals RAS*, CASL* and CASH*. The set value in the DRAM area control register becomes effective only when this bit is set to 1.

(2) An I/O enable bit {IOE}

The I/O enable bit is used to designate whether an I/O access cycle is to be carried out on area 6 for address multiplexing. When this bit is set to "0," area 6 is regarded as a normal space; when the bit is set to "1," area 6 is regarded as an I/O space.

(3) A WARP mode on/off control bit {WARP}

The WARP mode on/off control bit enables normal mode when set to "0" and enables warp mode when set to "1." In normal mode, the external and internal buses operate integrally. With warp mode in effect and where the external and internal buses may be accessed in parallel (DMA write operation and cycle steal single DMA transfer by the CPU to an external location), the consumption of one cycle is followed by an internal bus access operation without waiting for the external bus access to end; the internal and the external bus access operations overlap.

(4) A bit for control over dead cycle insertion after write cycle {DEAD}

This bit keeps a dead cycle from getting inserted when set to "0" and allows a deal cycle to be inserted when set to "1." The bit is used to designate whether or not to insert a dead cycle next to every external write cycle. Inserting the deal cycle prevents data collision when the external write cycle is followed by a read access cycle directed at the normal space.

(5) A byte access select bit {BAS}

The byte access select bit is used to designate whether the word space access operation is to be controlled by the WRH*, WRL* and A0 signals, or by the WR*, HBS* and LBS* signals. When set to "1," this bit allows the WRH*, WRL* and A0 terminals to be used as WR*, HBS* and LBS* strobe terminals.

The wait state control register WCR1 has 16 effective bits. Of these bits, bit RW7 through RW0 are used for wait state control on read operations and bits WW7 through WW0 are used for wait state control on write operations.

(1) The RW field includes the bits corresponding respectively to the allocated areas (i.e., 8 areas of 4 MB each). Each bit serves as a flag that designates whether or not to perform data transfer to the corresponding area (for writing thereto) using the minimum number of states. If data transfer is carried out by use of the minimum number of states, the external wait terminal is not sampled; if data transfer is performed using a number of states greater than the minimum state count, the external wait terminal is sampled. In the latter case, a wait state is inserted if the external wait terminal is found to be brought Low. Some areas are assigned a long wait state inserting function whereby a wait state is inserted as a result of a logical OR operation on the external terminal. With the I/O space, the external wait terminal is sampled in four cycles for a read or write operation regardless of the setting of this bit. The number of bus cycles and the availability of wait insertion for the DRAM space are determined by the set value of the BM bit in the DRAM area control register; they are not dependent on the set values of the bits in the RW field. The bits RW7 through RW0 designate the absence of sampling (fixed to 1 wait state) when set to "0" and specify the execution of sampling when set to "1" (2 wait states or more).

(2) The WW field includes the bits corresponding respectively to the allocated areas. Each bit serves as a flag that designates whether or not to perform data transfer to the corresponding area (for writing thereto) using the minimum number of states. If data transfer is carried out by use of the minimum number of states, the external wait terminal is not sampled; if data transfer is performed using a number of states greater than the minimum state count, the external wait terminal is sampled. In the latter case, a wait state is inserted if the external wait terminal is found to be brought Low. Some areas are assigned a long wait state inserting function whereby a wait state is inserted as a result of a logical OR operation on the external terminal. With the I/O space, the external wait terminal is sampled in four cycles for a read or write operation regardless of the setting of this bit. The number of bus cycles and the availability of wait insertion for the DRAM space are determined by the set value of the BM bit in the DRAM area control register; they are not dependent on the set values of the bits in the WW field. The bits WW7 through WW0 designate the absence of sampling (fixed to 1 wait state) when set to "0" and specify the execution of sampling when set to "1" (2 wait states or more).

The wait state control register WCR2 comprises 16 effective bits divided into two fields: DRW7 through DRW0, and DWW7 through DWW0.

(1) Each of the bits DRW7 through DRW0 designates whether or not to insert a wait state solely in a DMA single transfer operation to an area (DMA single cycle memory read operation). When set to "0," each bit of the DRW field designates that no wait state is to be inserted; when set to "1," the bit designates the insertion of a wait state. The bits of the DRW field correspond respectively to the allocated areas. Each bit serves as a flag that designates whether or not to perform a single DMA memory read cycle operation to the corresponding area using the minimum number of states. If data transfer is carried out by use of the minimum number of states, the external wait terminal is not sampled; if data transfer is performed using a number of states greater than the minimum state count, the external wait terminal is sampled. In the latter case, a wait state is inserted if the external wait terminal is found to be brought Low. Some areas are assigned a long wait state inserting function whereby a wait state is inserted as a result of a logical OR operation on the external terminal. With the I/O space, the external wait terminal is sampled in four cycles for a read or write operation regardless of the setting of this bit. The number of bus cycles and the availability of wait insertion for the DRAM space are determined by the set value of the BM bit in the DRAM area control register; they are not dependent on the set values of the bits in the DRW field.

(2) Each of the bits DWW7 through DWW0 designates whether or not to insert a wait state solely in a DMA single transfer operation to an area (DMA single cycle memory write operation). When set to "0," each bit of the DWW field designates that no wait state is to be inserted; when set to "1," the bit designates the insertion of a wait state. The bits of the DWW field correspond respectively to the allocated areas. Each bit serves as a flag that designates whether or not to perform a single DMA memory write cycle operation to the corresponding area using the minimum number of states. If data transfer is carried out by use of the minimum number of states, the external wait terminal is not sampled; if data transfer is performed using a number of states greater than the minimum state count, the external wait terminal is sampled. In the latter case, a wait state is inserted if the external wait terminal is found to be brought Low. Some areas are assigned a long wait state inserting function whereby a wait state is inserted as a result of a logical OR operation on the external terminal. With the I/O space, the external wait terminal is sampled in four cycles for a read or write operation regardless of the setting of this bit. The number of bus cycles and the availability of wait insertion for the DRAM space are determined by the set value of the BM bit in the DRAM area control register; they are not dependent on the set values of the bits in the DWW field.

The wait state control register WCR3 has five effective bits. Each of the bits will be described below.

(1) A WPU bit is used for pull-up control over the wait terminal. When set to "0," the WPU bit designates that the wait terminal is not to be pulled up; when set to "1," the bit specifies that the wait terminal is to be pulled up.

(2) An A02LW0 bit and an A02LW1 bit are used to control long wait insertion regarding areas 0 and 2. When the two bits combine to indicate "0," "1," "2" or "3," then one, two, three or four cycles are to be inserted, respectively.

(3) An A6LW0 bit and an A6LW1 bit are used to control long wait insertion regarding area 6. When the two bits combine to indicate "0," "1," "2" or "3," then one, two, three or four cycles are to be inserted, respectively.

The DRAM area control register DCR has eight effective bits by which to provide state machine control and other controls regarding the DRAM area. Each of the bits will be described below.

(1) A CW2 bit

The CW2 bit is used to select either the two-CAS signal scheme or the two-WE signal scheme. The bit selects the two-CAS signal scheme when set to "0" and selects the two-WE signal scheme when set to "1." In this manner, DRAM's based on different control schemes are suitably dealt with. With the two-CAS signal scheme, the CASH*, CASL* and WR1L* terminals are used; with the two-WE signal scheme, the CASL*, WRH* and WRL* terminals are used. For an area with a data bus width of 8 bits, only the WR1L* and CASL* terminals are used.

(2) A RASD bit

The RASD bit is used to designate whether or not to perform a RAS down operation at access wait time. When set to "0," the bit specifies that the operation is not to be carried out; when set to "1," the bit designates that the operation is to be performed. What is decided with this bit is whether or not to hold down the RAS* signal to wait for the next DRAM access operation when access to the DRAM is interrupted.

(3) A TPV bit

The TPV bit is used to designate the number of precharge cycles (Tp cycles). When set to "0," the bit designates one state; when set to "1," the bit specifies two states. Where the CPU 1 is run at a high clock rate relative to a slow DRAM, one cycle may not be enough for a successful precharge timing. In such a case, as many precharge cycles as determined here are to be inserted to comply with the precharge timing.

(4) A BE bit

The BE bit is a burst operation enable bit. That is, the BE bit disables burst operation when set to "0" and enables burst operation when set to "1." If it is determined to disable burst operation, the row address is always missed and full access is therefore carried out in the mode set by a BM bit (to be described below). If it is decided to enable burst operation, a row address comparison is made and burst operation is carried out accordingly in the mode set by the BM bit.

(5) A BM bit

The BM bit is a burst operation option bit. That is, the BM bit designates long-pitch/high-speed page mode (2 states; external wait terminal sampled) when set to "0," and specifies short-pitch/high-speed page mode (1 state) when set to "1." The burst operation option is used to select an optimum method of burst access with respect to the relation between the operating frequency of the CPU 1 and the DRAM speed. With long-pitch/high-speed page mode in effect, the external wait state terminal is sampled.

(6) A MXE bit

The MXE bit is used to designate the presence or absence of multiplexing. The bit designates the presence of multiplexing when set to "1" and specifies the absence thereof when set to "0." The MXE bit is used to determine whether or not to implement multiplexing upon DRAM access.

(7) MXC1 and MXC0 bits The MXC1 and MXC0 bits are used to control the shift count in effect when row address multiplexing is implemented. The bits also control the switching of the settings in the row address comparator upon burst operation. The switching is carried out in three ways depending on the combined value of the two bits MXC1 and MXC0. When the bits indicate "0," the amount of row address shift is set to 8 bits, and the row address to be compared (for burst) is set to range from A8 to A27. When the bits denote "1," the amount of row address shift is set to 9 bits, and the row address to be compared (for burst) is set to range from A9 to A27. When the bits indicate "2," the amount of row address shift is set to 10 bits, and the row address to be compared (for burst) is set to range from A10 to A27. If the bits amount to "3," it is necessary to determine the number of bits by which to shift the row address downward when the row address is output.

The parity control register PCR comprises three effective bits for parity check control. Each of these three bits will be described below.

(1) A PFRC bit is used to designate whether or not to effect forced parity output. The bit designates no forced parity output when set to "0" and specifies the forced output of a High level when set to "1." This amounts to a forced parity output function for the testing of the parity error check function.

(2) A PEO bit is used to designate parity polarity. The bit designates even parity when set to "0" and specifies odd parity when set to "1."

(3) A PCHK bit is a parity check enable bit that is used to designate whether or not to perform parity check.

The refresh control register RCR is a control register that provides refresh-related controls. The RCR register comprises the following control bits:

(1) An RFSH bit is used to determine whether or not to carry out the DRAM refresh operation. When this bit is set to "0" (for not effecting the refresh operation), a refresh request cycle generating timer (to be described later) is made available for use as an interval timer.

(2) An RMODE bit designates the CAS-before-RAS (CBR) refresh mode when set to "0" and specifies the self-refresh mode when set to "1." When the RFSH bit is "1," setting the RMODE bit to "1" causes self-refresh mode to be entered immediately thereafter. Setting the RMODE bit to "0" causes a CBR refresh operation to be carried out at intervals set on an eight-bit interval timer.

The CBR refresh operation involves effecting the refresh action after the current bus cycle comes to an end if a refresh request occurs during an external write cycle or during DRAM area access. If a refresh request occurs during an external read cycle regarding something other than the DRAM area or during an internal module access cycle, the refresh action is carried out regardless of the bus cycle.

If the self-refresh operation is selected and if an external DRAM access cycle is not in effect, self-refresh mode is entered immediately after the RMODE bit is set. Although the refresh request counter keeps operating in the self-refresh mode, all refresh requests that may occur during the self-refresh period are ignored.

The refresh request cycle generating timer utilizes the eight-bit interval timer. This requires establishing set values that comply with the memory refresh request cycle and the CPU operating frequency. Furthermore, the following register structure is required of the refresh request cycle generating timer:

Refresh timer control/status register (RTCSR)

The register RTCSR is an eight-bit register that is readable and writable. This register is used to select the clock signal for input to the refresh timer counter RTCNT and to control interrupt requests. The register RTCSR comprises the following five bits:

(1) A compare match flag CMF

The compare match flag CMF is a status flag that indicates a match between the refresh timer counter RTCNT and the refresh time constant register RTCOR. This flag is cleared when, with CMF=1, the flag is read and then a zero is written thereto. The flag is set when RTCNT=RTCOR.

(2) A compare match interrupt enable CMIE

This bit is used to designate whether or not to enable, when the CMF of the RTCSR is set to "1," an interrupt request (CMI) contingent on the CMF.

(3) Clock select bits CKS2–CKS0

These bits constitute a readable and writable register that controls input clock selection as follows:

clock input inhibited when CKS2, CKS1, CKS0=0, 0, 0
$\phi/2$ when CKS2, CKS1, CKS0=0, 0, 1
$\phi/8$ when CKS2, CKS1, CKS0=0, 1, 0
$\phi/32$ when CKS2, CKS1, CKS0=0, 1, 1
$\phi/128$ when CKS2, CKS1, CKS0=1, 0, 0
$\phi/512$ when CKS2, CKS1, CKS0=1, 0, 1
$\phi/2048$ when CKS2, CKS1, CKS0=1, 1, 0
$\phi/4096$ when CKS2, CKS1, CKS0=1, 1, 1

Refresh timer counter RTCNT

The refresh timer counter RTCNT is an eight-bit up-counter that is incremented by use of the input clock signal. The clock signal to be input is selected by the select bits CKS2 through CKS0. The counter RTCNT is always accessible by the CPU 1 for write and read operations theretoand therefrom. When the value of the refresh timer counter RTCNT matches that of the refresh time constant register RTCOR, the counter RTCNT is cleared. The counter RTCNT is initialized to H'00 (H' means hexa-decimal) upon power-on reset.

Refresh time constant register RTCOR

The refresh time constant register RTCOR is an eight-bit register that is readable and writable. The value of the refresh time constant register RTCOR is continuously compared with that of the refresh timer counter RTCNT. When the two values match, the compare match flag CMF in the refresh timer control/status register RTCSR is set and the refresh timer counter RTCNT is cleared to H'00. When the RFSH bit in the refresh control register RCR is set to "1," a coincidence signal resulting from the match causes a refresh request signal to occur. The refresh time constant register RTCOR is initialized to H'00 upon power-on reset.

The above registers RCR, RTCSR, RTCNT and RTCOR admit data thereinto through write methods different from the write method for general registers. This is because these registers need to be protected against inadvertent write operations in view of the importance of refreshing these registers for data retention. Specifically, data may be written to these registers as follows:

(1) Writing data to the register RCR

A word transfer instruction is used to place H'5A in the high-order 8 bits and the target data in the low-order 8 bits.

(2) Writing data to the register RTCSR

A word transfer instruction is used to place H'5A in the high-order 8 bits and the target data in the low-order 8 bits.

(3) Writing data to the counter RTCNT A word transfer instruction is used to place H'69 in the high-order 8 bits and the target data in the low-order 8 bits.

(4) Writing data to the register RTCOR

A word transfer instruction is used to place H'69 in the high-order 8 bits and the target data in the low-order 8 bits.

These registers may be read in the same manner as general registers by use of a byte transfer instruction. When any of these register is read in units of words, the value read from the high-order 8 bits is H'00.

<7. State transition diagram of the internal access bus state machine>

Figure 24:
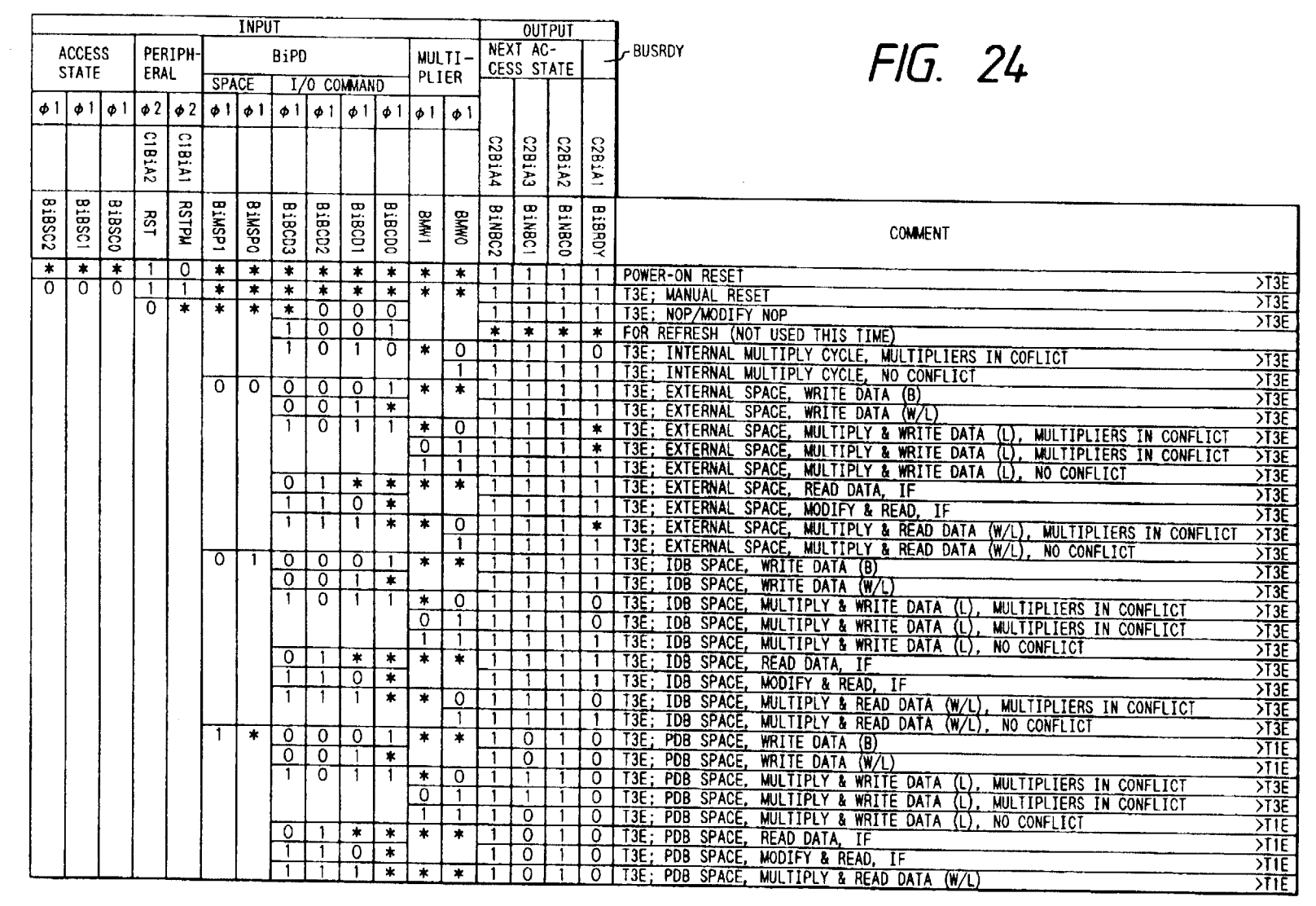
Figure 25:
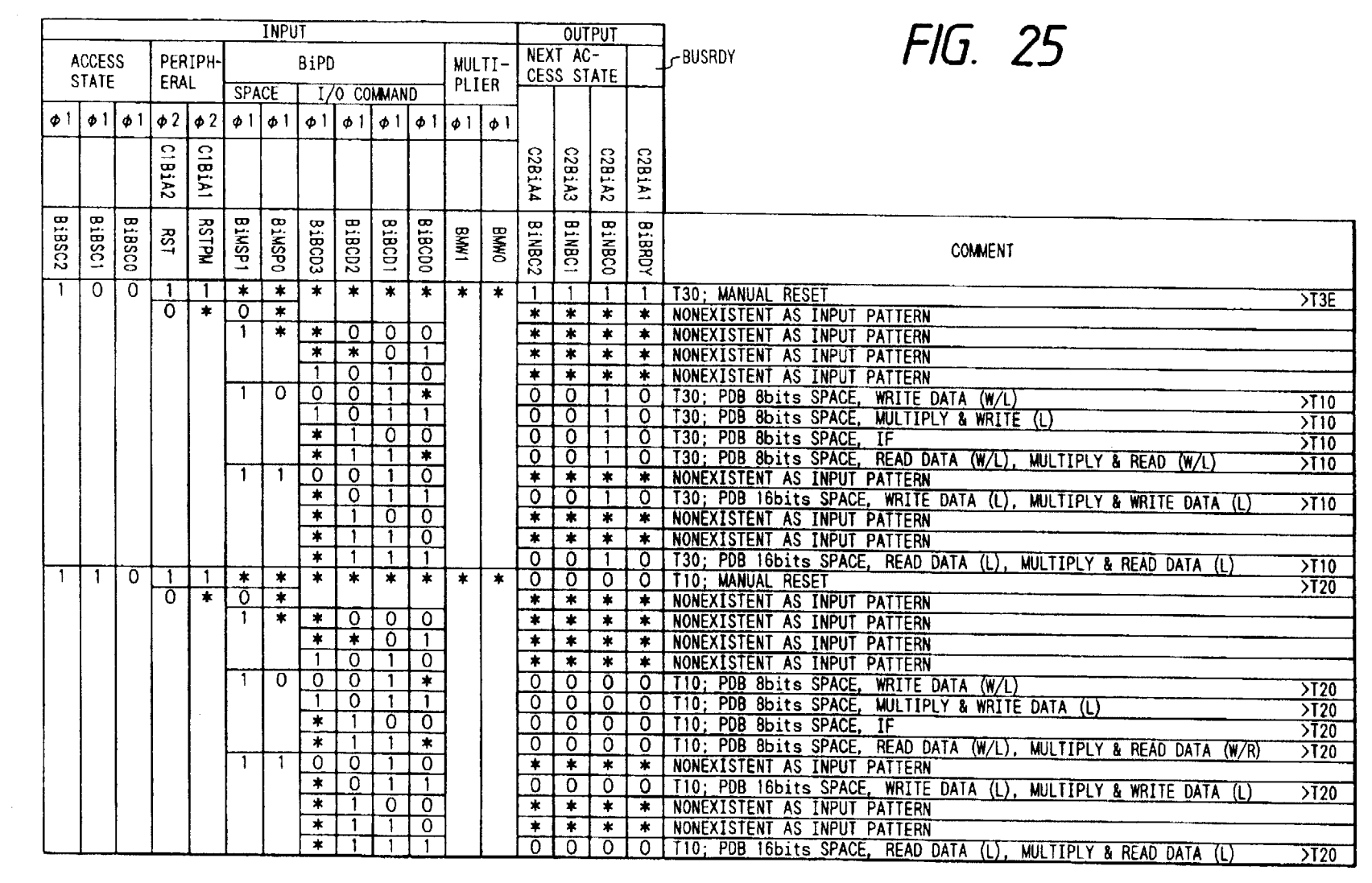
Figure 26:
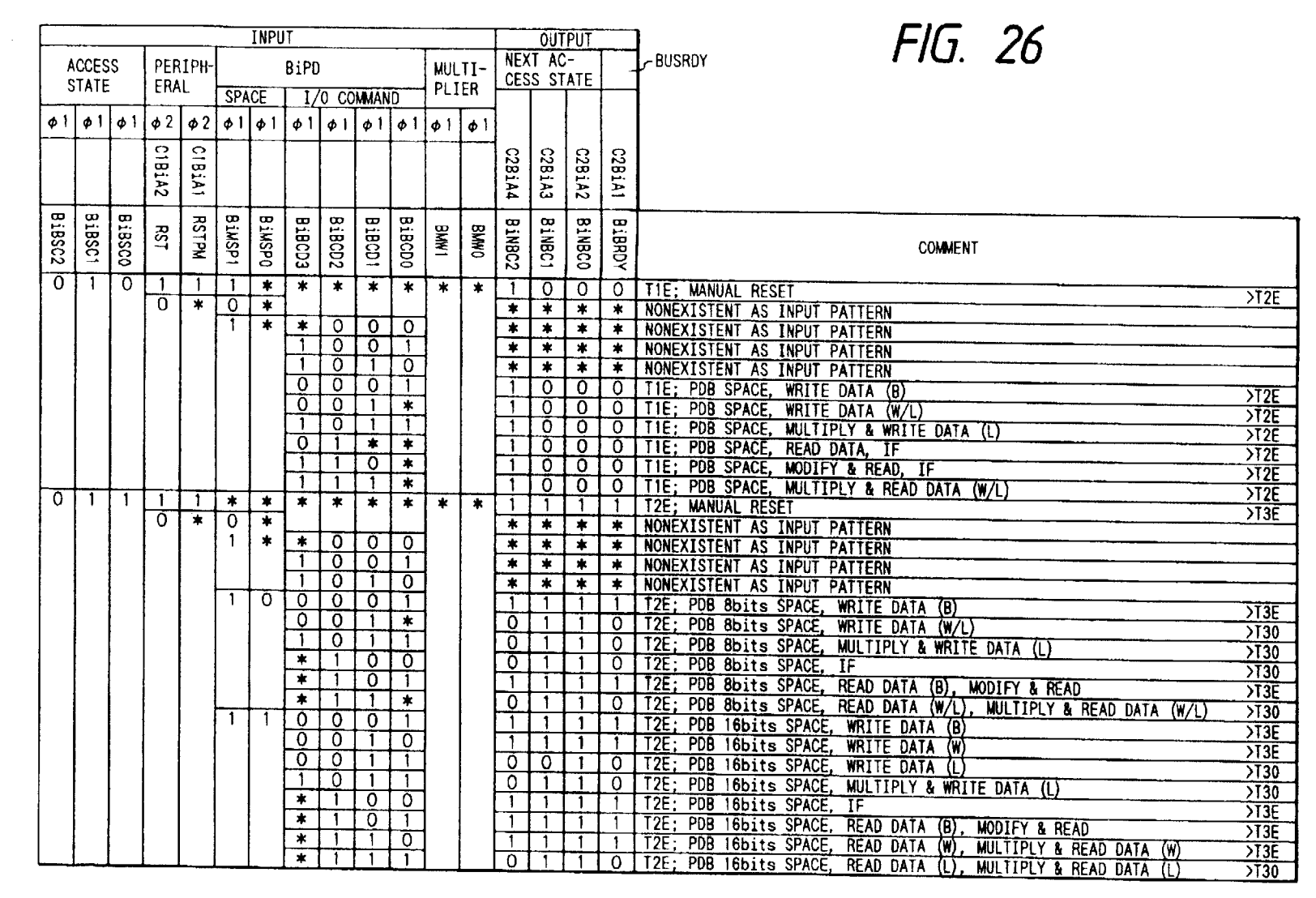

FIG. 23 is a state transition diagram of the internal access bus state machine 603 in the embodiment. FIG. 23 includes representative states T1E (010), T2E (011), T3E (000), T30 (100), T10 (110) and T20 (111). Each of the states is determined when control signals such as an access state code (BiBSC0–BiBSC2) are received. When the process corresponding to a particular state is terminated, a next access state code is generated for state transition. The three bits suffixed to each of the state names in FIG. 23 constitute the access state code. The control signals including the access state code are determined based on the value of the command bus BCMD0-3 and on the value of the address bus IAB0-23. FIGS. 24 through 27 are tables each listing access state codes (BiBSC0–BiBSC2), next access state codes (BiNBC0–BiNBC2) and the processes corresponding to these codes in connection with the embodiment. For example, FIG. 24 shows that having the signal RST asserted causes a power-on reset state to occur and brings about T3E as the next access state.

<8. State transition diagram of the external access bus state machine>

Figure 28:
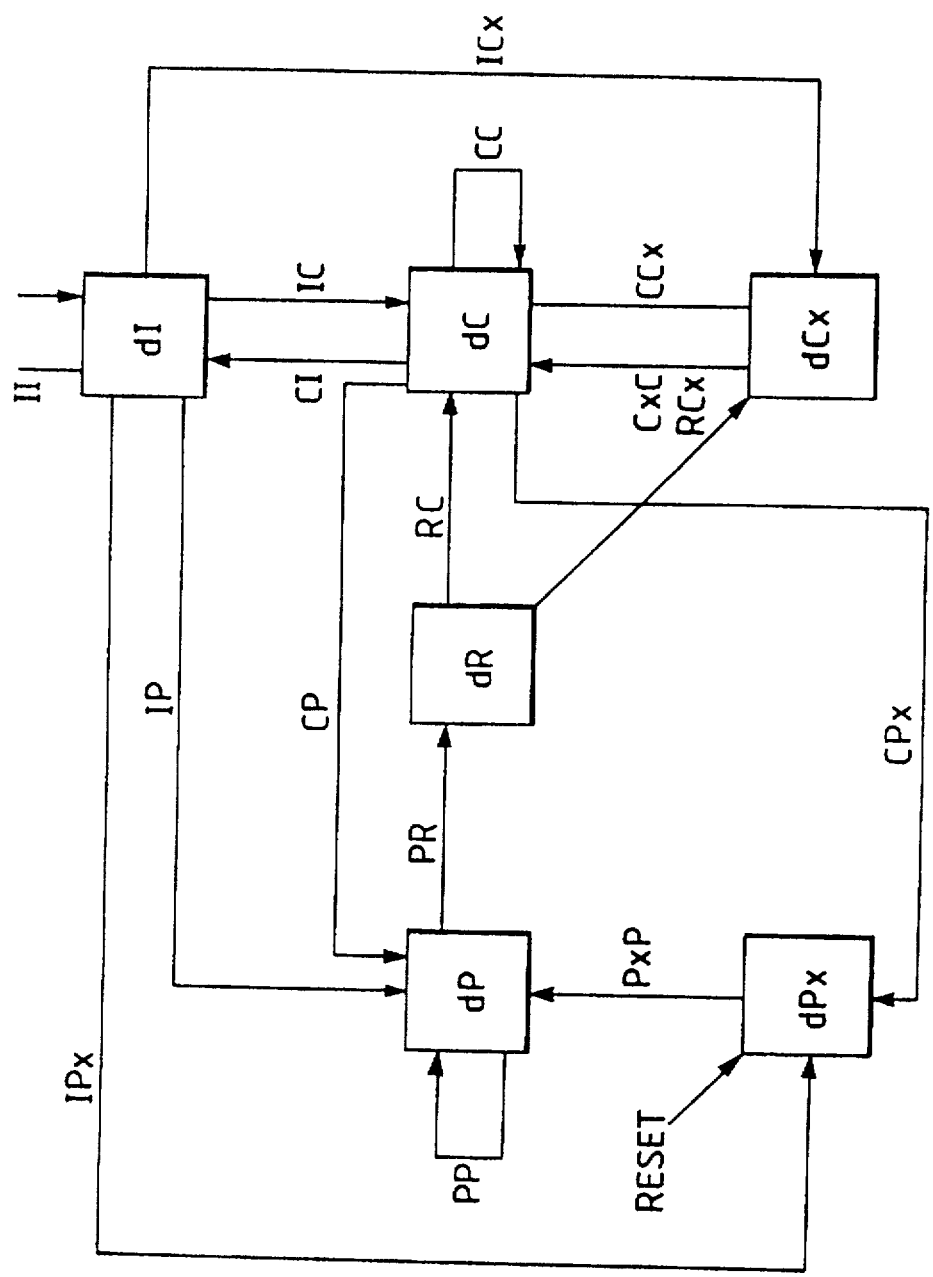
FIG. 28 is a state transition diagram of a DRAM state machine in the embodiment.

FIG. 28 is a state transition diagram of a DRAM state machine included in the external access bus state machine 602. Each of the states shown in FIG. 28 will now be described.

(1) dP (DRAM precharge state)

The dP state is a precharge state in which the RAS* and CAS* signals (CASL* and CASH*) are negated at the High level. Even in this state, the address line, the signals CS* and RD* and the data line can be active because a memory access operation to a location other than the DRAM occurs.

(2) dPx (DRAM precharge extra state)

The dPx state is a precharge state in which to ensure the precharge period for the DRAM. To has this state transited before the state dP is reached ensures a two-cycle precharge period (for 100 ns at 20 MH). This precharge period is sufficient for complying with various kinds of DRAM's.

(3) dR (DRAM row address state)

The dR state is a state in which a row address is furnished during access to the DRAM. The row address is output in the first half of the state and the same address is held asserted in the second half thereof. The RAS* signal is asserted in the second half of the state. In this case, none of the memory control signals (e.g., RD*, WR*) or the data bus will be asserted. That is, the dR state exists solely for the purpose of furnishing the row address. The only exception is that the CAS* signal (CAS refers generically to CASL* and CASH* hereunder) is asserted from the beginning of the dR state; the CAS* signal remains asserted in the dR, dC and dCx states.

(4) dC (DRAM column address state)

The dC state is a state in which a column address is furnished during access to the DRAM. In short pitch mode, this state alone completes a single burst access operation. The CAS* signal is asserted and negated in the second half of the cycle. An output buffer for the CAS* terminal is bolstered in capacity compared with other output buffers. That is, the buffer is capable of permitting asserting and negating in a half-cycle. In short pitch mode, the RD* and WR* terminals are asserted at the beginning of the dC cycle and are held asserted throughout the cycle. The wait terminal is not sampled in short pitch mode.

In long pitch mode, the dCx cycle is always reached before the dC cycle is entered. This means that the WR* and RD* terminals are held asserted when the dC cycle is reached. In long pitch mode, the wait terminal is sampled at the end of the dCx cycle. If the wait terminal is not sampled, the WR* terminal is pulled up (i.e., negated) halfway through the cycle. The RD* terminal is kept asserted till the end of the cycle. When the wait terminal is sampled, the dC cycle is repeated with the WR* and RD* terminals held asserted. In long pitch mode, the CAS* signal remains asserted during the dC cycle. In a refresh cycle, neither the WR* terminal nor the RD* terminal is asserted. In battery backup mode, the dC state remains in effect.

(5) dCx (DRAM column extra address state)

The dCx is a state in which a column address is furnished during access to the DRAM. In short pitch mode, the dCx state is not reached. This state represents the first cycle in long pitch mode. The RD* terminal is asserted from the beginning of the cycle and the WR* terminal from halfway therethrough. In a refresh cycle, neither the RD* terminal nor the WR* terminal is asserted.

(6) dI (DRAM idle state)

The dI state is a state in which to carry out a RAS down wait operation during access to the DRAM. This state will not be reached when the CBR refresh operation is performed. In the dI state, the CAS*, RAS* WR* and RD* terminals are all negated.

Figure 29:
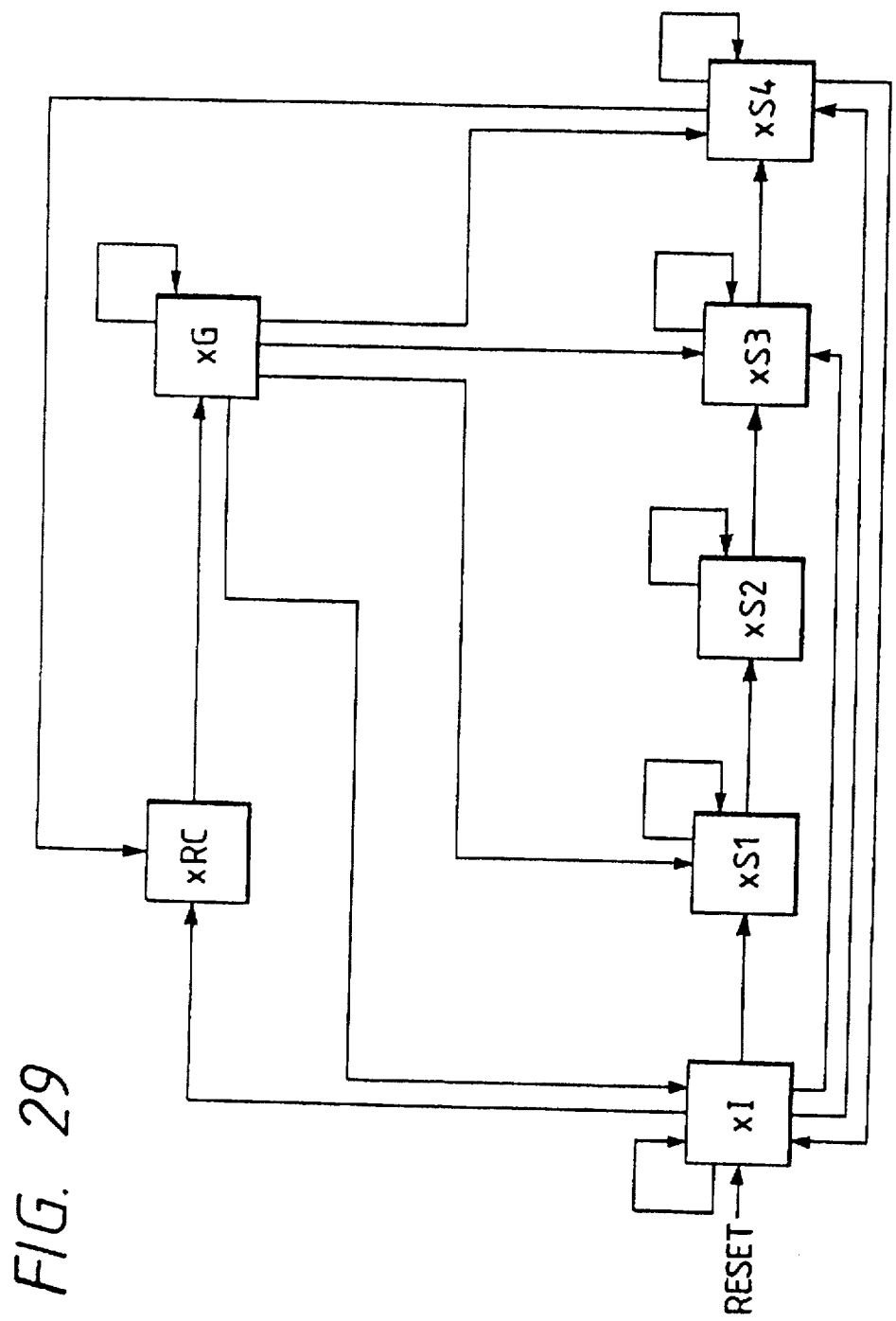
FIG. 29 is a state transition diagram of a bus size arbitration state machine in the embodiment.

FIG. 29 is a state transition diagram of a bus size arbitration state machine included in the external access bus state machine 602. Each of the states involved will be described below.

(1) xI (external bus idle state)

In the xI state, the CPU 1 or the DMAC 4 incorporated in the microcomputer functions as the bus master, although no access is effected by use of the external bus. Where access to another memory does occur, the RAS down state of the DRAM corresponds to this state.

(2) xRC (external bus rescind state)

The xRC state is transited when the microcomputer MCU embodying the invention rescinds the bus right as a result of bus arbitration. This is done by internal logic so as to bring the control signals High before setting them at the high impedance level. The transit through the xRC state lowers the current value of the pull-up resistance. The xRC state is also transited in software standby mode.

(3) xG (external bus grant state)

The xG state is a state in which the microcomputer MCU releases the bus. This state is also reached in software standby mode. With the xG state in effect, the address pins and data pins are all set at the high impedance level. All control signals such as RAS*, CAS*, RD* and AH* are set at the high impedance level.

(4) xS1 (external bus state 1)

The xS1 is the first state to be reached when a 32-bit operand is written to or read from a space arranged in units of 8 bits. Bits {0, 0} are output as the low-order 2 bits {A0, A1} of the address. As long as this access operation continues, the xS1 state is repeated.

(5) xS2 (external bus state 2)

The xS2 state is reached upon access to the second byte when a 32-bit operand is written to or read from a space arranged in units of 8 bits. A1=0 and A0=1 are output as the low-order 2 bits of the address. As long as the access to the second byte continues, the xS2 state is repeated.

(6) xS3 (external bus state 3)

The xS3 state is reached upon access to the third byte when a 32-bit operand is written to or read from a space arranged in units of 8 bits. A1=1 and A0=0 are output as the low-order 2 bits of the address.

The xS3 state is also reached upon access to the first byte when a 16-bit operand is written to or read from a space arranged in units of 8 bits. A1=X and A0=0 are output as the low-order 2 bits of the address.

The xS3 state is also reached upon access to the first word when a 32-bit operand is written to or read from a space arranged in units of 16 bits. A1=0 and A0=0 are output as the low-order 2 bits of the address.

The xS3 state is repeated as long as each address is continued.

(7) xS4 (external bus state 4)

The xS4 state is reached upon access to the fourth byte when a 32-bit operand is written to or read from a space arranged in units of 8 bits. A1=1 and A0=1 are output as the low-order 2 bits of the address.

The xS4 state is also reached upon access to the second byte when a 16-bit operand is written to or read from a space arranged in units of 8 bits. A1=X and A0=1 are output as the low-order 2 bits of the address.

The xS4 state is also reached upon access to the second word when a 32-bit operand is written to or read from a space arranged in units of 16 bits. A1=1 and A0=0 are output as the low-order 2 bits of the address.

Figure 30:
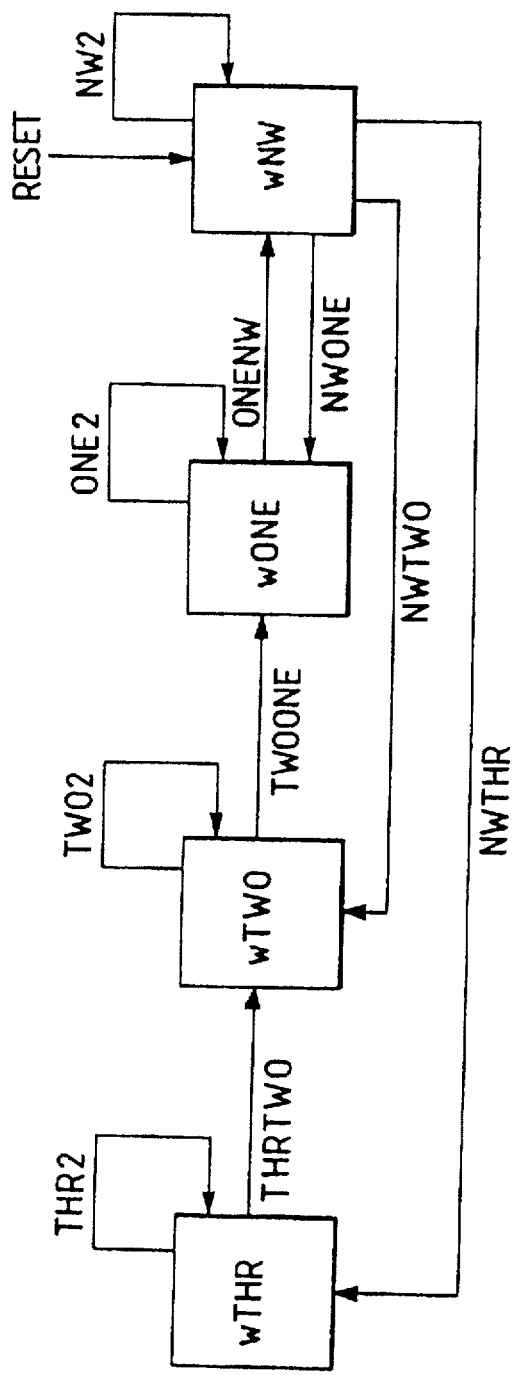
FIG. 30 is a state transition diagram of an external wait generation state machine in the embodiment.

FIG. 30 is a state transition diagram of an external wait generation state machine included in the external access bus state machine 602. There are three cases in which wait states may be inserted:

(a) During two-state access to the SRAM, the second state (sL state) is repeated.

(b) During long pitch access to the DRAM, the second state (dC state) of the column address is repeated.

(c) During I/O MPX access, the second-last state (pD1 state) of the I/O access operation is repeated.

How many times any of the above states is to be repeated is determined by the external wait generation state machine. Each of the states available with the external wait generation state machine will be described below. This state machine has an additional function of retaining the decoded result of the value on the internal address bus.

(1) wTHR (wait three states)

The wTHR state is the first state to be reached when three wait states are inserted. The wTHR state is repeated until the external access bus state machine reaches a cycle in which to receive a wait state. When the external access bus sate machine enters a cycle in which a wait state is received and repeated, the counting of the state starts so as to let the cycle repeat illustratively as wTHR→wTWO→wONE→wNW As a result, three wait states are inserted into the base cycle.

(2) wTWO (wait two states)

The wTWO state is the first state to be reached during memory access when two wait states are inserted into each external access cycle. Upon access to a two-wait state space, the wTWO state is repeated until the external access bus state machine reaches a cycle in which a wait state is received and repeated. When the external access bus state machine enters a state in which to receive a wait state, the counting of the state starts so as to let the cycle repeat three times illustratively as wTWO→wONE→wNW As a result, two wait states are inserted into the base state count. The wTWO state is also transited when three wait states (i.e., more than the two wait states) are inserted. In that case, the wTWO state is not repeated.

(3) wONE (wait one state)

The wONE state is the first state to be reached during memory access when one wait state is inserted into each external access cycle. Upon access to a space in which to insert one wait state, the wONE state is repeated until the external access bus state machine reaches a cycle in which to receive a wait state. When the external access bus state machine reaches a cycle in which to receive a wait state, the counting of the state starts so as to let the external access state repeat twice illustratively as wONE→wNW As a result, one wait state is inserted in the base external access cycle. The wONE state is transited when more than one wait state is inserted. In this case, the wONE state is transited only once, not repeatedly.

(4) wNW (wait no wait state)

The wNW state is reached in one of three cases: (i) where an external access cycle is not in effect; (ii) where an external bus access operation is in progress but no wait state needs to be inserted; or (iii) where the last cycle of repeated bus cycles is executed upon wait state insertion during external bus access. The wNW is always reached upon reset.

Figure 31:
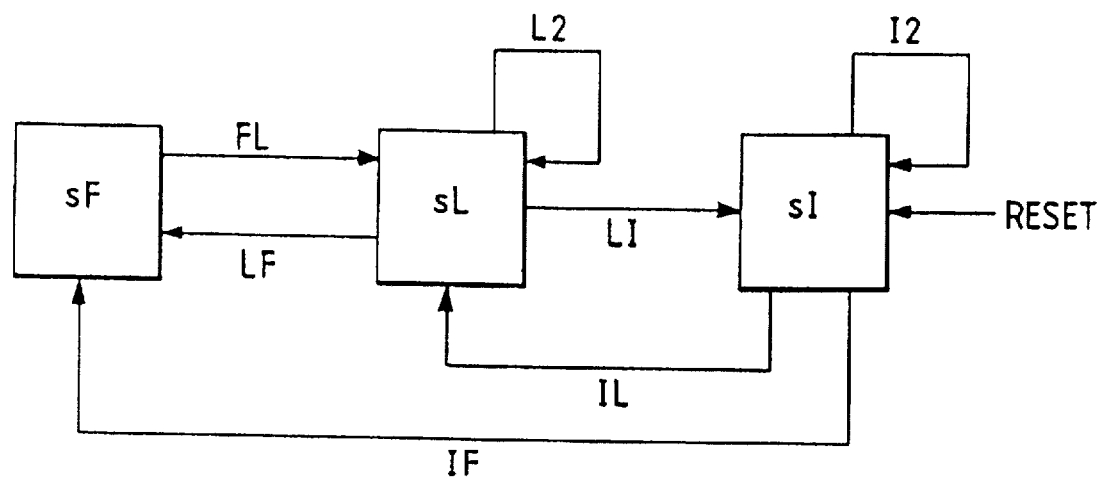
FIG. 31 is a state transition diagram of a normal space access state machine in the embodiment.

FIG. 31 is a state transition diagram of a normal space access state machine included in the external access bus state machine 602. The normal space access state machine is a mechanism that raises or lowers the levels of the appropriate signal lines upon access to the normal space so that the applicable data may be latched (when read) or asserted (when written) at the correct timing. The normal space access state machine generally comprises three states: sI (idle), sF (first cycle) and sL (last cycle). These three states are shared upon read and write access operations. A one-cycle access operation ends with the sL state alone; a two-cycle access operation ends with the sF state followed by the sL state. The normal space access state machine is characterized in that a very large number of states are compressed thereby into a single state. In this respect, each normal access state is subject to various control line states. Below is a description of as many of these control line states as possible.

(1) sI (SRAM idle state)

The sI state is an idle state that is reached or retained when, with no external access operation performed, another DRAM or I/O MPX peripheral circuit is accessed. The sI state is also reached immediately after reset.

(2) sF (SRAM first state)

The sF state is reached in the first cycle of a two-cycle access operation to the SRAM. The RD* signal falls at the beginning of the cycle (at φ rise time) and the WR* signal falls halfway through the cycle (at φ fall time) to allow data output to start. On the terminal shared with the I/O MUX space (CS5* at present), the CS* signal is asserted halfway through the cycle. On the other terminals, the CS* signal is asserted from the beginning of the cycle in response to the decoded result of the address.

The way the DR* and WR* signals and the data lines are handled varies with read and write operations. That is, at the end of the sF cycle and with the external terminal latched, it is determined whether or not to repeat the sL cycle next to the sL cycle following the sF cycle.

(3) sL (SRAM last state)

The operation upon access to a one-cycle normal space differs from the operation upon access to a space arranged in two cycles or more. This point is taken into account in the following description of this state:

The sL state is executed in one cycle alone upon access to the one-cycle normal space. With the external terminal and internal wait state not sampled, the next cycle is always reached after one cycle. In a one-cycle read operation, the RD* signal is asserted at the beginning of the cycle (at φ rise time), and data is latched and the RD* signal negated at the end of the cycle (at φ fall time). In a one-cycle write operation, the address is updated at the beginning of the cycle (at φ rise time), and the WR* signal as well as the data lines are asserted halfway through the cycle (at φ fall time). The WR* signal is negated at the end of the cycle (at φ rise time).

Upon access to a normal space arranged in two cycles or more, the sL state may be repeated depending on the previously sampled value of the external wait terminal and on the internal wait setting. In this case, the normal space access state machine always goes to the sF state first and then to the sL state. In a read cycle, the address asserted beginning in the sF state is retained. The CS* and RD* signals also remain asserted. The CS* and RD* signals are raised and the address is updated only after the sL state has stopped being repeated. The operation ends with the last sL cycle. In a write cycle, the address asserted beginning in the sF cycle is retained as long as the sL cycle is repeated. The CS* and WR* signals remain asserted since they were asserted in the sF cycle. The WR* signal is negated halfway through the last repeated sL cycle, and the CS* signal is negated at the end of the cycle.

Since the definition of the sL cycle is somewhat vague, a normal space access substate flag is provided to distinguish the sL cycle for the normal space. More about this will be discussed later.

Figure 32:
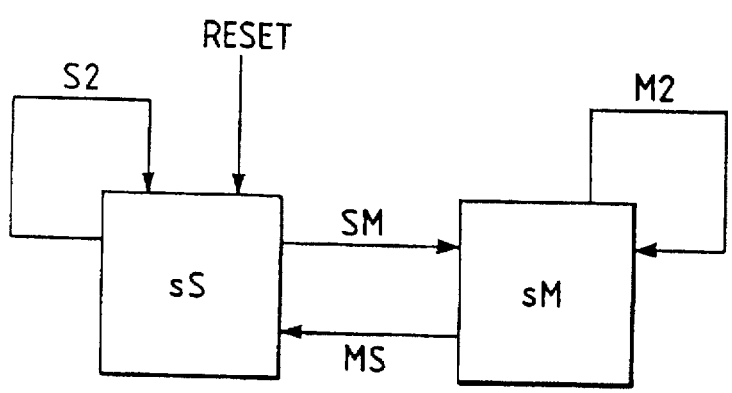
FIG. 32 is a state transition diagram of a normal space access substate flag used by the embodiment.

FIG. 32 is a state transition diagram of the normal space access substate flag included in the external access bus state machine 602. The sL state of the normal space access state machine occurs in two cases without distinction: when one-cycle access is continued, and when a wait state is inserted. It is to distinguish these two cases from each other that this state machine is provided.

(1) sS (SRAM single cycle access state)

The sS state is reached in one of two cases: when the normal space access state machine is inactive (i.e., when sI state is in effect), or when the normal space access state machine is in a one-cycle space (i.e., upon access to the one-cycle space in the sL state).

(2) sM (SRAM multiple cycle access state)

The sM state is reached upon multiple cycle access.

Figure 33:
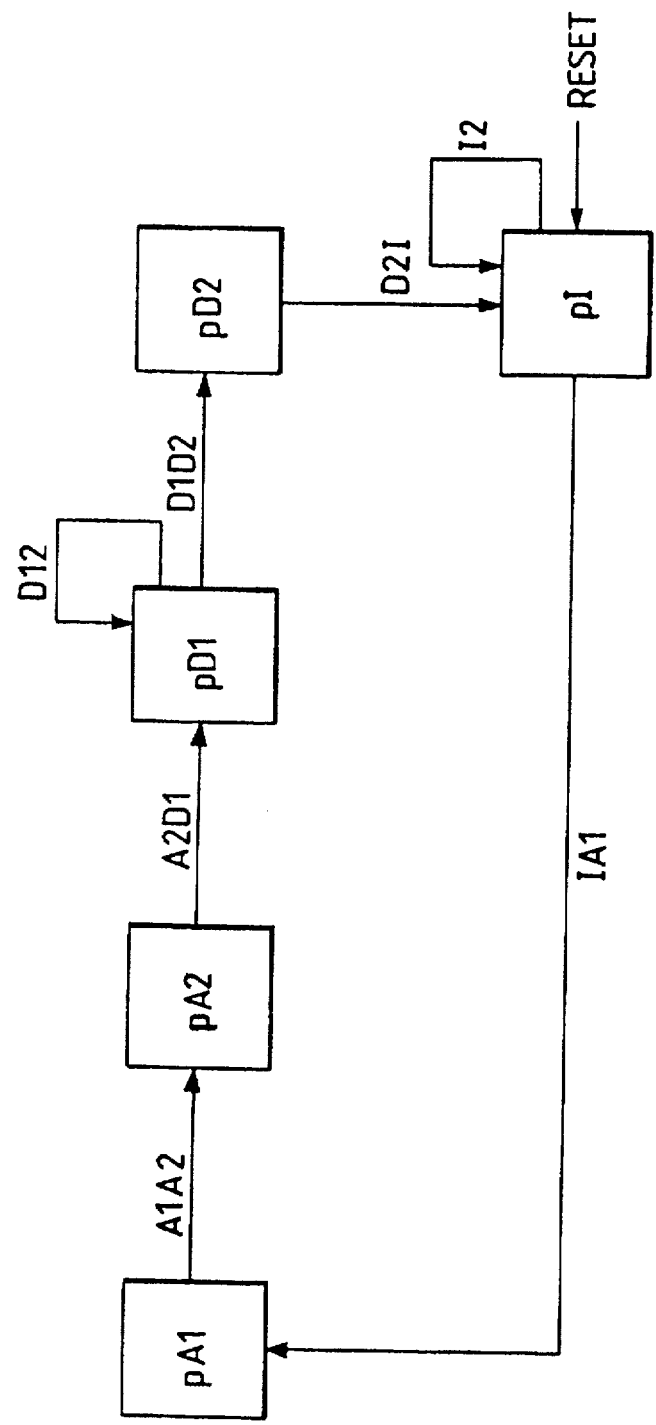
FIG. 33 is a state transition diagram of an I/O MUX access state machine in the embodiment.

FIG. 33 is a state transition diagram of an I/O MUX access state machine in the embodiment.

(1) pA1 (peripheral address state 1)

The pA1 state is the first state to be reached when an MPX I/O space is accessed. In this state, the AH* terminal is negated halfway through the cycle and an address is placed onto the data bus. The CS* terminal is not lowered. This cycle is common to both read and write operations.

(2) pA2 (peripheral address state 2)

The pA2 state is the state to be reached in the second cycle during access to the MPX I/O space. In this state, the AH terminal is lowered halfway through the cycle. The address is kept placed on the data bus as long as this cycle is in effect. The CS* terminal is lowered halfway through this cycle.

(3) pD1 (peripheral data state 1)

The pD1 state is the state to be reached in the third cycle during access to the MPX I/O space. In a read operation, the RD* terminal is asserted at the beginning of this state and the data bus is set at the high impedance level. In a write operation, data is output onto the data bus at the beginning of the state, and the WR* terminal is asserted halfway through the state. The pD1 state is repeated if the wait terminal is asserted at the end of the pA2 state, or if the internal wait state controller designates wait state insertion. For example, if it is designated to insert three wait states, the state transition occurs as follows:

→pA1→pA2→pD1→pD1→pD1→pD2→. . .

In the pD1 state following the pA2 state, the WR* terminal is asserted halfway through the state. In the pD1, pD1 and pD1 states that follow, the WR* terminal remains asserted from beginning to end, and the data is retained. If the pD1 state is repeated in a read operation, the data is latched at the end of the last pD1 cycle.

(4) pD2 (peripheral data state 2)

The pD2 state constitutes the last cycle upon access to the MPX I/O space. In a read operation, the RD* terminal is negated at the beginning of the cycle, and the CS* terminal is negated halfway through the cycle. In a write operation, data is retained on the data bus throughout the cycle. The WR* terminal is negated halfway through the cycle.

(5) pI (peripheral idle state)

The pI state is in effect when access to a peripheral chip is in idle state. The RD* terminal, AH* terminal and CS* terminal are all negated.

<9. Operations of the bus state controller>

Major operations of the microcomputer MCU embodying the invention will now be described. The description will center around the bus state controller.

(1) Operation upon reset

When a user system asserts the RES* terminal while negating the NMI terminal, the microcomputer performs power-on reset. When the user system asserts the RES* terminal while asserting the NMI terminal, the microcomputer carries out manual reset. The effect of these processes is transmitted to each of the modules in the microcomputer by the reset generation logic using the RES and RSTMP signal. As a result, the CPU 1, refresh counter 35, DMAC 4, I/O circuits, ports, external access bus state machine 602 and internal access bus state machine 603 are reset. Once reset, all processes in progress are terminated and the reset state prevails. In the reset state, the bus operation becomes inactive with respect to any peripheral chip, DRAM, RAM or ROM connected to the microcomputer. Power-on reset brings about the inactive state immediately; there is no canceling the bus operation halfway. In the case of manual reset, the bus operation in progress or pending is allowed to reach its end before the reset state is entered.

(2) Bus state machine operation upon power-on reset

Described below is how the bus state machines operate upon power-on reset. The internal bus state machine 603 reaches the T3E state immediately from whatever state it was in before the reset. States occur with the external bus access state machine 602 as follows: upon power-on reset, the DRAM state machine goes into the dPx state (DRAM precharge extra state), the bus size/arbitration state machine into the xI state (external bus idle state), the external wait generation state machine into the wNW state (wait no wait state), the normal space access state machine into the sI state (SRAM idle state), the normal space access substate flag into the sS state (SRAM single cycle access state), and the I/O MUX access sate machine into the pI state (peripheral idle state).

(3) Bus state machine operation upon manual reset

How the bus state machines operate upon manual reset will now be described. When manual reset is effected, a bus state machine is allowed to carry out the bus operation to its end but ignores any new bus access request. However, because the contents of the external wait terminal are ignored in the absence of new bus requests and upon manual reset, the state machine reaches after a finite time the same state as that in effect upon power-on reset. Upon power-on reset, the internal access bus state machine 603 reaches the T3E state immediately from whatever state it was in before the reset. States occur with the external access bus state machine 602 as follows: upon power-on reset, the DRAM state machine goes into the dPx state (DRAM precharge extra state), the bus size/arbitration state machine into the xI state (external bus idle state), the external wait generation state machine into the wNW state (wait no wait state), the normal space access state machine into the sI state (SRAM idle state), the normal space access substate flag into the sS state (SRAM single cycle access state), and the I/O MUX access state machine into the pI state (peripheral idle state).

(4) Read operation to DRAM space

Described below is what takes place when the CPU 1 or DMAC 4 performs a read operation to the DRAM space. Using the command bus BCMDO-3, the CPU 1 or DMAC 4 sends an I/O request command to the bus state controller 6. FIG. 22 shows typical I/O request command assignments in connection with the embodiment.

Suppose that the CPU 1 attempts to read a 32-bit operand from, say, address 0×1234560. In that case, the CPU 1 places the value "0×1234560" onto the address bus IAB0-23 and a value "0111" onto the command bus BCMD0-3.

The internal bus access state machine 603 carries out the process (a) below in accordance with the value on the address bus IAB0-23 as well as with the contents of the command bus BCMDO-3.

(a) Given the address "0×1234560" on the address bus IAB0-23, the internal bus access state machine 603 decodes the address and verifies that internal access is not in effect. When it is found that internal access is not involved, the T3E state is repeated.

The internal bus access state machine 602 performs the processes (a) through (f) below in accordance with the value on the address bus IAB0-23 as well as with the contents of the command bus BCMDO-3.

(a) Given the address "0×1234560" on the address bus IAB0-23, the internal bus access state machine 602 decodes the address and ascertains that a DRAM area is accessed. When it is found that internal access is not involved, the T3E state is repeated.

(b) With reset removed, the dP state is reached after passage from the dPx state through PxP transition. The DMAC 4 becomes inactive when reset. Because the CPU 1 performs a vector fetch operation immediately after reset, the DRAM area will not be accessed in the first few cycles. The DRAM state machine stays in the dP state until a first DRAM access operation occurs. Thus the initial DRAM area access always involves transition from the dP state (DRAM precharge state) to the dR state (DRAM row access state).

(c) In the dR state, the following process occurs: a row address is first latched by the latch 600 of the row address comparator 601. In the first half of the state, the row/column address selector 32 selects the row address and outputs it to the low-order address part. (In other than the dR state, the row/column address selector always selects the column address and outputs it to the low-order address part.) In the second half of the dR state, the row address strobe signal RAS* is asserted.

(d) After the dR state, the dC state (DRAM column address state) is reached if DRAM access is set for short pitch and the dCx state (DRAM column address extra state) is reached if DRAM access is set for long pitch.

(e) If DRAM access is set for short pitch, the dC state is reached. In the second half of the dC state, the address strobe signal CASL* or CASH* is asserted and then negated. Immediately before the negate operation, the value on the data bus AD0-15 is latched. If the next access is not directed at the DRAM, the dC state is followed by the dI state (DRAM idle state). If the next access is directed at the DRAM, the current row address is compared with the latched address. If the comparison shows that the low address matches the latched address, the dC state is followed either by the dPx state or by the dP state. If it has been determined to insert two pre-charge cycles, the dPx state is reached followed by the dP state which in turn is followed by the dR state. Thereafter, the processes (c) through (f) are repeated.

(f) If DRAM access is set for long pitch, the dCx state is reached. The column address strobe signal CASL* or CAS2 is negated in the dCx state which is followed by the dC state in which the signal remains negated. In the dC state, the column address strobe signal CASL* or CAS2 is asserted in the first half of the cycle and is negated at the end of the cycle. Immediately before the signal is negated, the value on the data bus AD0-15 is latched. If the next access is not directed at the DRAM, the dC state is followed by the dI state (DRAM idle state). If the next access is directed at the DRAM, the current row address is compared with the latched address. If the comparison shows that the row address matches the latched address, the dC state is followed by another dC state. If the comparison reveals a mismatch, the dC state is followed by the dPx state or by the dP state. If it has been determined to insert two precharge cycles, the dPx state is reached followed by the dP state which in turn is followed by the dR state. Thereafter, the processes (c) through (f) are repeated.

(5) Write operation to the DRAM space

Described below is what happens when the CPU 1 or DMAC 4 performs a write operation to the DRAM space. Using the command bus BCMD0-3, the CPU 1 or DMAC 4 transmits an I/O request command to the bus state controller 6. FIG. 22 shows typical I/O request command assignments in connection with the embodiment. Suppose that the CPU 1 attempts to write a 32-bit operand to, say, address 0×1234560. In that case, the CPU 1 places the value "0×1234560" onto the address bus IABO-23 and a value "0011" onto the command bus BCMD0-3. The internal bus access state machine 603 carries out the following processes in accordance with the value on the address bus IABO-23 as well as with the contents of the command bus BCMD0-3:

(a) Given the address 0×1234560 on the address bus IABO-23, the internal bus access state machine 603 decodes the address and verifies that internal access is not in effect. When it is found that internal access is not involved, the T3E state is repeated.

(b) If DRAM access is set for short pitch, the internal access bus state machine 603 generates a BUSRDY signal to the CPU 1. The internal access bus state machine 603 carries out the following processes in accordance with the value on the address bus IABO-3 as well as with the contents of the command bus BCMD0-3:

(a) Given the address 0×1234560 on the address bus IABO-23, the internal bus access state machine 603 decodes the address and verifies that a DRAM area is accessed.

(b) With reset removed, the dP state is reached after passage from the dPx state through PxP transition. The DMAC 4 becomes inactive when reset. Because the CPU 1 performs a vector fetch operation immediately after reset, the DRAM area will not be accessed in the first few cycles. The DRAM state machine stays in the dP state until a first DRAM access operation occurs. Thus the initial DRAM area access always involves transition from the dP state (DRAM precharge state) to the dR state (DRAM row access state).

(c) In the dR state, the following process occurs: a row address is first latched by the latch 600 of the row address comparator 601. In the first half of the state, the row/column address selector 32 selects the row address and outputs it to the low-order address part. (In other than the dR state, the row/column address selector always selects the column address and outputs it to the low-order address part.) In the second half of the dR state, the row address strobe signal RAS* is asserted. If DRAM access is set for short pitch and if the next access request is for a write operation, the BUSRDY signal is returned in this cycle to the CPU 1. The CPU 1 then initiates the next access.

(d) After the dR state, the dC state (DRAM column address state) is reached if DRAM access is set for short pitch, and the dCx state (DRAM column address extra state) is reached if DRAM access is set for long pitch.

(e) If DRAM access is set for short pitch, the dC state is reached. In the second half of the dC state, the address strobe signal CAS1* or CAS2* is asserted and then negated. Immediately before the negate operation, the value on the data bus AD0-15 is latched. If the next access is not directed at the DRAM, the dC state is followed by the dI state (DRAM idle state). If the next access is directed at the DRAM, the current row address is compared with the latched address. If the comparison shows that the low address matches the latched address, the dC state is followed by another dC state. If the comparison reveals a mismatch, the dC state is followed by the dPx state or by the dP state. If it has been determined to insert two precharge cycles, the dPx state is reached followed by the dP state which in turn is followed by the dR state. Thereafter, the processes (c) through (f) are repeated.

(f) If DRAM access is set for long pitch, the dCx state is reached. The column address strobe signal CASL* or CASH* is negated in the dCx state which is followed by the dC state wherein the signal remains negated. The write signal WR* is asserted in the first half of the cycle, followed by transition to the dC state. In the dC state, the column address strobe signal CASL* or CASH* is asserted in the first half of the cycle and is negated at the end of the cycle. Immediately before the signal is negated, the value on the data bus AD0-15 is latched. The write signal WR* is asserted in the first half of the dCx state and is negated in the second half of the dC state. If the next access is not directed at the DRAM, the dC state is followed by the dI state (DRAM idle state). If the next access is directed at the DRAM, the current row address is compared with the latched address. If the comparison shows that the row address matches the latched address, the dC state is followed by another dC state. If the comparison reveals a mismatch, the dC state is followed by the dPx state or by the dP state. If it has been determined to insert two precharge cycles, the dPx state is reached followed by the dP state which in turn is followed by the dR state. Thereafter, the processes (c) through (f) are repeated.

(6) Writing a long word to the byte space

The memory access operations discussed in (4) and (5) above concerned long word access to the byte area designated by address 0×1234560. This type of access requires dividing the long word composed of 32 bits into four parts that need to be written separately to the memory under control of the bus size/arbitration state machine. When the decode operation has verified that long word access was performed to the byte space, the xS1 state (external bus state 1) is reached. In the xS1 state, A0=0 and A1=0 are output as the low-order 2 bits. The xS1 state is retained until this memory access operation comes to an end. With the memory access operation terminated, the xS2 state (external bus state 2) is reached. In the xS2 state, A0=1 and A1=0 are output as the low-order 2 bits. The xS2 state is retained until this memory access operation comes to an end. With the memory access operation terminated, the xS3 state (external bus state 3) is reached. In the xS3 state, A0=0 and A1=1 are output as the low-order 2 bits. The xS3 state is retained until this memory access operation ends. With the memory access operation brought to a stop, the xS4 state (external bus state 4) is reached. In the xS4 state, A0=1 and A1=1 are output as the low-order 2 bits.

<10. Microcomputer system>

Figure 34:
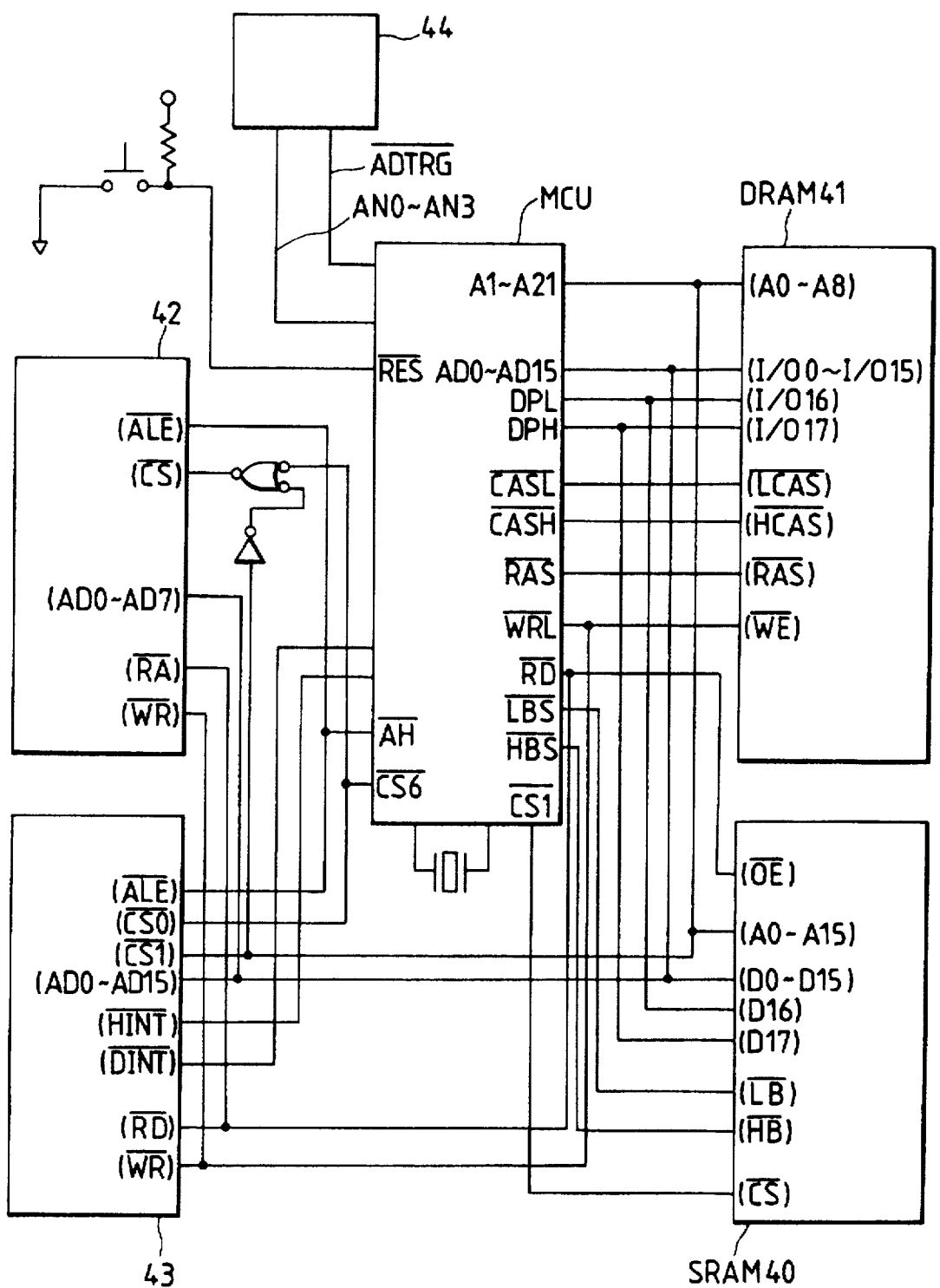
FIG. 34 is a view of a typical system configuration comprising the embodiment.

FIG. 34 presents a typical system configuration comprising the microcomputer MCU embodying the invention. The microcomputer MCU is connected direct both to an SRAM 40 arranged in 18 bits and to a DRAM 41 also arranged in 18 bits. Also connected to the microcomputer MCU are a peripheral chip 42 used by a magneto-optical disc drive for data encoding and decoding as well as for error correction, a magneto-optical disc controller chip 43 of an SCSI interface, and an analog device 44.

<11. Timing charts of external access>

FIGS. 35 through 43 show timing charts of access to the external DRAM. Although the duty factor of the CAS* signal in these figures is shown to be 50%, it may be 35% as will be described later. In the figures, reference characters Tp stand for a precharge operation state, Tr for a row address supply operation state, and Tc for a column address supply operation state. FIG. 35 is a typical read operation timing chart in effect in short-pitch high-speed page mode, and FIG. 36 is a typical write operation timing chart in effect in short-pitch high-speed page mode. The two figures reveal that the CAS* signal varies with every cycle of the operation clock φ of the microcomputer MCU. By contrast, one cycle of the CAS* signal corresponds to two cycles of the clock φ in FIG. 37 which presents a typical read operation timing chart in effect in long-pitch high-speed page mode.

Figure 38:
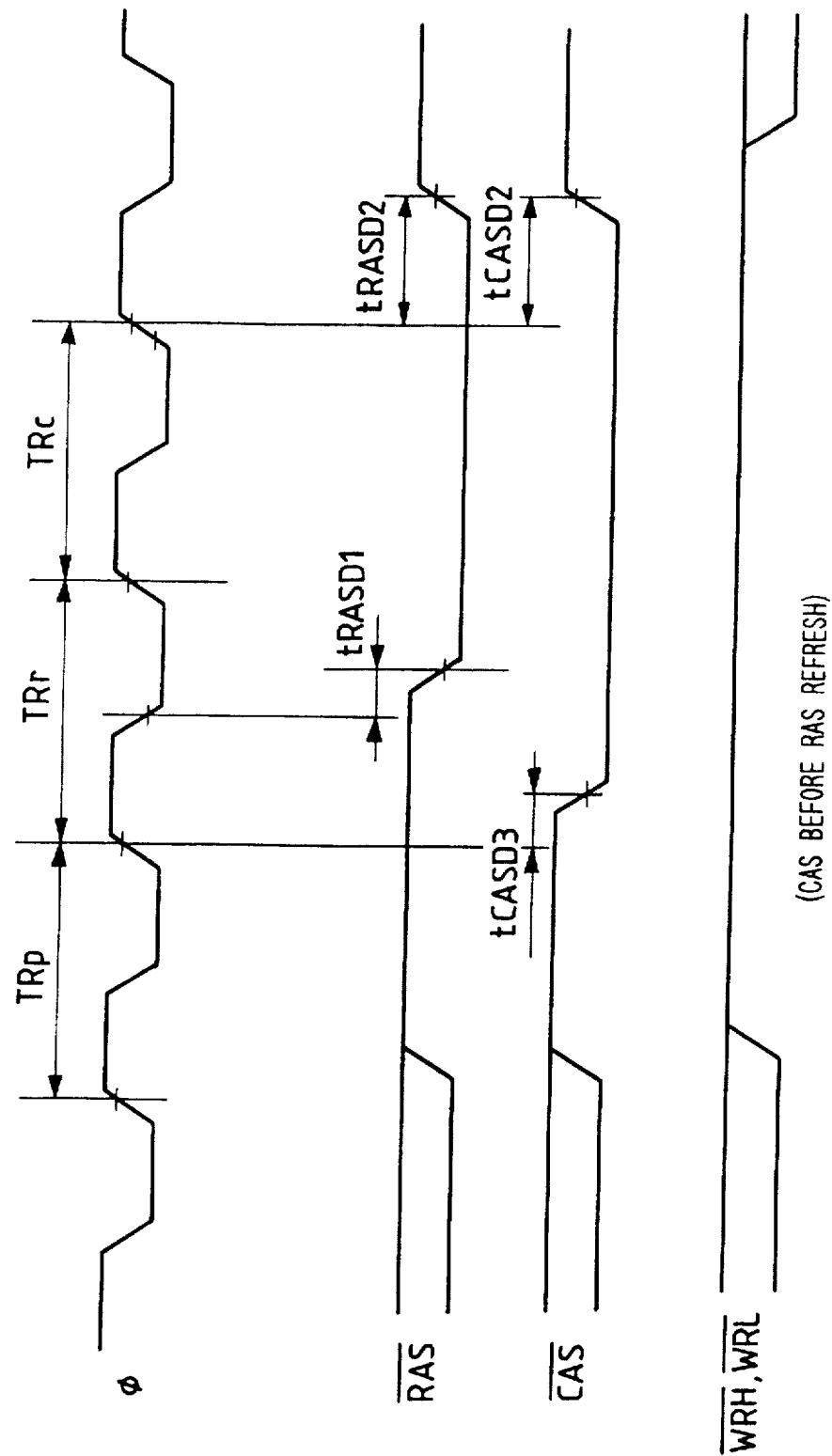
FIG. 38 is a typical timing chart of strobe signals for CBR refresh operations.
Figure 39:
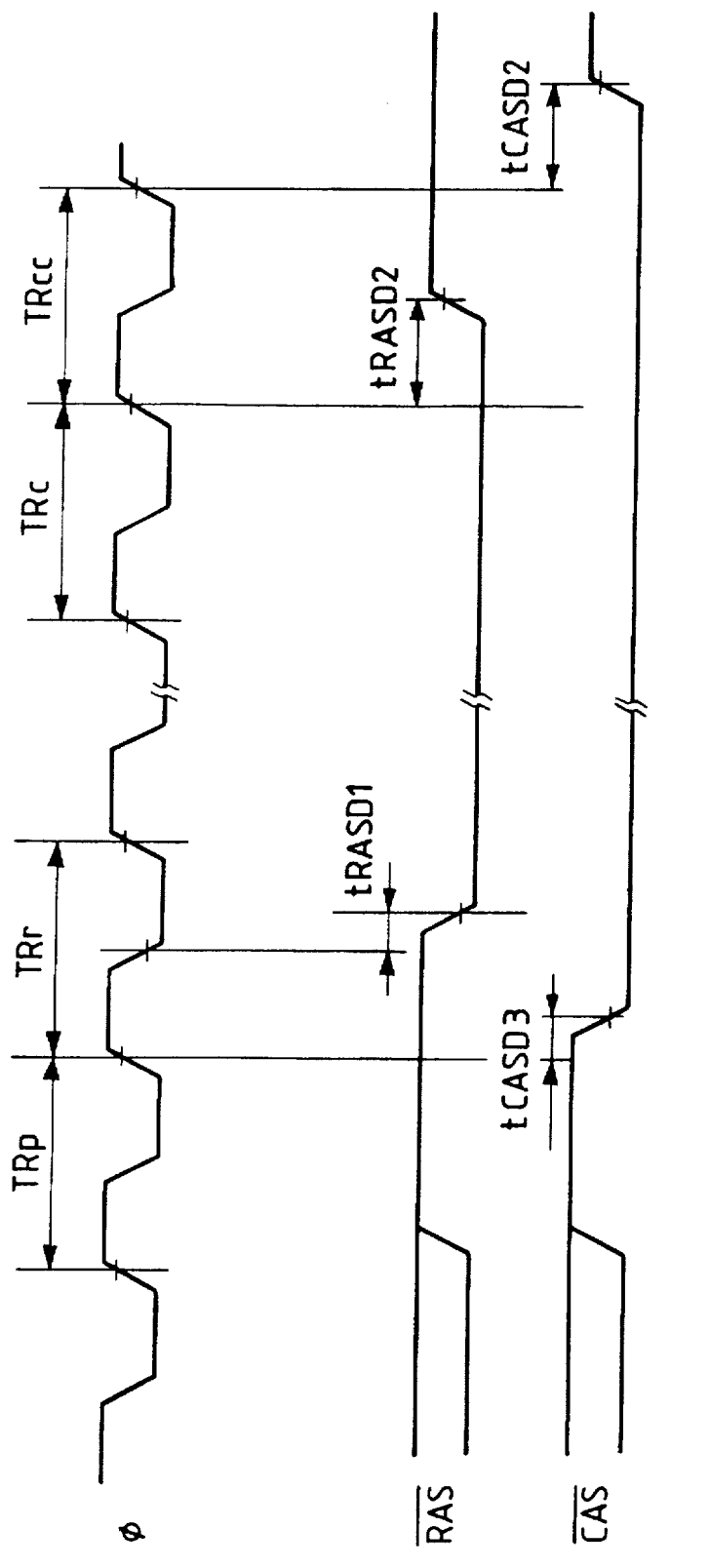
FIG. 39 is a typical timing chart of strobe signals for self-refresh operations.

FIG. 38 is a typical timing chart of strobe signals for CBR refresh operations, and FIG. 39 is a typical timing chart of strobe signals for self-refresh operations. The two timing charts show that the RAS* and CAS* signals are asserted longer in self-refresh operations than in CBR refresh operations.

Figure 40:
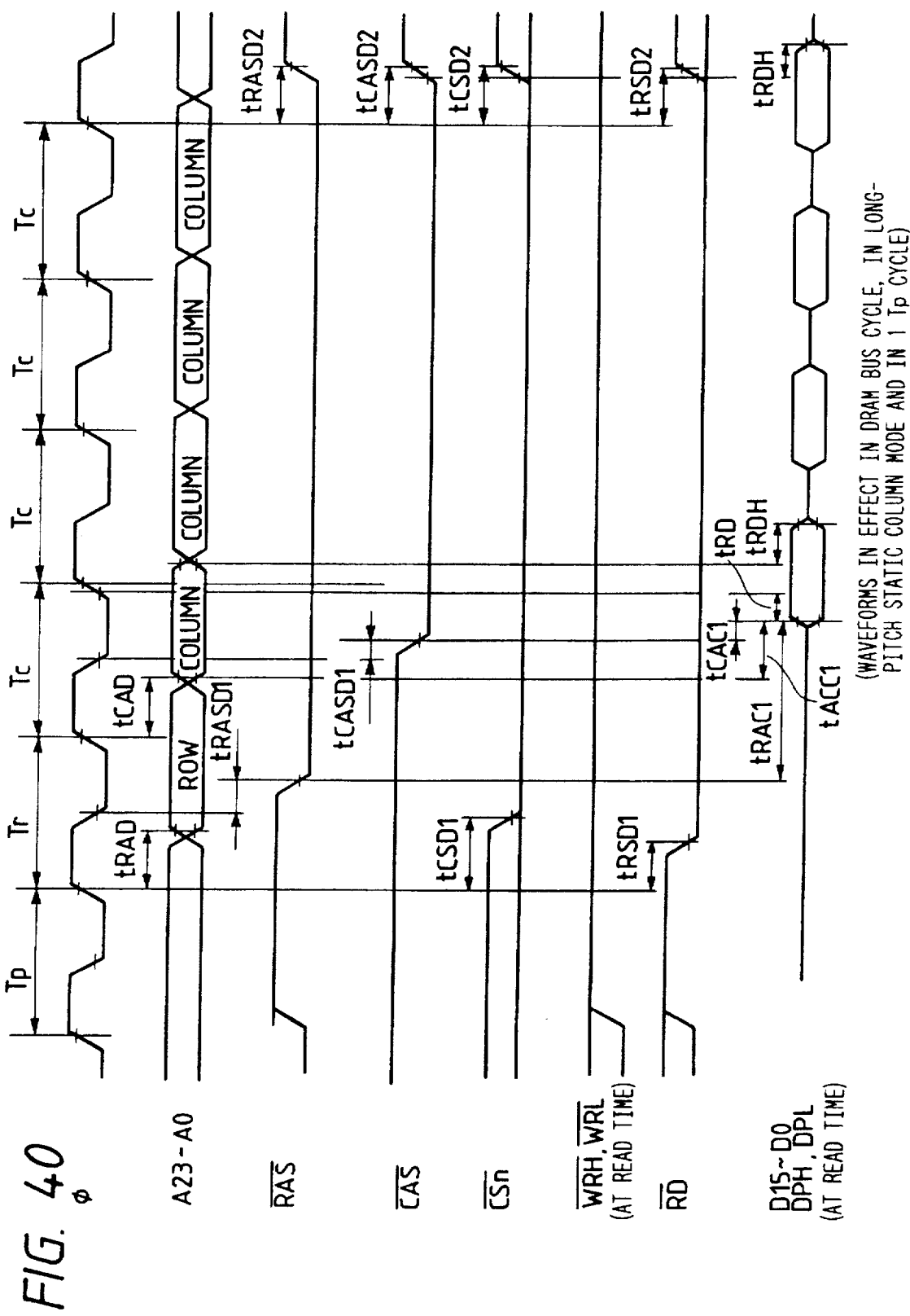
FIG. 40 is a typical timing chart of long-pitch access in static column mode.
Figure 41:
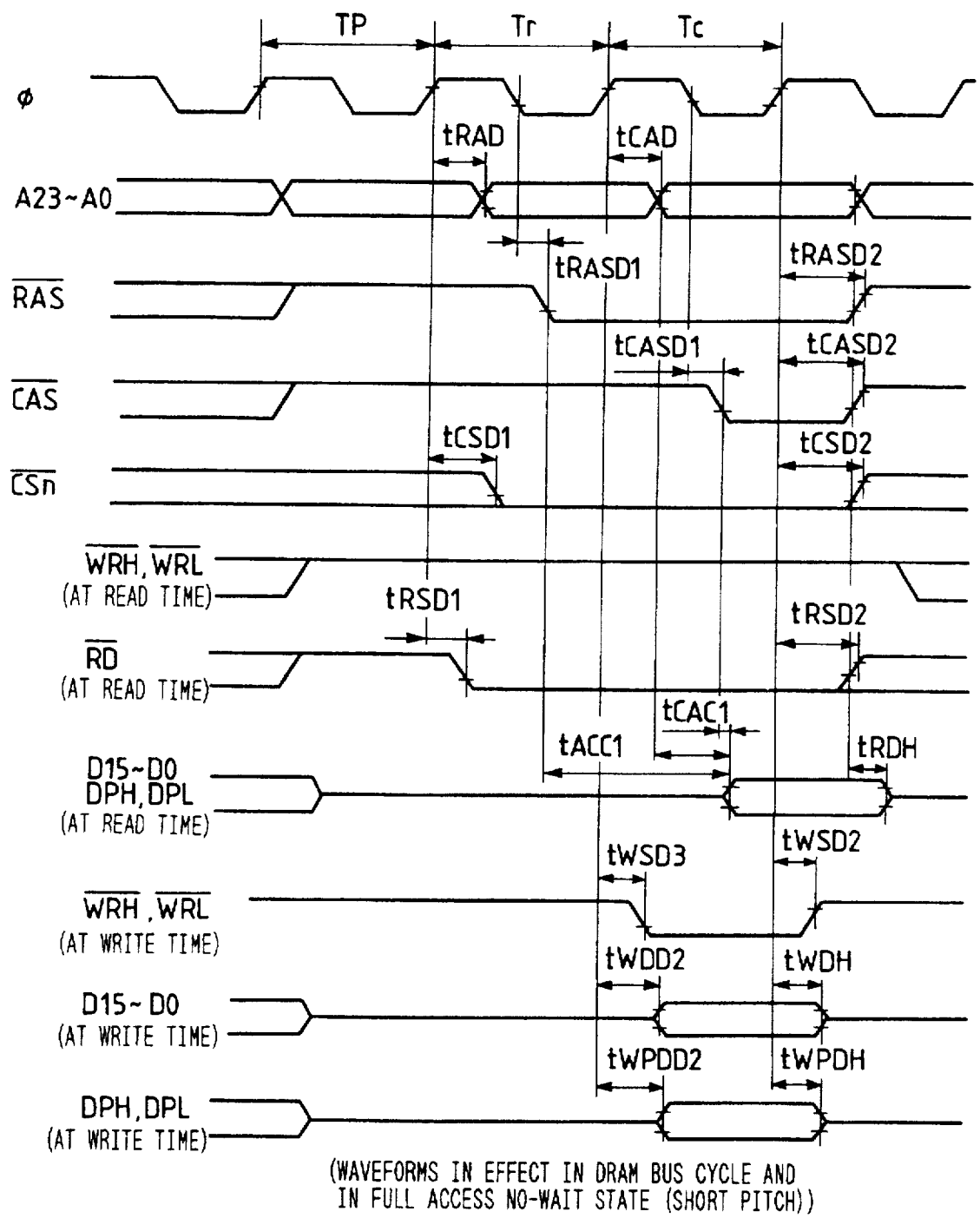
FIG. 41 is a timing chart of full access to the DRAM in no-wait state.
Figure 42:
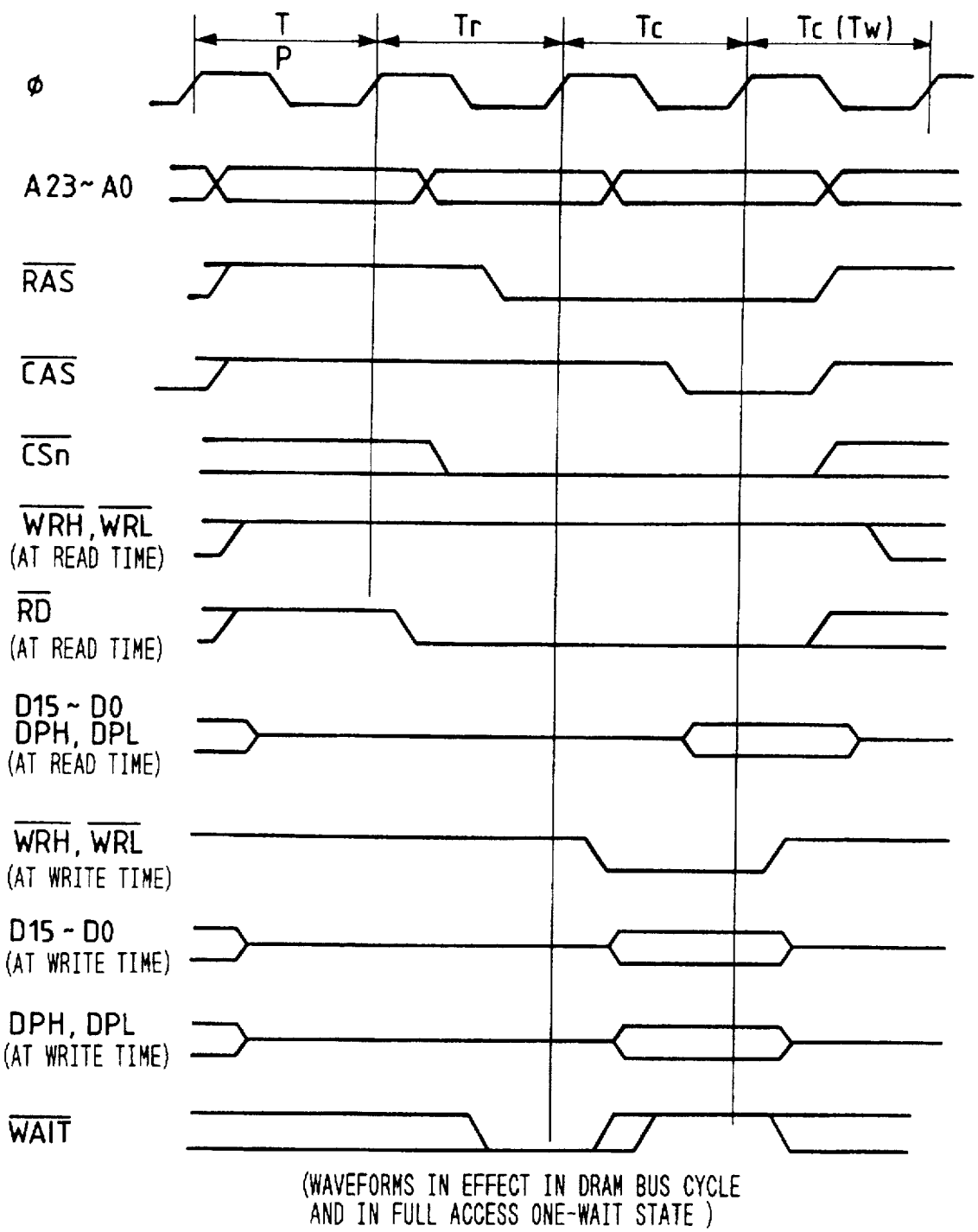
FIG. 42 is a timing chart of full access to the DRAM in one wait state.
Figure 43:
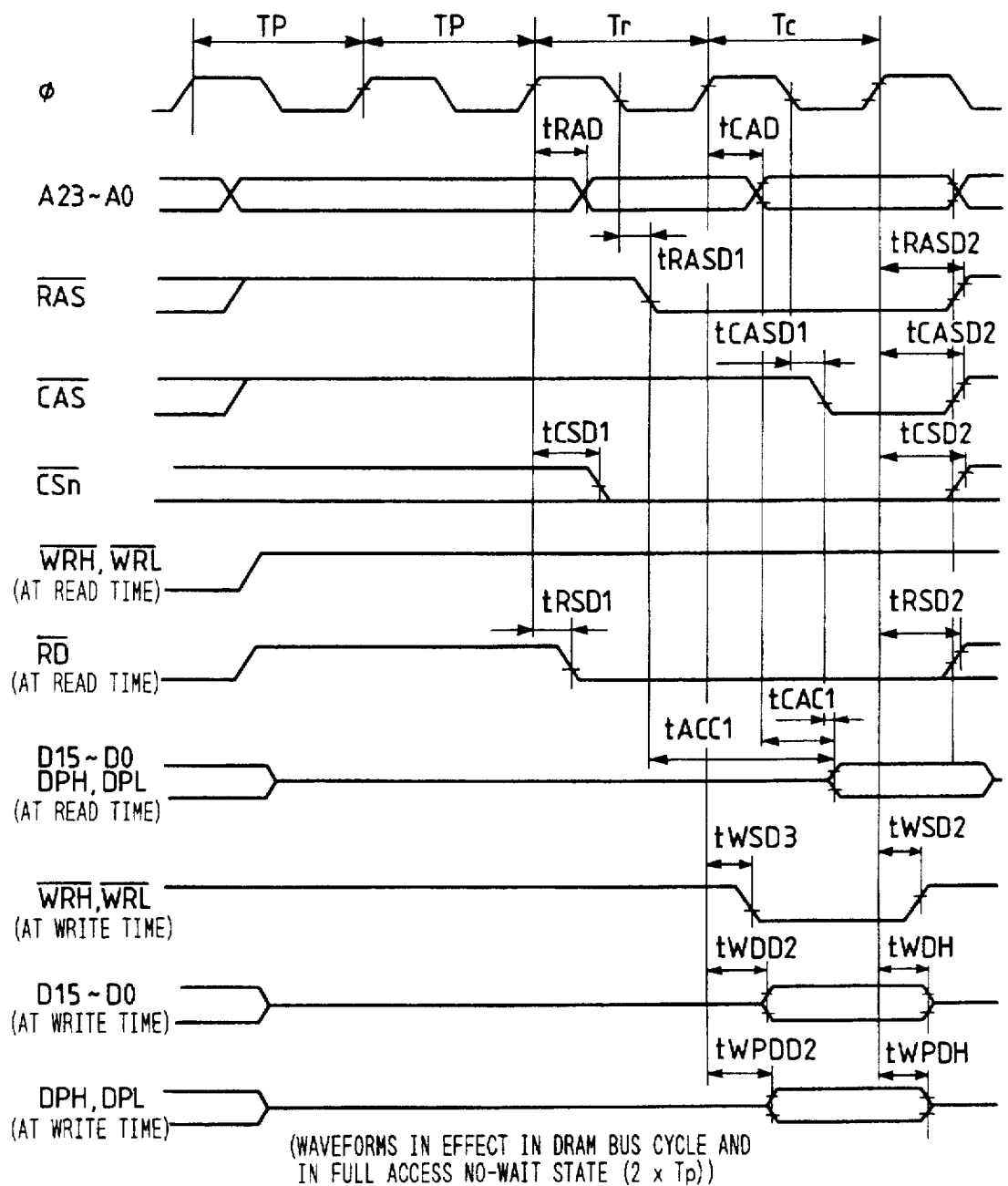
FIG. 43 is a timing chart of full access to the DRAM in no-wait state of two precharge cycles.

FIG. 40 is a typical timing chart of long-pitch access in static column mode. FIG. 41 is a timing chart of full access to the DRAM in no-wait state. FIG. 42 is a timing chart of full access to the DRAM in one wait state. FIG. 43 is a timing chart of full access to the DRAM in no-wait state of two precharge cycles.

Figure 44:
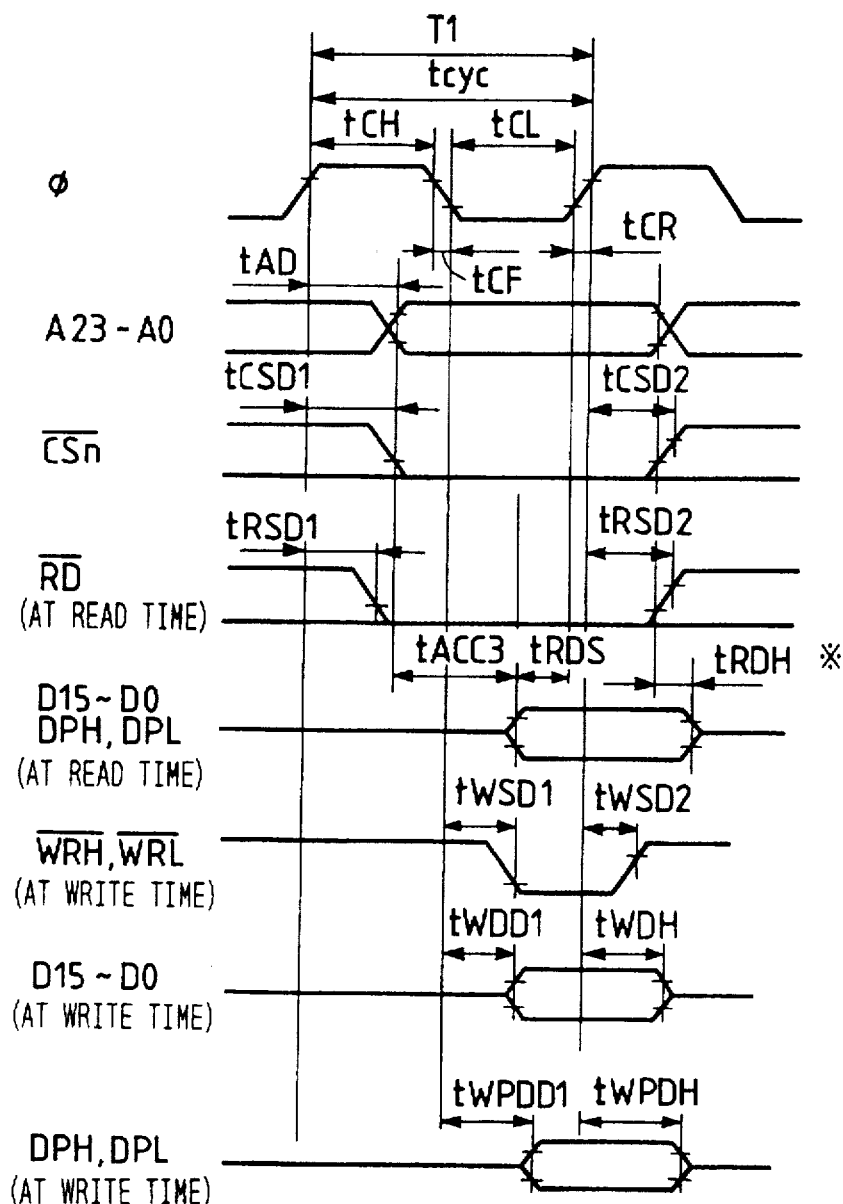
FIG. 44 is a timing chart showing basic bus cycles in one state.
Figure 45:
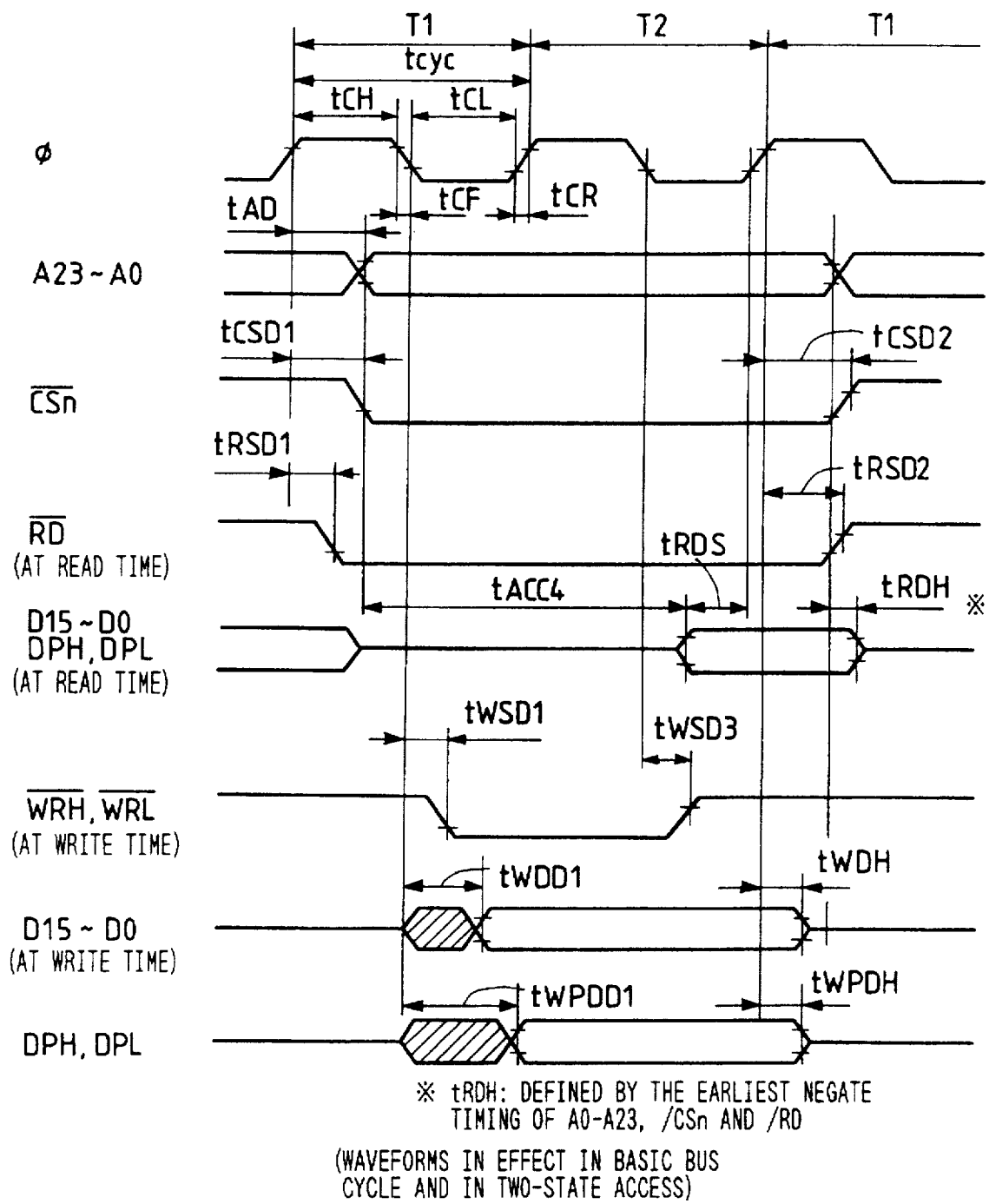
FIG. 45 is a timing chart depicting basic bus cycles in two states.
Figure 46:
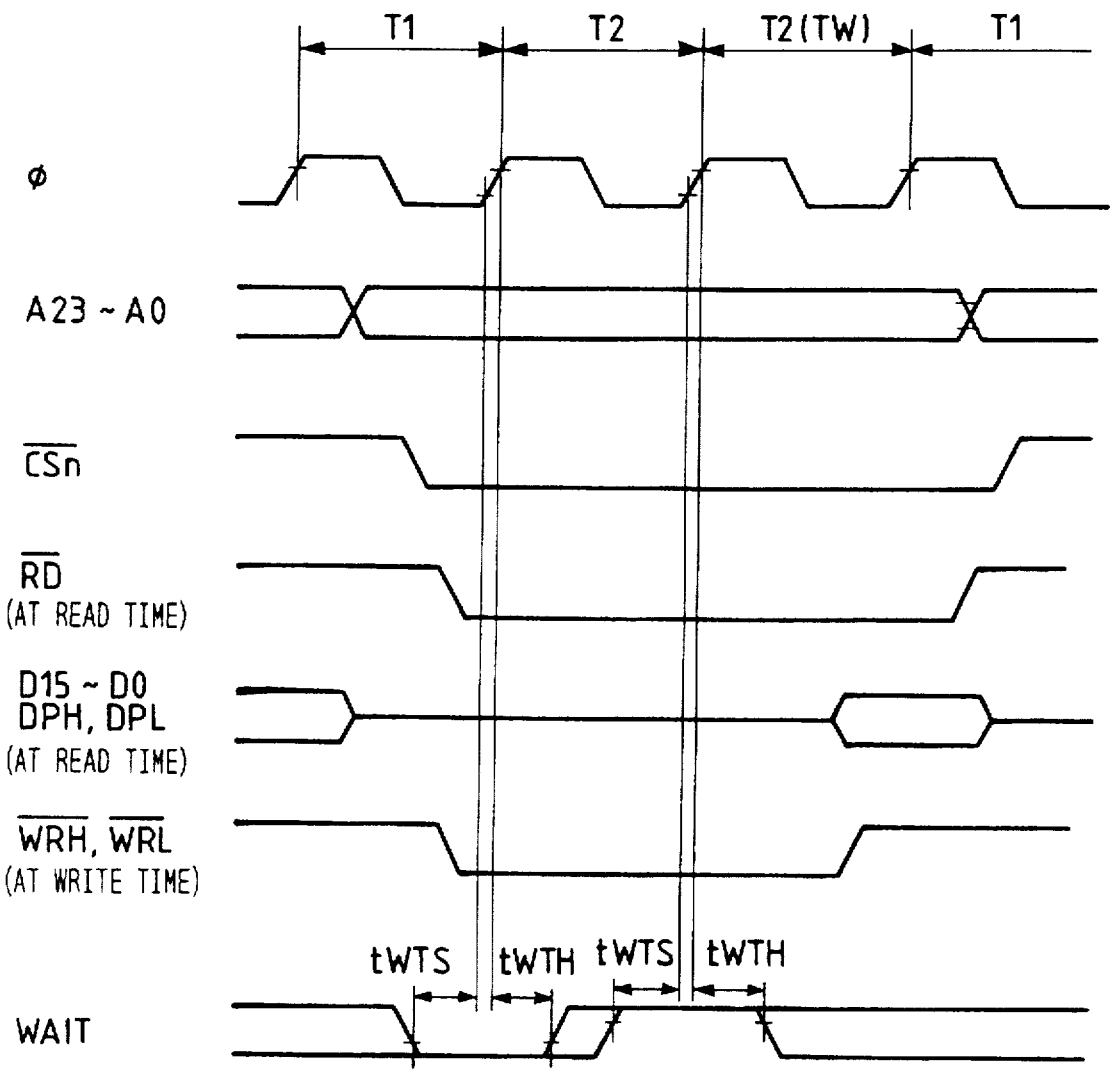
FIG. 46 is an access timing chart with a wait state inserted into basic bus cycles in two states.
Figure 47:
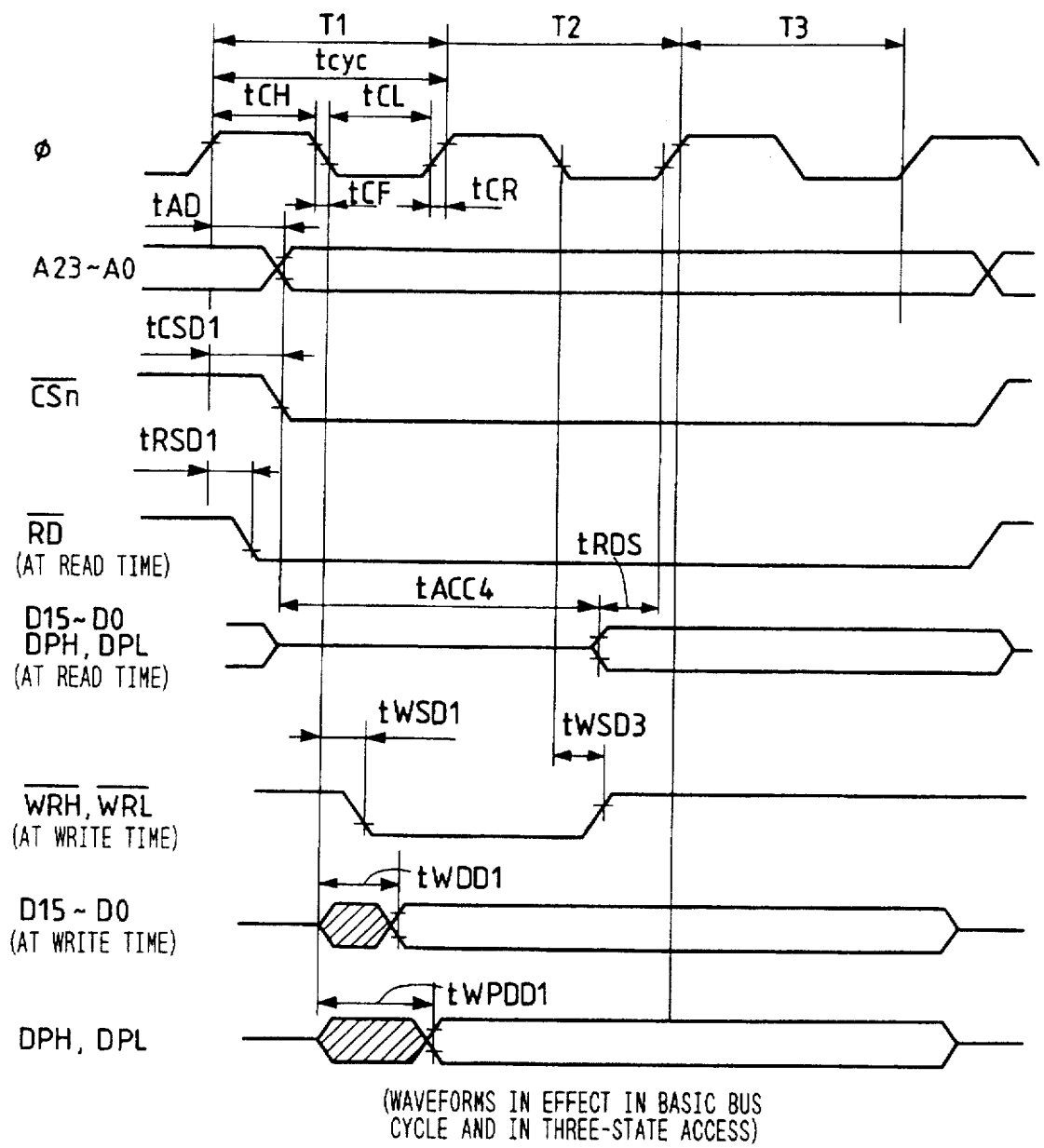
FIG. 47 is a timing chart of basic bus cycles in three states.
Figure 48:
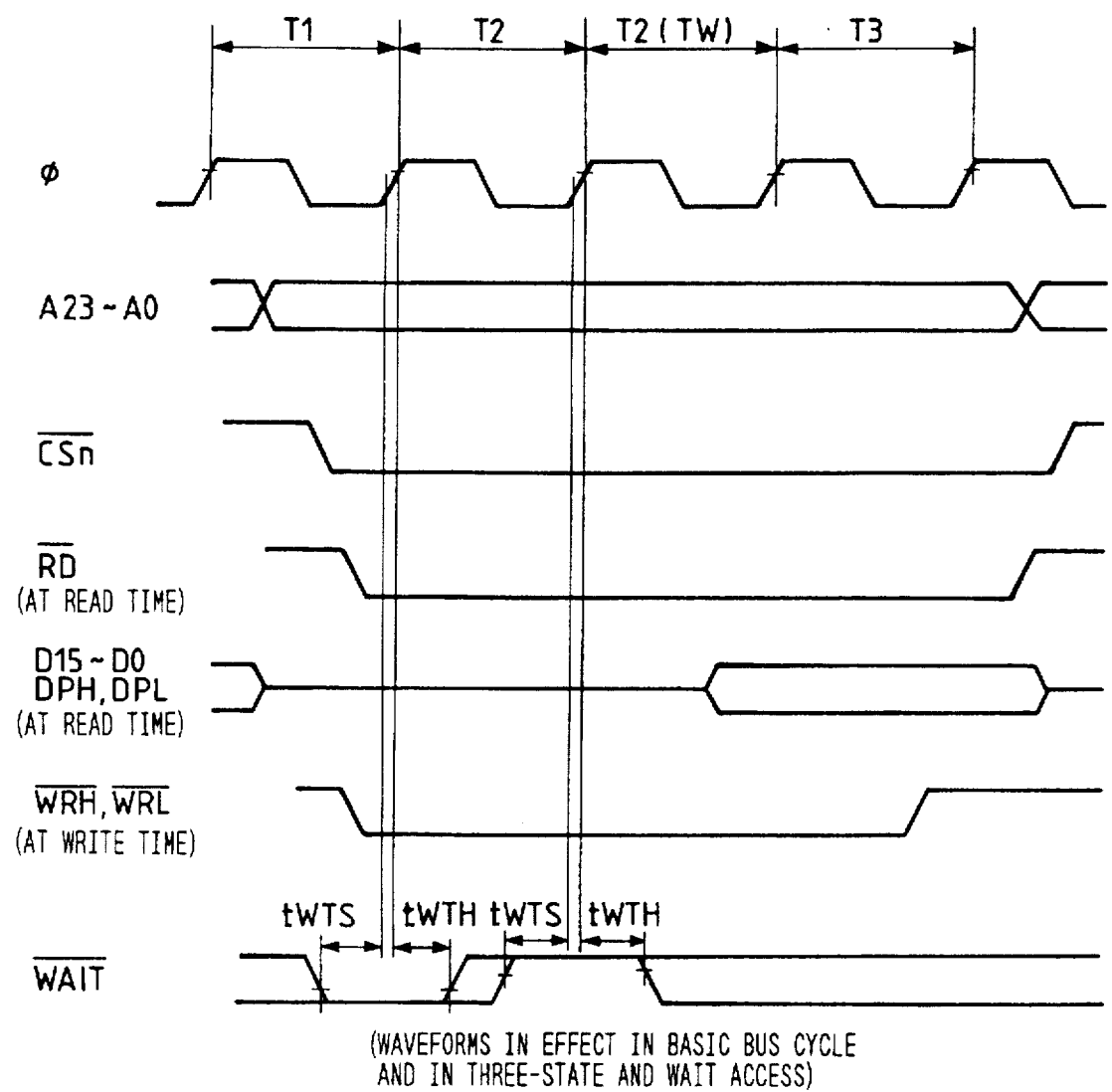
FIG. 48 is an access timing chart with a wait state inserted into basic bus cycles in three states.

FIGS. 44 through 48 illustrate typical access timings regarding the SRAM and other I/O circuits. FIG. 44 is a timing chart showing basic bus cycles in one state. FIG. 45 is a timing chart depicting basic bus cycles in two states. FIG. 46 is an access timing chart with a wait state (Tw) inserted into basic bus cycles in two states. FIG. 47 is a timing chart of basic bus cycles in three states. FIG. 48 is an access timing chart with a wait state (Tw) inserted into basic bus cycles in three states.

<12. Clock signal generation for generating strobe signals (to correct duty factor)>

What follows is a description of the clock generating circuit and strobe generation logic by which to permit high-speed page access (short pitch) to the DRAM connected direct to the microcomputer, the access being based on a 16 MHz strobe signal. In connection with strobe signal generation and port control, the inventor studied the following points:

(1) The phase relation between the non-overlapping twophase clock signals (φ 1, φ 2) is known to vary severely depending on temperature, voltages and processes. This makes it difficult to control the port circuit logic using both clock signals φ 1 and φ 2. The inventor found it preferable to use only one clock signal φ to control various strobe signals, address output and data latches, i.e., the parameters that vary at the leading edges of the clock signal.

(2) Delay devices were not preferred. This is because the delay amounts vary considerably depending on temperature, voltages and processes.

(3) The load capacity of strobe signals was lowered and the drivability of buffers was raised to reduce the absolute times tr and tf, which in turn reduced the skew time of internal and external clock signals. For example, a transistor with a size of 600/400 was used as the output buffer for the CAS* signal, with CL=30 pF. The inventor found it necessary to allow for a capacity of 15 pF for the buffer output gates and the package. This means that the improvement should be from 105 pF to 45 pF, not from 90 pF to 30 pF. Therefore, tD@ 30 pF=9 to 10 ns. The delay time concerns the buffer proper. Adding to this the impedance of the ground bounce effect amounts to a further delay of 3 to 5 ns. That is, tD@ 30 pF=12 to 13 ns (approx.).

(4) The concentration of critical portions in the memory cycle was alleviated using a duty factor correcting circuit. Even with the arrangements of (1) through (3) above in use, the requirement of tCAC>20 ns is very difficult to meet, the time interval tCAC being from the time the CAS* signal is down (asserted) until data is established. By contrast, the requirement of tCP>10 ns is relatively easy to satisfy, the negating period tCP being the interval during which the CAS* signal remains high. Because the timings available with the internal two-phase clock signal are limited, only the requirement regarding tCAC is particularly severe in bus cycles. The inventor found it preferable to meet the AC specifications of the DRAM by having the duty factor correcting circuit generate a clock signal of an appropriate duty factor for generating the CAS* signal. Generating the CAS* signal in this manner makes for a finished product conducive to mass-production and resistant to the fluctuations of testing conditions, voltages and processes while the high-speed page mode for DRAM's is supported at high frequencies. In addition, the duty factor correcting circuit is manufactured to occupy a relatively small area.

(5) With the duty factor correcting circuit applied to the clock generating circuit, the inventor studied appropriate values for duty factor correction from a system point of view. The study led the inventor to conclude that a duty factor of 35% is optimum for the DRAM operating on 5 volts. For the DRAM operating on 3 volts, the optimum duty factor was found to be 50% because of the difference in voltage threshold. The two factors are switched using a register in the bus controller. The AC specifications mentioned above are defined as follows:

tACC=tcyc·number of states−25 ns

; duration from the time the address (column address) is established until the DRAM output data is latched tCAC=tcyc·0.65−18 ns=39−18=21 ns ; duration from the time the CAS* signal is asserted until the DRAM output data is latched tRAC=tcyc·1.5−20 ns ; duration from the time the RAS* signal is asserted until the DRAM data is latched tOFF1=0 ns ; DRAM data hold time from the time the CAS* signal is raised What follows is a description of how internal clock signals are generated with the microcomputer embodying the invention. The typical prior art microcomputer incorporates a clock generating inverter operated in conjunction with a crystal oscillator and two capacitors connected externally to external terminals of the microcomputer. These components combine to generate clock signals. This clock generating method is preferred in particular for single-chip microcomputers for two major reasons: (i) the externally attached clock-related parts are inexpensive and occupy only a limited area; and (ii) the attached crystal oscillator is started and stopped by enabling and disabling with software the clock generating inverter, whereby the power dissipation is minimized in accordance with the operating state of the processor. These aspects of clock signal generation are discussed in detail in Chapters 2 and 3, "System Clock" of "A Comprehensive Guide to Applications of the Single Chip Microcomputer H8" by Noriaki Chiba (second print of the first edition in Japanese, Nov. 1, 1991, from Gijutsu-Hyoronsha; pp. 34–36). Bisecting the input clock signal inside the chip provides a clock signal having a duty factor of 50%. Suppose that an external clock signal of 20 MHz is input. In this case, the leading or trailing edges of the signal waveform are utilized to generate an internal clock signal of 10 MHz, i.e., half the original frequency. Because the external clock period remains constant, it is relatively easy to generate the internal clock signal with the duty factor of 50% when the high- and low-side lengths of the signal are held constant.

A rise in the external clock frequency is detrimental to the circuit design inside the LSI; it also contributes adversely both to the attaching cost at the time of system configuration and to the radio wave noise emitted to the outside. On the other hand, the fact remains that improvements in the processing capability of the processor are proportional to the increases in the clock frequency. Thus there is always a demand for a higher clock frequency for better processor performance. This demand has been met in recent years by raising the internal clock frequency without the increase in the external clock frequency. The techniques for executing instructions inside at high speed on a relatively low external clock frequency include the so-called "*1 clock system" and "double clock system." The *1 clock system is a system that executes internally one instruction within one clock cycle. One disadvantage of the *1 clock system is its high system cost. That is, the user is required to adjust strictly the low and high periods of the input waveform from the outside. To meet this condition in turn requires attaching an external clock pattern generator that is considerably expensive compared with the price of the CPU. The double clock system involves the use of a circuit arrangement called a phase-locked loop (PLL). With the externally input signal held in phase by the PLL circuit arrangement, a voltage-controlled oscillator (VCO) generates from the input signal an internal clock signal having a frequency higher than that of the input signal. The double clock system has two disadvantages. One disadvantage is that, because the internal clock signal is generated by the voltage-controlled oscillator, the signal cannot be generated from any input signals having too low frequencies. The other disadvantage is that the incorporated PLL circuit arrangement consumes much power.

Below is a description the operating principle and major advantages of the duty factor correcting circuit that takes the above-described points into consideration. The operating clock frequency of the microcomputer is set for, but not limited to, 16 MHz to 20 MHz for operation on 5 volts and set for, but not limited to, 8 MHz to 12.5 MHz for operation on 3 volts. With the system cost taken into account for its selection, a crystal oscillator of about 20 MHz is connected to the XTAL and EXTAL terminals for self-oscillation. Alternatively, an external clock pattern generator may be used to effect external clock input. Under cost constraints of the single-chip microcomputer, however, it is difficult to expect the user to employ an expensive external clock pattern generator capable of generating clock signals of preferred duty factors. One realistic solution to this problem is to connect a crystal oscillator externally in conjunction with the duty factor correcting circuit. The combination generates a clock signal with the duty factor of about 50%. Using this clock signal, a non-overlapping clock generating circuit generates two-phase non-overlapping clock signals ($\phi$ 1, $\phi$ 2) for internal use. The clock signals thus generated provide necessary timings to the various control points. The clock signal with the duty factor of about 50% generated by the duty factor correcting circuit is also supplied as the clock signal to a system external to the chip. The clock signal thus supplied is used as a sync signal in connection with buffers and peripheral chips.

Figure 49:
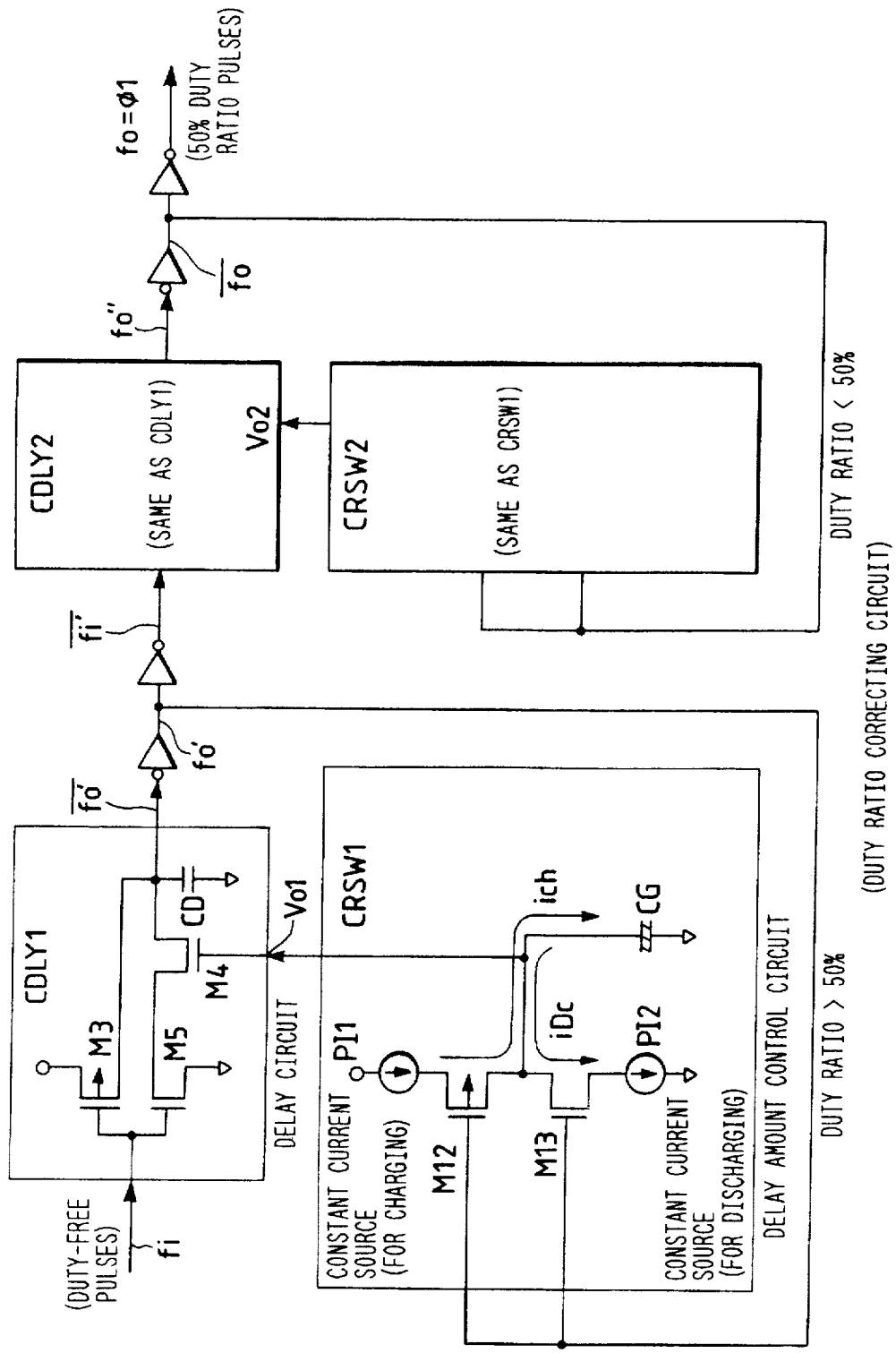
FIG. 49 is a view illustrating how a duty factor correcting circuit works.

FIG. 49 illustrates how the duty factor correcting circuit works. This circuit is intended to shape a pulse input signal fi having any duty factor into a signal of a desired duty factor (e.g., 50% or 35%). The duty factor correcting circuit comprises a two-stage delay circuit arrangement made of delay circuits CDLY1 and CDLY2 connected respectively to delay control circuits CRSWL and CRSW2. The delay circuits CDLY1 and CDLY2 are complementary to each other in terms of the phase of the input signal fi. What characterizes these delay circuits is that they delay only the leading edges of the input pulses fi and that their delay time may be adjusted using a control voltage Vo1 (or Vo2). Specifically, the resistance between source and drain of an MOSM4 (an n-channel MOS) is made variable, and so is the discharge time of a capacitor CD. This makes it possible to adjust the delay time of pulse transmission to the inverter downstream. The delay control circuit CRSW1 (CRSW2) comprises a capacitor CG, a constant-current source PI1 for charging the capacitor CG, a constant-current source PI2 for discharging the capacitor CG, and transistors M12 and M13 for switching the charging and discharging currents ich and iDc. The charging and discharging of the capacitor CG are controlled in accordance with the duty factor of an output pulse signal fo'. That in turn adjusts the control voltage Vo1

(or Vo2). Since the duty factor of the output fo is determined by the ratio of the current ich of the constant-current source PI1 to the current iDc of the constant-current source PI2, the pulse signal output fo with the duty factor of 50% is obtained regardless of the duty factor of the input fi as long as ich=iDc.

Figure 50:
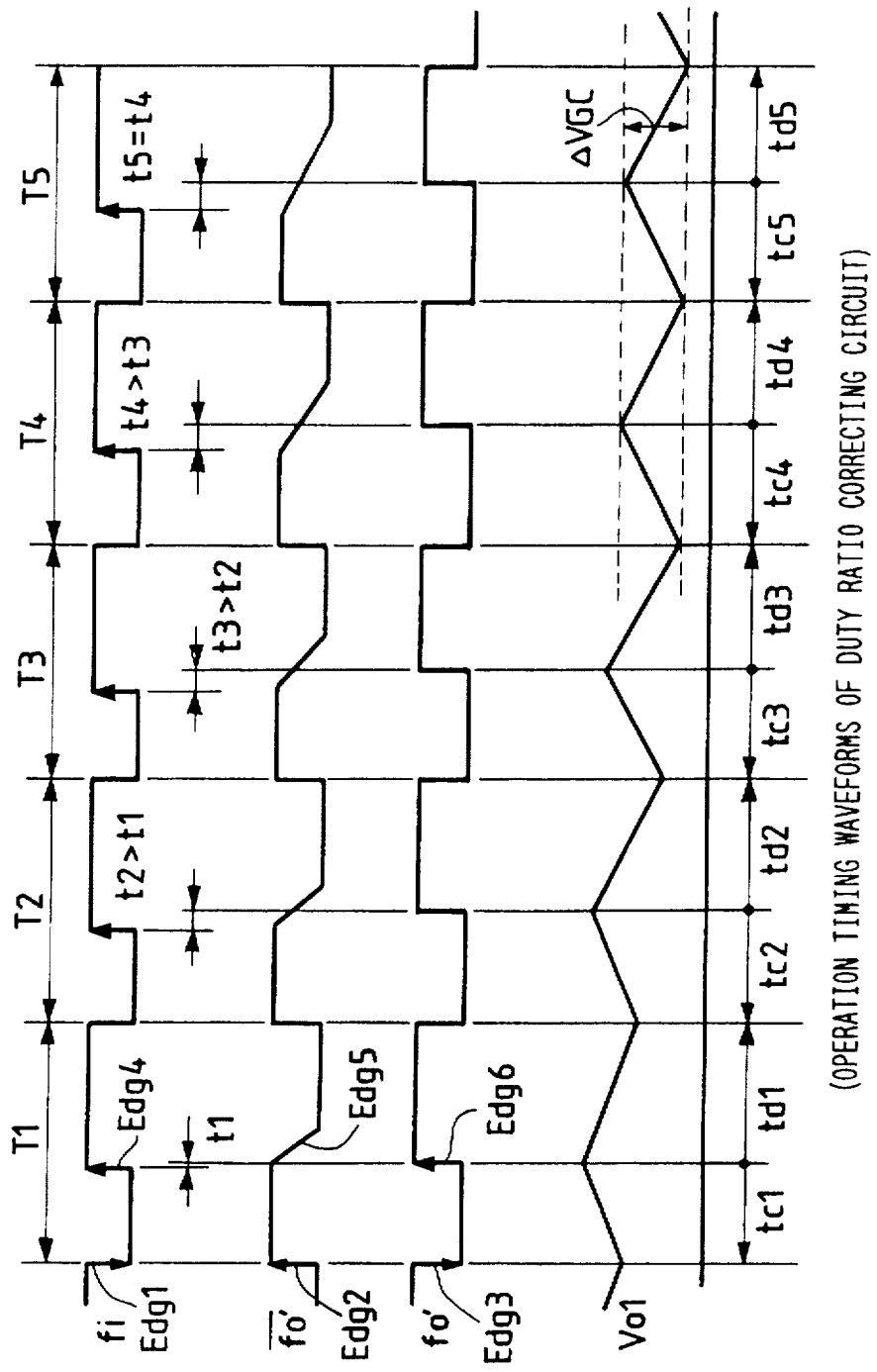
FIG. 50 is a typical operation timing waveform diagram of the duty factor correcting circuit.

FIG. 50 is a typical operation timing waveform diagram of the duty factor correcting circuit. Described below is a case in which the duty factor is greater than 50% with the circuit of FIG. 49. In FIG. 50, times tc1 through tc5 amount to the ich charging period of the capacitor CG, and times td1 through td5 constitute the discharging period of the capacitor CG. In operation, the delay circuit CDLY1 and its control circuit CRSW1 in the first stage are mainly active. At a trailing edge Edg1 of the input fi, the transistor M3 is turned on to let the capacitor CD be charged quickly. Thus there is little delay of a leading edge Edg2 of the output fo' or of a trailing edge Edg3 of the output fo. At a leading edge Edg4 of the input fi, the transistor M3 is turned off and the transistor M5 turned on. At this time, the capacitor CD is discharged slowly through the transistor M4. This causes a trailing edge Edg5 of the output fo' to take a gentle slop. As a result, a leading edge Edg6 of the output fo' is delayed. When the output fo' is at the Low level, the transistor M12 is turned on to let the current source PI1 charge the capacitor CG with the current ich. When the output fo' is at the High level, the transistor M13 is turned on to let the capacitor CG discharge through the current source PI2. Therefore, in terms of the mean charge (control voltage Vo1) of the capacitor CG, the discharging amount becomes greater than the charging amount when the High level period of the output fo' becomes longer than the Low level period thereof. It follows that the lower the control voltage Vo1, the higher the resistance of the transistor M4. The delay times of the leading edges of the output fo' grow in the order of t1<t2<t3<. . . , so that the High level period of the output is shortened. This tends to reduce the duty factor. Ultimately, the circuit reaches a steady state when there is obtained the output duty factor at which the charging to the capacitor CG is balanced with the discharging therefrom in each period. The duty factor of the output fo in effect when the steady state is reached is determined as $$\eta = iDc/(iDc+ich)\%$$

Therefore, the duty factor of the output fo' is 50% when iDc=ich. If the duty factor of the input fi is equal to or smaller than that obtained in the above steady state, the delay circuit CDLY1 acts simply as an inverter and has nothing to do with duty factor correction. In the manner described, the duty factor may be set to any value in principle by suitably adjusting the values of idC and ich.

Figure 51:
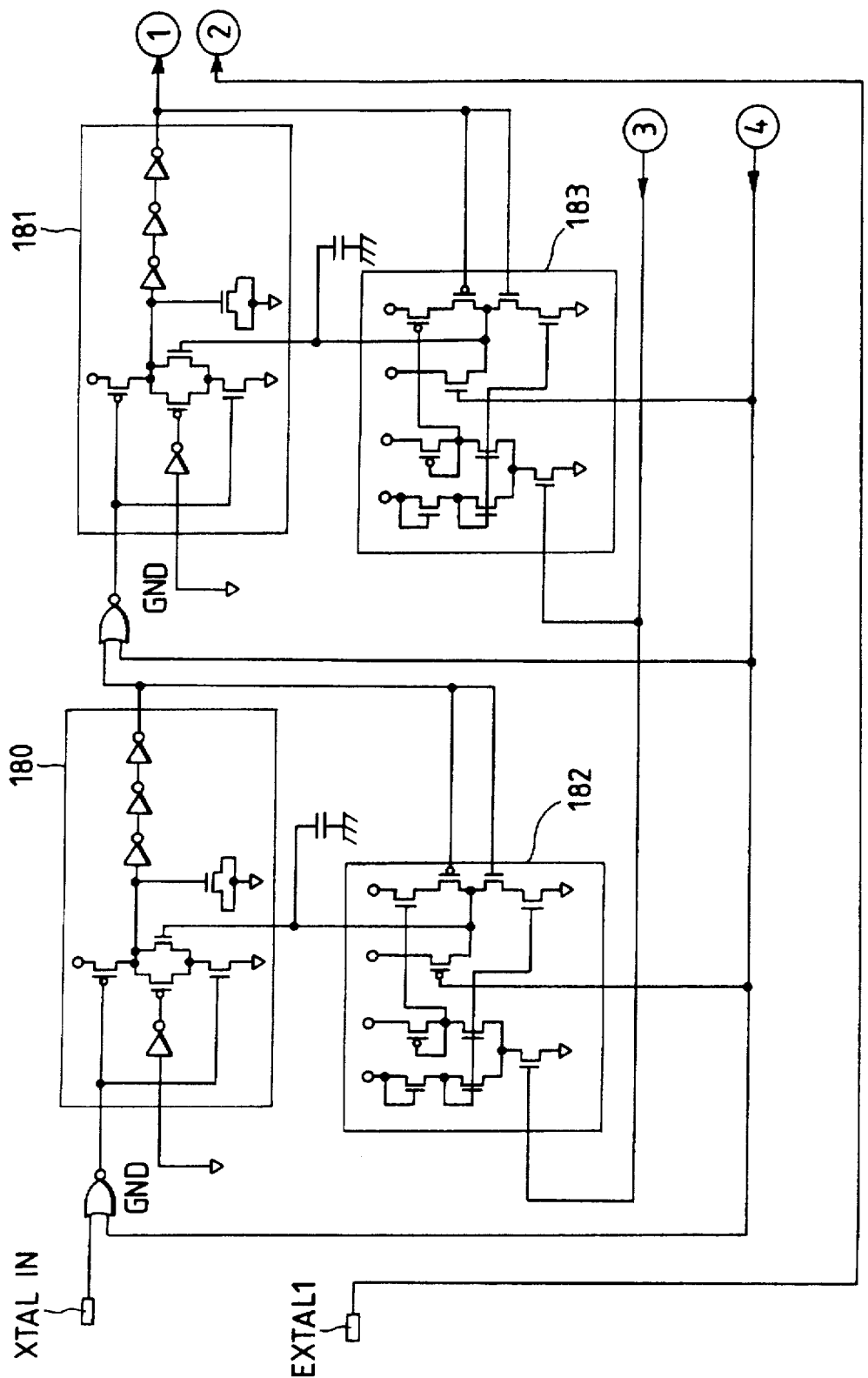
FIG. 51 is a circuit diagram of a duty factor correcting circuit for correcting the factor to 50%, the circuit being applied to a clock pulse generating circuit of the embodiment.

Described below is the clock pulse generating circuit 18 of the microcomputer MCU to which the above operating principle is applied. The clock pulse generating circuit 18 uses a pair of delay circuits 180 and 181 combined with delay control circuits 182 and 183, shown in FIG. 51, to generate a clock signal having a duty factor of 50%. Furthermore, utilizing a delay circuit 184 combined with a delay control circuit 185 in FIG. 52 allows the clock pulse generating circuit 18 to delay by 35% the rising edges of the clock signal having the 50% duty factor, whereby a clock signal with a duty factor of 15% is generated. The two setups are combined to generate a 50% and a 35% duty factor clock signal with their rising edges in phase. The delay circuit 184 has the same circuit structure as the delay circuit 180. One example of the delay control circuit 185 is shown in FIG. 53 (A). Clock signals CKS, CKM, CKI and PHIXN are generated on the basis of the 50% duty factor clock signal which in turn is generated by a given circuit construction. The 35% duty factor clock signal is generated as CK35. FIG. 53 (B) illustrates typical waveforms of the clock signal CKM having the duty factor of 50% and well as of the clock signal CK35 having the duty factor of 35%.

Figure 52:
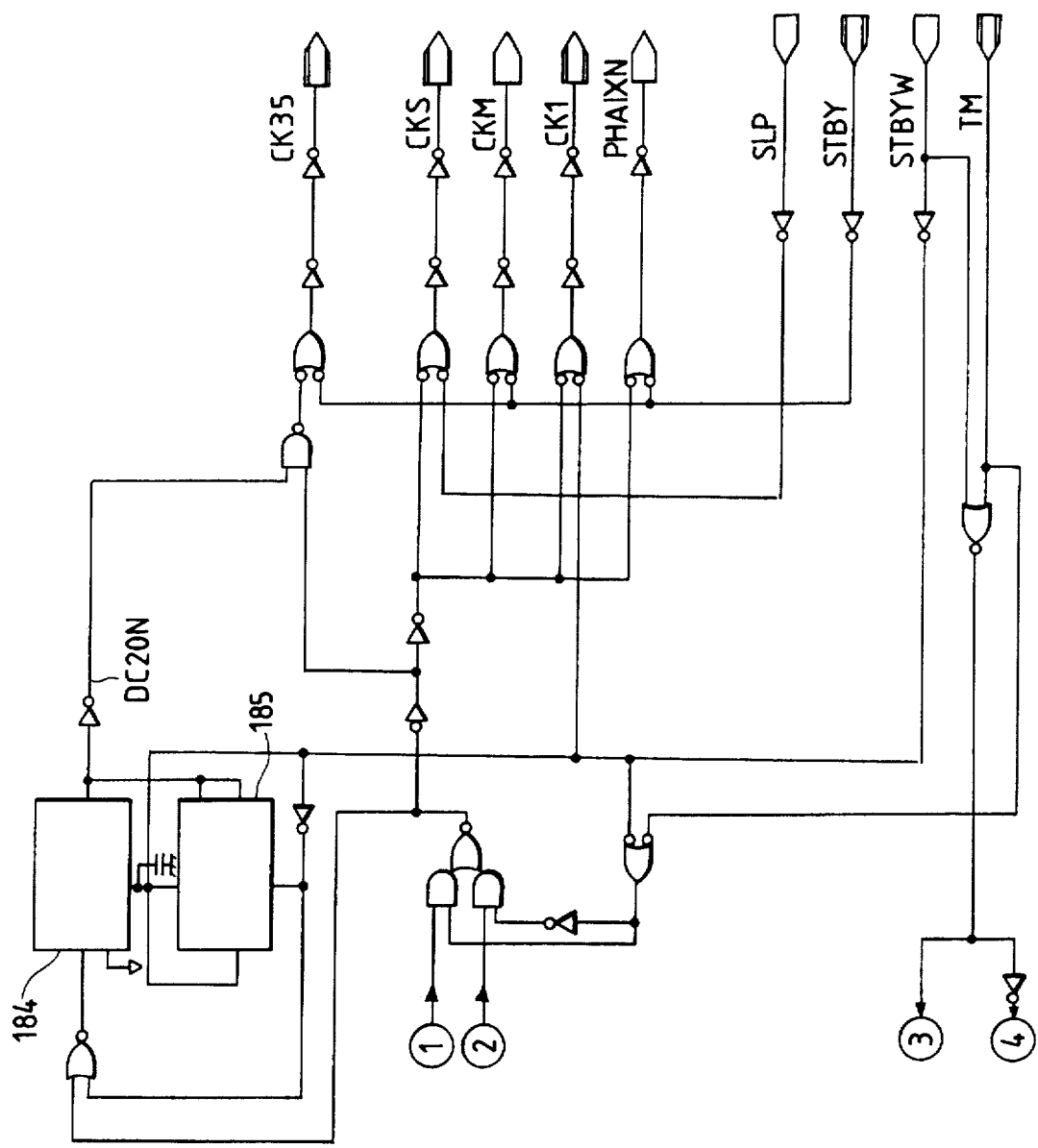
FIG. 52 is a circuit diagram of a duty factor correcting circuit for correcting the factor to 35%, the circuit being applied to the clock pulse generating circuit of the embodiment.
Figure 53A:
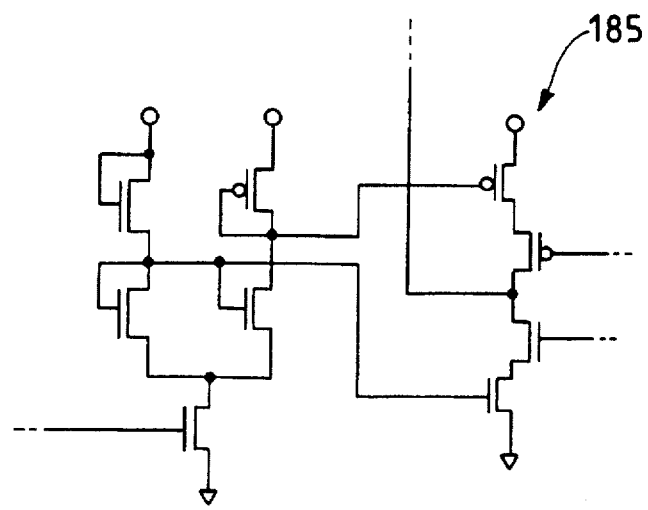
FIG. 53 is a set of two views, one view showing a delay amount control circuit included in the 35% duty factor correcting circuit, the other view depicting a waveform of a signal CKM in effect when the duty factor is 50% as well as a waveform of a signal CK35 in effect when the duty factor is 35%.
Figure 53B:
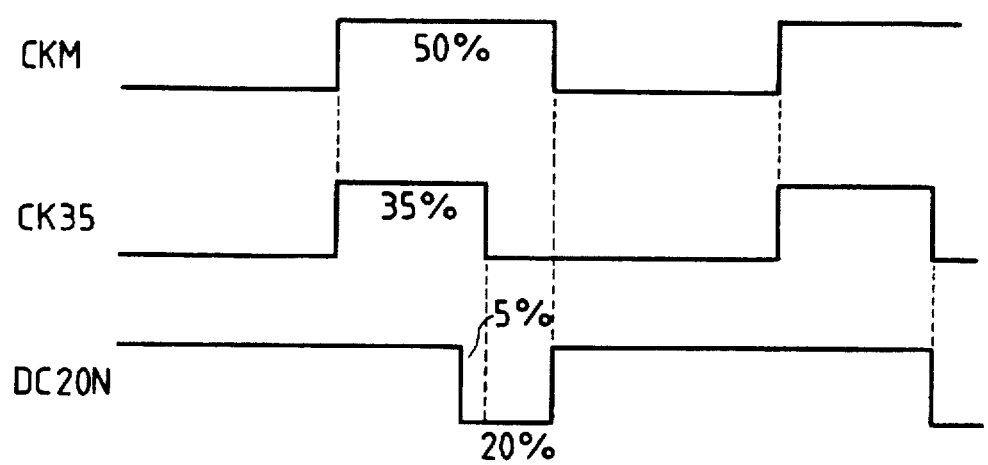

The terminals or signals of the clock pulse generating circuit in FIG. 52 have the following functions:

CK35 (output): this is a terminal that outputs the 35% duty factor clock signal (usually called φ35). When an input TM is High, the 35% duty factor is obtained by suitably processing the lock signal from the EXTALI terminal; when the input TM is Low, the clock CK35 is acquired by lowering by 35% the rising edges of the output from the 50% duty factor correcting circuit portion.

CKS (output): this is a clock output that stops only in sleep mode or in standby mode.

CKM (output): this is a clock output that stops only in standby mode. When standby mode is replaced by another mode, the clock output becomes active after the oscillation is stabilized.

CKI (output): this is a clock output that does not stop in standby mode. When standby mode is replaced by another mode, the clock output becomes active before the oscillation is stabilized. This clock output activates the watchdog timer alone.

PHAIXN (output): this is an external clock output. The function is the same as that of CKM.

SLP (input): this is a signal that indicates sleep mode.

STBY (input): this is an input signal that OR's hardware standby mode and software standby mode. The signal is brought from Low to High when a sleep instruction is executed or when hardware standby mode (provided as test mode) is entered. The signal is brought from High to Low when the watchdog timer activated by NMI overflows.

STBYW (input): this signal has approximately the same function as the signal STBY except that the signal STBYW is brought from High to Low upon NMI input. When the activated watchdog timer overflows and waits for reset, the signal STBYW is brought Low. When the signal STBY is High, the signal STBYW deactivates both the 50% duty factor correcting circuit portion made of the circuits 180 through 183 and the 35% duty factor correcting circuit portion composed of the circuits 184 and 185.

TM (input): this is a mode terminal. When brought High, the terminal connects the clock signal direct to the input from the XTALIN and EXTALI terminals without intervention of the duty factor correcting circuit. When brought Low, the terminal generates the internal clock signal using the duty factor correcting circuit. When the TM terminal is High, the 50% duty factor correcting circuit portion is deactivated unconditionally. The signal at this terminal is effective mainly in facilitating LSI testing or in having the LSI driven on an external clock signal for some reason.

XTALIN terminal (input): this is an input terminal connected to the external XTAL terminal.

EXTALI terminal (input): this is an input terminal connected to the external EXTAL terminal.

The clock signals with the duty factors of 50% and 35%, generated by the above-described clock pulse generating circuit, are used to generate various strobe signals and to control buffers. Typical uses are as follows:

(1) The address buffer receives its clock signal via the terminal CK35 of the duty factor correcting circuit basically in the same manner as normal clock distribution, i.e., the clock signal being distributed to the necessary parts via a pseudo two-phase clock driver and a clock driver arrangement.

(2) A circuit for cutting the input data to the data buffer is implemented using the φ2 clock signal.

Figure 54:
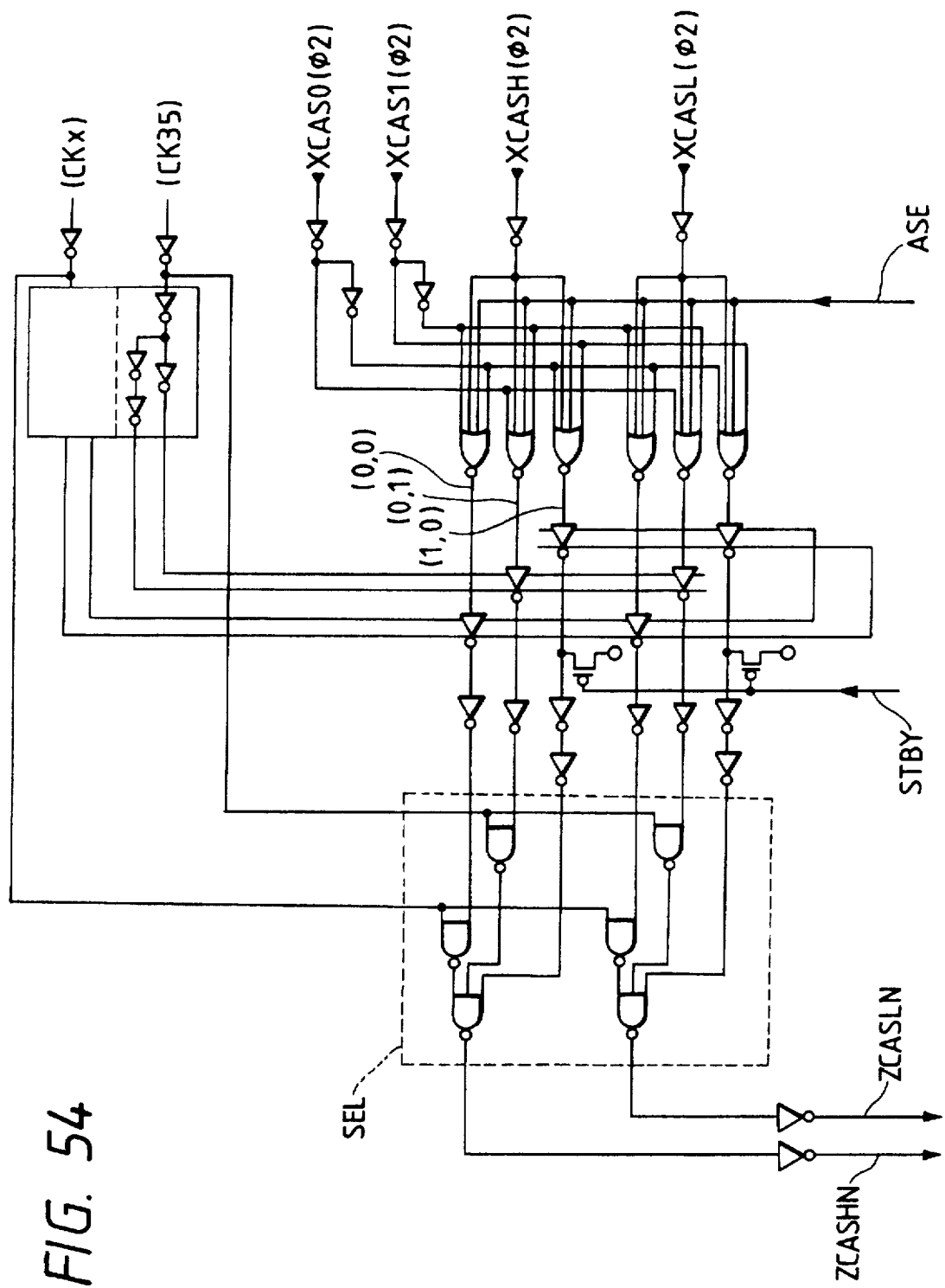
FIG. 54 is a view depicting typical strobe generation logic for generating a strobe signal CAS* by use of clock pulses with duty factors of 50% and 35%.

(3) The logic of FIG. 54 for implementing CAS* is included in the strobe generation logic 30. The input and output signals to and from the logic of FIG. 54 are as follows:

XCAS0, XCAS1=0, 0; short pitch (duty factor: 50%)
XCAS0, XCAS1=0, 1; short pitch (duty Eactor; 35%)
XCAS0, XCAS1=1, 0; long pitch
XCAS0, XCAS1=1, 1; NOP
XCASH=0; CASL* is disabled during the cycle.
XCASH=1; CASL* is enabled during the cycle.
XCASL=0; CASH* is disabled during the cycle.
XCASL=1; CASH* is enabled during the cycle.
ASE; whether or not to mask the CAS* output is designated in ASE mode (emulation mode).
CKx; this is the generic name of the clock signal having the duty factor of 50%.
ZCASLN; this is an output signal corresponding to CASL*.
ZCASHN; this is an output signal corresponding to CASH*.

Figure 55:
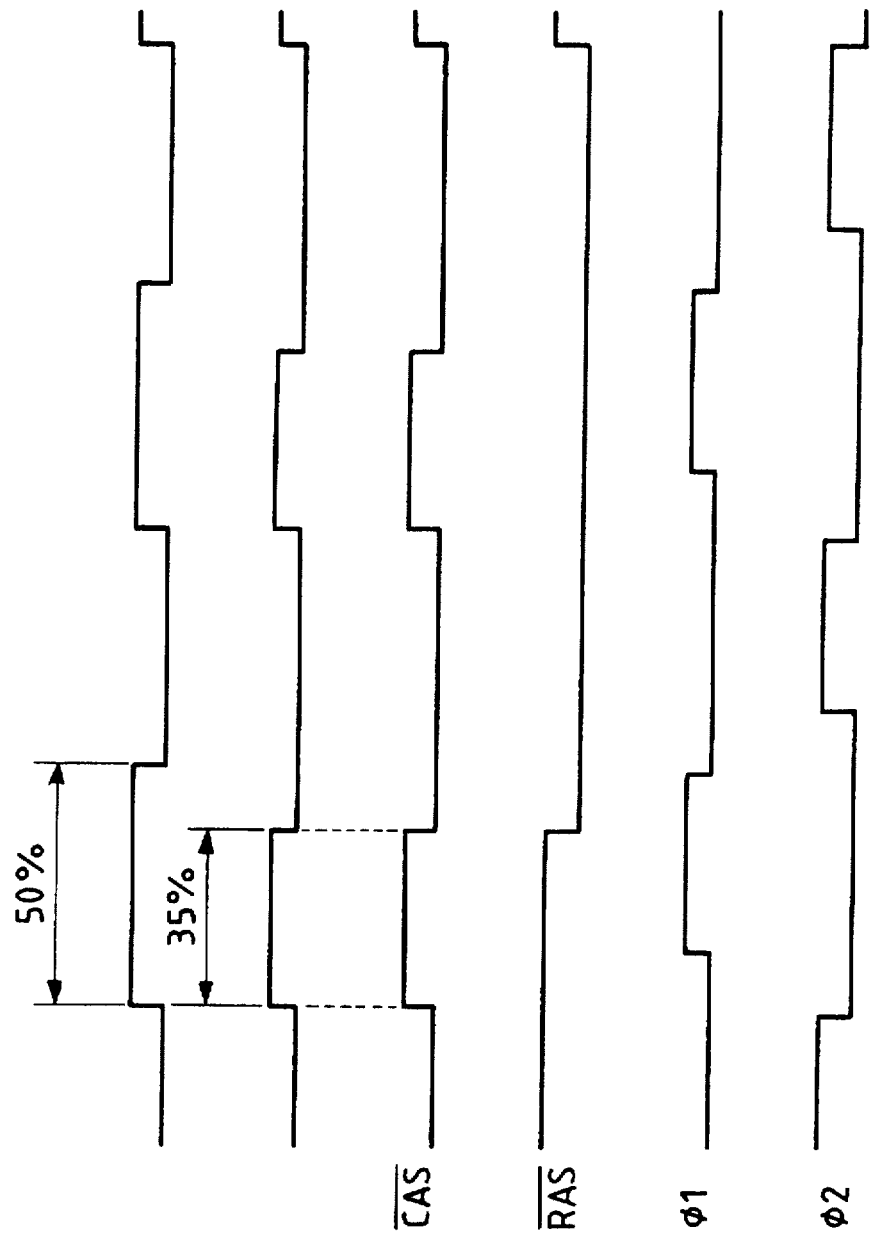
FIG. 55 is a view of waveforms illustrating typical correlations among signals CAS* and RAS* with the duty factor of 35%, non-overlapping two-phase clock signals φ 1 and φ 2, and clock signals with the duty factors of 50% and 35%.

In the circuit of FIG. 54, SEL stands for a selector that selects either the clock signal with the 50% duty factor or the clock signal with the 35% duty factor. The selector SEL is controlled basically by the combination of the levels of XCAS0 and XCAS1. FIG. 55 is a view of waveforms illustrating typical correlations among the signals CAS* and RAS* with the duty factor of 35%, nonoverlapping two-phase clock signals φ1 and φ2, and clock signals with the duty factors of 50% and 35%.

<13. Register constitution and data structure in the microcomputer>

Below is a description of the register constitution and data structure for the CPU 1 in the microcomputer MCU embodying the invention.

Figure 56A:
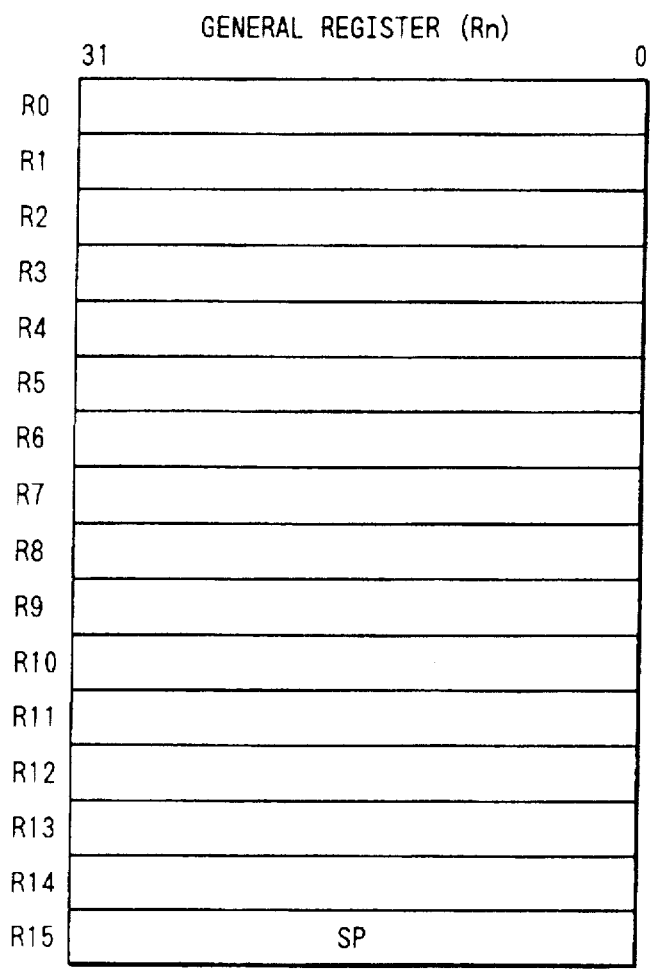
FIG. 56 is a set of views describing how a general register and a control register are structured in the embodiment.
Figure 56B:
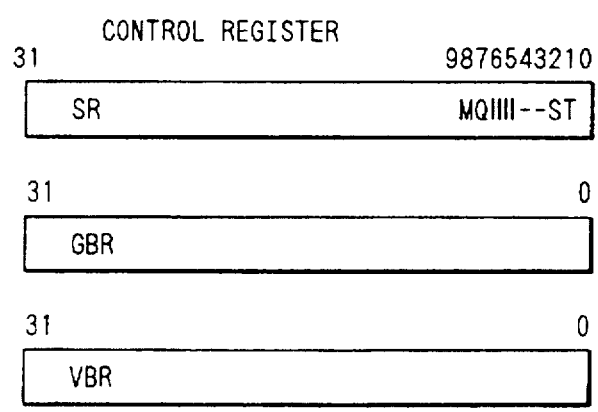

(1) General registers Rn As shown FIG. 56 (A), the CPU 1 has 16 general registers R0 through R15. Some instructions assume the register R0 to be an accumulator. For exception processing, the register R15 is assumed to be a hardware stack pointer. In FIG. 56 (A), reference characters SP denote the stack pointer.

(2) Control registers

As depicted in FIG. 56 (B), the CPU 1 has three control registers: a status register SR, a global base register GBR that accommodates an I/O base address, and a vector base register VBR that holds the base address of an interrupt vector area.

The status register SR includes bits MQIIII--ST. The functions of these bits are as follows:

Bit T: when bit T is used to indicate either "true" (1) or "false" (0), it is referenced by the MOVT, CMP, TAS. TST, BT, BF, SETT or CLRT instruction. When bit T is used to indicate a carry, a borrow or overflow/underflow, it is referenced by the ADDV/C, SUBV/C, NEGC, DIVOU/S, DIV1, SHAR/L, SHLR/L, ROTR/L or ROTCR/L instruction.

Bit S: this bit is referenced by the MAC instruction.

Bits --: these bits are reserved.

Bits IIII: these are interrupt mask bits.

Bits M/Q: these bits are referenced by the DIVOU/S or DIV1 instruction.

(3) System registers

Figure 57C:
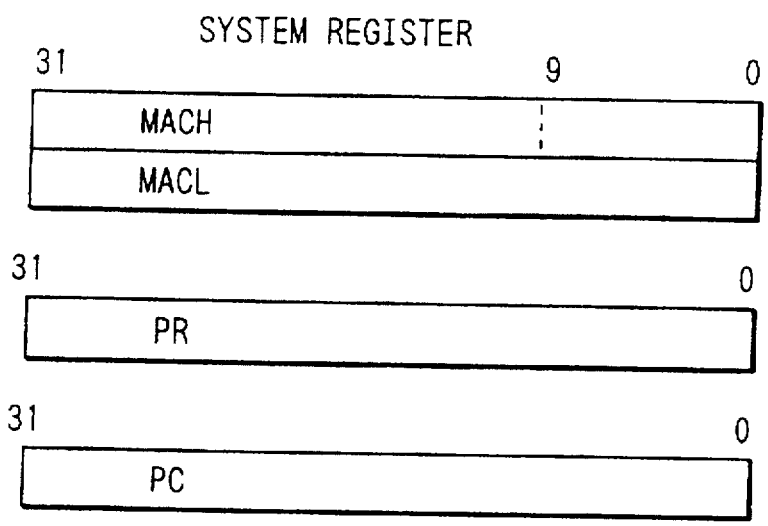
FIG. 57 is a set of views portraying how a system register is structured, how register data is constituted and how memory-held data is constructed in the embodiment.
Figure 57D:
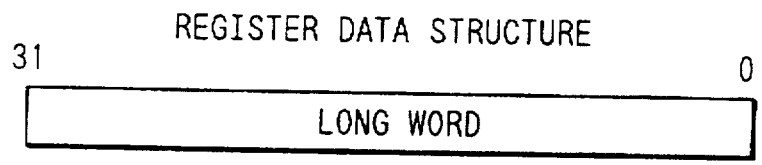
Figure 57E:
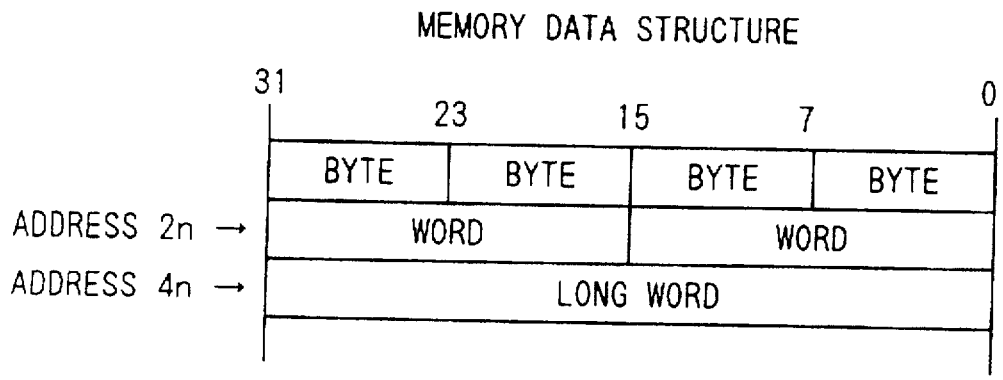

The CPU 1 has system registers MACH, MACL, PR and PC shown in FIG. 57 (C). The registers MACH and MACL are a product-sum register each. They are used to accommodate the result of a multiply or product-sum operation. In the register MACH, the low-order 10 bits are effective. The content of the register MACH is sign-extended when read out. The register PR is a procedure register that accommodates the address to which to return from a procedure. The register PC acts as a program counter.

(4) Register data structure

FIG. 57 (D) shows a typical register data structure for the CPU 1. The data size of the register operand is always the long word. If the data size of the memory operand is a byte or a word, the operand is sign-extended into a long word before being placed in the register.

(5) Memory data structure

FIG. 57 (E) depicts a typical memory data structure. An address error is recognized if word data is accessed beginning other than at address (2n) or if long word data is accessed beginning other than at address (4n). In such a case, the result of the access is unpredictable. In particular, because the hardware stack area for referencing the register R15 accommodates the registers PC and SR, that area must always be accessed in units of long words beginning at address (4n).

(6) Immediate data structure

The MOV, ADD or CMP/EQ instruction operates on immediate data in units of long words after sign extension. The TST, AND, OR or XOR instruction operates on immediate data in units of long words after zero extension. Thus the AND instruction always clears the high-order 24 bits of the destination register.

FIGS. 58 through 60 list the addressing modes and address calculations associated with the CPU 1 of the microcomputer MCU. The instructions for the CPU 1 of the microcomputer MCU have the following features:

(1) All instructions are fixed to 16 bits in length.

(2) Immediate data is placed in the memory.

(3) The immediate data in words and that in long words are both located not in instruction codes but in a table of the memory. That table is referenced in PC relative addressing mode.

(4) The basic data size for operations is the long word.

(5) A load/store architecture with the emphasis on inter-register operations is adopted.

(6) The memory access size may be switched to the byte, to the word, or to the long word.

(7) Most of the instructions are executed on a one instruction, one-state basis. For operation at 20 MHz, it takes 50 ns to execute one instruction.

(8) Delayed branch instructions are adopted. Unconditional branch instructions are equivalent to delayed branch instructions. The instruction immediately following a delayed branch instruction is executed prior to the branching. In this manner, possible pipeline disturbance is minimized at the timing of branching.

(9) The result of a compare instruction is reflected in the T bit of the register SR. A conditional branch takes place depending on the T bit being true or false.

(10) The T bit in the register SR varies in accordance with only a minimum of instructions.

37

<14. Descriptions of microcomputer instructions>

The instructions for the CPU 1 of the microcomputer MCU fall into six categories: data transfer instructions, arithmetic operation instructions, logic operation instructions, shift instructions, branch instructions, and system control instructions. FIGS. 62 through 71 list these categorized instructions in the tabular form explained in FIG. 61.

The instructions will now be described in detail in alphabetical order. Each instruction will be described in the following manner:

<Descriptive format>

Instruction name: - - - (followed by designation of the applicable category)

Format:

The instruction is presented here in assembler input format, with "imm" and "disp" replaced by a value, an expression or a symbol each in practice.

Description:

What the instruction does is described here.

Note:

The note explains what needs to be noted in particular in utilizing the instruction.

Operation:

How the instruction is executed is described. The use of the following resources is assumed:

unsigned char Read_Byte (unsigned long Addr);

unsigned short Read_Word (unsigned long Addr);

unsigned long Read_Long (unsigned long Addr);

The contents of the respective sizes of the addresses are returned. An address error is recognized if a word is read from other than address (2n) or if a long word is read from other than address (4n).

unsigned char Write_Byte (unsigned long Addr, unsigned long Data);

unsigned short Write_Word (unsigned long Addr, unsigned long Data);

unsigned long Write_Long (unsigned long Addr, unsigned long Data);

Data of the applicable size is written to each address. An address error is recognized if a word is written to other than address (2n) or a long word is written to other than address (4n).

Delay_Slot (unsigned long Addr);

Control is passed to the slot instruction at address (Addr-4). Illustratively, "Delay-Slot(4);" means that control is passed not to the instruction at address 4 but to the instruction at address 0. When control is about to be passed from this function to a subsequent instruction, the BF, BT, BRA, BSR, JMP, JSR, RTS, RTE or TRAPA instruction is detected as an illegal slot instruction immediately before the passage of control.

```
unsigned long R[16];
unsigned long SR, GBR, VBR;
unsigned long MACH, MACL, PR;
unsigned long PC;
    (Registers proper)
struct SR0 {
    unsigned long dummy        0:22;
    unsigned long              M0:1;
    unsigned long              Q0:1;
    unsigned long              I0:4;
    unsigned long dummy        1:2;
    unsigned long              S0:1;
    unsigned long              T0:1;
};
    (Definition of SR structure)
#define M ((*(struct SR0 *)(&SR)).M0)
#define Q ((*(struct SR0 *)(&SR)).Q0)
#define S ((*(struct SR0 *)(&SR)).S0)
#define T ((*(struct SR0 *)(&SR)).T0)
    (Definition of bits in register SR)
Error( char *er );
    (Error indication function)
```

38

In addition to the above, the program counter PC is assumed to point to the location 4 bytes (i.e., 2 instructions) ahead of the currently executing instruction. Illustratively, "PC=4;" means that control is passed not to the instruction at address 4 but to the instruction at address 0.

Example of use:

Given here is an example(s), in assembler mnemonic, of how the instruction is used and shows what takes place before and after the execution of the instruction. A character group ".align" indicates that the instruction is an assembler control instruction. In describing use examples, the following character groups have the following meanings:

| | |
|---|---|
| .org | location counter established |
| .data.w | word integer data obtained |
| .data.1 | long word integer data obtained |
| .sdata | character string data obtained |
| .align 2 | 2-byte boundary adjusted |
| .align 4 | 4-byte boundary adjusted |
| .arepeat 16 | expanded by repeating 16 times |
| .arepeat 32 | expanded by repeating 32 times |
| .aendr | end of expansion after designated number of iterations |

ADD ADD binary (arithmetic operation instruction)

Format:
| | |
|---|---|
| ADD | Rm, Rn |
| ADD | #imm, Rn |

Description:

The ADD instruction adds the contents of the general registers Rn and Rm, and places the result in the register Rn. The instruction is also capable of adding the content of the generator register Rn and eight-bit immediate data. Because eight-bit immediate data is sign-extended to a 32-bit length, the data can also be used for subtraction.

```
Operation:
ADD (long m, long n) /* ADD Rm, Rn */
{
    R[n]+=R[m]; PC+=2;
}
ADDI (long i, long n) /* ADD #imm, Rn */
{
    if ((i&0x80)==0) R[n]+=(0x000000FF & (long)i);
    else R[n]+=(0xFFFFFF00 | (long)i);
    PC+=2;
}
```

Example of use:
```
ADD    R0, R1
       ;R0=H'7FFFFFFF, R1=H'00000001 before execution
       ;R1=H'80000000 after execution
ADD    #H'01, R2
       ;R2=H'00000000 before execution
       ;R2=H'00000001 after execution
ADD    #H'FE, R3
       ;R3=H'00000001 before execution
       ;R3=H'FFFFFFFF after execution
```

ADDC ADD with Carry (arithmetic operation instruction)

Format:
| | |
|---|---|
| ADDC | Rm, Rn |

Description:
The ADDC instruction adds the contents of the general registers Rn and Rm as well as the T bit, and places the result in the register Rn. A carry is reflected in the T bit depending on the result of the operation. This instruction is used for add operations involving more than 32 bits.

```
Operation:
    ADDC (long m, long n) /* ADDC Rm, Rn */
    {
        unsigned long tmp0, tmp1;
        tmp1=R[n]+R[m];
        tmp0=R[n]; R[n]=tmp1+T;
        if (tmp0 > tmp1) T=1; else T=0;
        if (tmp1 > R[n]) T=1;
        PC+=2;
    }
Example of use:
    CLRT            ;R0:R1 (64 bits) +R2:R3 (64 bits) =R0:R1
    (64 bits)
    ADDC R3, R1
                    ;T=0, R1=H'00000001, R3=H'FFFFFFFF before
execution
                    ;T=1, R1=H'00000000 after execution
    ADDC R2, R0
                    ;T=1, R0=H'00000000, R2=H'00000000 before
execution
                    ;T=0, R0=H'00000001 after execution
ADDV ADD with (V flag) overflow check (arithmetic opera-
tion instruction)
Format:
    ADDV Rm, Rn
```

Description:
The ADDV instruction adds the contents of the general registers Rn and Rm, and places the result in the register Rn. If an overflow occurs, the T bit is set.

```
Operation:
    ADDV (long m, long n) /* ADDV Rm, Rn*/
    {
        long dest, src, ans;
        if ((long)R[n]>=0) dest=0; else dest=1;
        if ((long)R[m]>=0) src=0; else src=1;
        src+=dest;
        R[n]+=R[m];
        if ((long)R[n]>=0) ans=0; else ans=1;
        ans+=dest;
        if ((src==0 || src==2) {if (ans==1) T=1; else
T=0; }
        else T=0;
        PC+=2;
    }
Example of use:
    ADDV    R0, R1
            ;R0=H'00000001, R1=H'7FFFFFFE, T=0 before
execution
            ;R1=H'7FFFFFFF, T=0 after execution
    ADDV    R0, R1
            ;R0=H'00000002, R1=H'7FFFFFFE, T=0 before
execution
            ;R1=H'80000000, T=1 after execution
AND AND logical (logical operation instruction)
Format:
    AND     Rm, Rn
    AND     #imm, R0
    AND.B   #imm, @(R0, GBR)
```

Description:
The AND instructions AND's the contents of the general registers Rn and Rm, and places the result in the register Rn. In a specialized format, the AND instruction is capable of AND'ing the content of the general register R0 and zero-extended eight-bit immediate data, or of AND'ing an eight-bit memory part and eight-bit immediate data relative to the global base register GBR.

Note:
The instruction "AND #imm, R0" clears the high-order 24 bits of the register R0 whenever executed.

```
Operation:
    AND (long m, long n) /* AND Rm, Rn */
    {
        R[n]&=R[m];
        PC+=2;
    }
    ANDI (long i) /* AND #imm, R0 */
    {
        R[0]&=(0x000000FF & (long)i);
        PC+=2;
    }
    ANDM (long i) /* AND.B #imm, @(R0, GBR) */
    {
        long temp;
        temp=(long) Read_Byte (GBR+R[0]);
        temp&=(0x000000FF & (long)i);
        Write_Byte (GBR+R[0], temp);
        PC+=2;
    }
Example of use:
    AND     R0, R1
            ;R0=H'AAAAAAAA, R1=H'55555555 before execution
            ;R1=H'00000000 after execution
    AND     #H'0F, R0
            ;R0=H'FFFFFFFF before execution
            ;R0=H'0000000F after execution
    AND.B   #H'80, @(R0, GBR)
            ;@(R0, GBR)=H'A5 before execution
            ;@(R0, GBR)=H'80 after execution
BF/BT Branch if False/True (branch instruction)
Format:
    BF disp
    BT disp
```

Description:
The BF/BT instruction is a conditional branch instruction that references the T bit. When T=1, the BT instruction branches while the BF instruction executes the next instruction. When T=0, by contrast, the BF instruction branches while the BT instruction executes the next instruction. The branch destination is the address obtained by adding a displacement to the program counter PC. The program counter PC indicates the starting address pointing to the location two instructions after this instruction. Because an eight-bit displacement is used and doubled after sign extension, the relative distance to the branch destination is between −256 bytes and +256 bytes. If the branch destination cannot be reached within the above range, the shortfall will be addressed using the combination of the BF/BT instruction with a BRA or JMP instruction.

```
Operation:
    BF (long d) /* BF disp */
    {
        long disp;
        if ((d&0x80)==0) disp=(0x000000FF & (long)d);
        else disp=(0xFFFFFF00 | (long)d);
        if (T==0) PC=PC+(disp<<1)+4;
        else PC+=2;
    }
    BT (long d) /* BT disp */
    {
        long disp;
        if ((d&0x80)==0) disp=(0x000000FF & (long)d);
        else disp=(0xFFFFFF00 | (long)d);
        if (T==1) PC=PC+(disp<<1)+4;
        else PC+=2;
    }
Example of use:
    CLRT            ;always T = 0
```

```
BT TRGET_T      ;no branch made because T = 0
BF TRGET_F      ;branch made to TRGET_F because T = 0
NOP             ;
NOP             ;<- position of PC used in calculat-
ing branch destination address with BF instruction
TRGET_F:        ;<- branch destination of BF instruc-
tion
BRA BRAnch (branch instruction)
Format:
   BRA disp
```

Description:

The BRA instruction is an unconditional branch instruction. The branch destination is the address obtained by adding a displacement to the program counter PC. The program counter PC indicates the starting address pointing to the location two instructions after this instruction. Because a 12-bit displacement is used and doubled after sign extension, the relative distance to the branch destination is between −4,096 bytes and +4,094 bytes. If the branch destination cannot be reached within the above range, the shortfall will be addressed first by having the branch destination address moved to a register with the MOV instruction and then by making a change to the JMP instruction.

Note:

Because the BRA instruction is a delayed branch instruction, the instruction immediately following this instruction is executed prior to the branch. Neither an address error nor an interruption is accepted between this instruction and the instruction that comes immediately thereafter. If the BRA instruction is followed immediately by a branch instruction, the latter instruction is recognized as an illegal slot instruction.

```
Operation:
   BRA (long d) /* BRA disp */
   {
      unsigned long temp;
      long disp;
      if ((d&0x800)==0) disp=(0x00000FFF & d);
         else disp=(0xFFFFF000 | d);
      temp=PC;
      PC=PC+(disp<<1)+4;
      Delay_Slot (temp+2)
   }
Example of use:
   BRA TRGET       ;branch to TRGET
   ADD R0, R1      ;executed prior to branch
   NOP             ;<- position of PC used in calculat-
ing branch destination address with BRA instruction
   TRGET:          ;<- branch destination of BRA in-
struction
BSR Branch to SubRoutine (branch instruction)
Format:
   BSR disp
```

Description:

The BSR instruction causes a delayed branch to the procedure of the specified address. This instruction saves the content of the program counter PC, and causes a branch to the address obtained by adding a displacement to the PC content. The program counter PC indicates the starting address pointing to the location two instructions after this instruction. Because a 12-bit displacement is used and doubled after sign extension, the relative distance to the branch destination is between −4,096 bytes and +4,094 bytes. If the branch destination cannot be reached within the above range, the shortfall will be addressed first by having the branch destination address moved to a register with the MOV instruction and then by making a change to the JMP instruction. In combination with an RTS (return from subroutine) instruction, the BSR instruction is used to call a procedure.

Note:

Because the BSR instruction is a delayed branch instruction, the instruction immediately thereafter is executed prior to the branch. Neither an address error nor an interruption is accepted between this instruction and the instruction that comes immediately thereafter. If the BSR instruction is followed immediately by a branch instruction, the latter instruction is recognized as an illegal slot instruction.

```
Operation:
   BSR (long d) /* BSR disp */
   {
      long disp;
      if ((d&0x800)==0) disp=(0x00000FFF & d);
         else disp=(0xFFFFF000 | d);
      PR=PC;
      PC=PC+(disp<<1)+4;
      Delay_Slot (PR+2);
   }
Example of use:
   BSR TRGET       ;branch to TRGET
   MOV R3, R4      ;executed prior to branch
   ADD R0, R1      ;<- This provides the position of PC
used in calculating branch destination address with the
BSR instruction, and indicates the address to return to
(content of PR) from the procedure.
   ...
   TRGET:          ;<- entry of procedure
   MOV R2, R3      ;
   RTS             ;return to the above ADD instruction
   MOV #1, R0      ;executed prior to branch
CLRT CLeaR T bit (system control instruction)
Format:
   CLRT
Description:
   The CLRT instruction clears the T bit.
Operation:
   CLRT( ) /* CLRT */
   {
      T=0;
      PC+2;
   }
Example of use:
   CLRT            ;T=1 before execution
                   ;T=0 after execution
CLRMAC CLeaR MAC register (system control instruction)
Format:
   CLRMAC
```

Description:

The CLRMAC instruction clears the MACH and MACL registers.

```
Operation:
   CLRMAC( ) /* CLRMAC */
   {
      MACH=0;
      MACL=0;
      PC+=2;
   }
Example of use:
   CLRMAC                  ;MAC register cleared and ini-
tialized
   MAC.W @R0+, @R1+        ;product-sum operation
   MAC.W @R0+, @R1+        ;
CMP/cond CoMPare conditional (arithmetic operation in-
struction)
Format:
```

-continued
```
CMP/cond Rm, Rn
CMP/PZ Rn
CMP/PL Rn
CMP/EQ #imm, R0
```

Description:
The CMP/cond instruction compares the contents of the general registers Rn and Rm, and sets the T bit if designated conditions ("cond") are found to be met. If the conditions are not met, the T bit is cleared. The content of the register Rn remains unchanged. Up to eight conditions may be designated. For PZ and PL conditions, the CMP/cond instruction compares the content of the register Rn with 0. For an EQ condition, the instruction may be used to compare sign-extended eight-bit immediate data with the content of the register R0. The content of the register R0 remains unchanged.

| <Mnemonic> | <Description> |
|---|---|
| CMP/EQ Rm, Rn | T = 1 when Rn = Rm |
| CMP/GE Rm, Rn | T = 1 when Rn ≧ Rm (signed) |
| CMP/GT Rm, Rn | T = 1 when Rn > Rm (signed) |
| CMP/HI Rm, Rn | T = 1 when Rn > Rm (unsigned) |
| CMP/HS Rm, Rn | T = 1 when Rn ≧ Rm (unsigned) |
| CMP/PL Rn | T = 1 when Rn > 0 |
| CMP/PZ Rn | T = 1 when Rn ≧ 0 |
| CMP/STR Rm, Rn | T = 1 when some bytes are equal |
| CMP/EQ #imm, R0 | T = 1 when R0 = imm |

Operation:
```
CMPEQ (long m, long n) /* CMP_EQ Rm, Rn */
{
    if (R[n]==R[m]) T=1; else T=0;
    PC+=2
}
CMPGE (long m, long n) /* CMP_GE Rm, Rn */
{
    if ((long)R[n]>=(long)R[m]) T=1; else T=0;
    PC+=2;
}
CMPGT (long m, long n) /* CMP_GT Rm, Rn */
{
    if ((long)R[n]>=(long)R[m]) T=1; else T=0;
    PC+=2;
}
CMPHI (long m, long n) /* CMP_HI Rm, Rn */
{
    if ((unsigned long)R[n]>(unsigned long)R[m])
T=1; else T=0;
    PC+=2;
}
CMPHS (long m, long n) /* CMP_HS Rm, Rn */
{
    if ((unsigned long)R[n]>=(unsigned long)R[m]
T=1; else T=0;
    PC+=2;
}
CMPPL (long n) /* CMP_PL Rn */
{
    if ((long)R[n]>0) T=1; else T=0;
    PC+=2;
}
CMPPZ (long n) /* CMP_PZ Rn */
{
    if ((long)R[n]>=0) T=1; else T=0;
    PC+=2;
}
CMPSTR (long m, long n) /* CMP_STR Rm, Rn */
{
    unsigned long temp;
    long HH, HL, LH, LL;
    temp=R[n]^R[m]
    HH=(temp&0xFF000000)>>12;
    HL=(temp&0x00FF0000)>>8;
    LH=(temp&0x0000FF00)>>4; LL=temp&0x000000FF;
    HH=HH&&HL&&LH&&LL;
    if (HH==0) T=1; else T=0;
    PC+=2;
}
CMPIM (long i) /* CMP_EQ #imm, R0 */
{
    long imm;
    if ((i&0x80)==0) imm=(0x000000FF & (long i));
    else imm=(0xFFFFFF00 | (long i));
    if (R[0]==imm) T=1; else T=0;
    PC+=2;
}
```
Example of use:
```
CMP/GE R0, R1      ;R0=H'7FFFFFFF, R1=H'80000000
BT TRGET_T         ;no branch made because T=0
CMP/HS R0, R1      ;R0=H'7FFFFFFF, R1=H'80000000
BT TRGET_T         ;branch made because T=1
CMP/STR R2, R3     ;R2="ABCD", R3="XYCZ"
BT TRGET_T         ;branch made because T=1
```

| | |
|---|---|
| DIV0S | DIVide (step 0) as Signed |
| DIV0U | DIVide (step 0) as Unsigned |
| DIV1 | DIVide 1 step (arithmetic operation instructions) |

Format:
```
DIV1     Rm, Rn
DIV0S    Rm, Rn
DIV0U
```

Description:
These instructions are used to divide the 32-bit content of the general register Rn in one step by the content of the register Rm, and to set the resulting one bit to the T bit. The DIV0S instruction is an initializing instruction for signed division. Executing this instruction sets the most significant bit (MSB) of the dividend (Rn) to the Q bit, the MSB of the divisor (Rm) to the M bit, and the result of exclusive-OR'ing the M and Q bits to the T bit. The DIV0U instruction is an initializing instruction for unsigned division and clears the M, Q and T bits when executed. Repeating the DIV1 instruction (in combination with ROTCL if necessary) as many times as the number of divisor bits provides a quotient. While the DIV1 instruction is being repeated, intermediate results are placed in a designated register and in the M, Q and T bits. If these storage locations are rewritten inadvertently by software, the result of the divide operation becomes unpredictable. These instructions do not provide zero division, overflow detection or remainder computation. A typical division sequence is shown below in "Example of use."

Operation:
```
DIV0U( ) /* DIV0V */
{
    M=Q=T=0;
    PC+=2;
}
DIV0S (long m, long n) /* DIV0S Rm, Rn */
{
    if ((R[n] & 0x80000000)==0) Q=0;
    else Q=1;
    if ((R[m] & 0x80000000)==0) M=0;
    else M=1;
    T=! (M==Q);
    PC+=2;
}
DIV1 (long m, long n) /* DIV1 Rm, Rn */
{
    unsigned long tmp0;
    unsigned char old_q, tmp1;
    old_q=0;
    Q=(unsigned char)((0x80000000 & R[n])!=0);
    R[n]<<=1;
```

```
        R[n]=(unsigned long)T;
    switch (old_q){
        case 0: switch (M){
            case 0: tmp0=R[n]
                R[n]-=R[m];
                tmp1=(R[n]>tmp0);
                switch (Q){
                    case 0: Q=tmp1;
                        break;
                    case 1: Q=(unsigned char)(tmp1==0);
                        break;
                }
                break
            case 1: tmp0=R[n];
                R[n]+=R[n];
                tmp1=(R[n]<tmp0);
                switch (Q){
                    case 0: Q=(unsigned char)(tmp1==0);
                        break;
                    case 1: Q=tmp1;
                        break;
                }
                break;
            }
            break;
        case 1: switch (M){
            case 0: tmp0=R[n];
                R[n]+=R[m]
                tmp1=(R[n]<tmp0);
                switch (Q){
                    case 0: Q=tmp1;
                        break;
                    case 1: Q=(unsigned char)(tmp1==0);
                        break;
                }
                break;
            case 1: tmp0=R[n];
                R[n]-=R[m]
                tmp1=(R[n]>tmp0);
                switch (Q){
                    case 0: Q=(unsigned char)(tmp1==0);
                        break;
                    case 1: Q=tmp1;
                        break;
                }
                break;
            }
            break;
        }
    T=(Q==M);
    PC+=2;
}
```

Example of use 1:
R1 (32 bits) ÷ R0 (16 bits) = R1 (16 bits): unsigned
```
    SHLL16 R0            ;high-order 16 bits set for divisor
and low-order 16 bits for 0
    TST R0, R0           ;zero division check
    BT ZERO_DIV          ;
    CMP/HS R0, R1        ;overflow check
    BT OVER_DIV          ;
    DIVOU                ;flag initialized
    .arepeat 16          ;
    DIV1 R0, R1          ;repeated 16 times
    .aendr               ;
    ROTCL R1             ;
    EXTU.W R1, R1        ;R1 = quotient
```
Example of use 2:
R1: R2 (64 bits) ÷ R0 (32 bits) = R2 (32 bits): unsigned
```
    TST R0, R0           ;zero division check
    BT ZERO_DIV          ;
    CMP/HS R0, R1        ;overflow check
    BT OVER_DIV          ;
    DIVOU                ;flag initialized
    .arepeat 32          ;
    ROTCL R2             ;repeated 32 times
    DIV1 R0, R1          ;
    .aendr               ;
    ROTCL R2             ;R2 = quotient
```
Example of use 3:
R1 (16 bits) ÷ R0 (16 bits) = R1 (16 bits): signed
```
    SHLL16 R0            ;high-order 16 bits set for divisor
and low-order 16 bits for 0
    EXTS.W R1, R1        ;dividend sign-extended to 32 bits
    XOR R2, R2           ;R2 = 0
    MOV R1, R3           ;
    ROTCL R3             ;
    SUBC R2, R1          ;1 subtracted when dividend is nega-
tive
    DIVOS R0, R1         ;flag initialized
    .arepeat 16          ;
    DIV1 R0, R1          ;repeated 16 times
    .aendr               ;
    EXTS.W R1, R1        ;
    ROTCL R1             ;R1 = quotient (1's complement)
    ADDC R2, R1          ;1 added for conversion to 2's com-
plement when MSB of quotient is 1
    EXTS.W R1, R1        ;R1 = quotient (2's complement)
```
Example of use 4:
R2 (32 bits) ÷ R0 (32 bits) = R2 (32 bits): signed
```
    MOV R2, R3           ;
    ROTCL R3             ;
    SUBC R1, R1          ;dividend sign-extended to 64 bits
(R1: R2)
    XOR R3, R3           ;R3 = 0
    SUBC R3, R2          ;1 subtracted for conversion to 1's
complement when dividend is negative
    DIVOS R0, R1         ;flag initialized
    .arepeat 32          ;
    ROTCL R2             ;repeated 32 times
    DIV1 R0, R1          ;
    .aendr               ;
    ROTCL R2             ;R2 = quotient (1's complement)
    ADDC R3, R2          ;1 added for conversion to 2's com-
plement when MSB of quotient is 1
                         ;R2 = quotient (2's complement)
```
EXTS EXTend as Signed (arithmetic operation instruction)
Format:
    EXTS.B Rm, Rn
    EXTS.W Rm, Rn Description:
The EXTS instruction sign-extends the content of the general register Rm, and places the result in the register Rn. In the case of byte designation, the instruction transfers the content of bit 7 in the register Rm to bits 8 through 31 in the register Rn. In the case of word designation, the instruction transfers the content of bit 15 in the register Rm to bits 16 through 31 in the register Rn.

Operation:
```
EXTSB (long m, long n) /* EXTS.B Rm, Rn */
{
    R[n]=R[m];
    if ((R[m]&0x00000080)==0) R[n]&=0x000000FF;
        else R[n]|=0XFFFFFF00;
    PC+=2;
}
EXTSW (long m, long n) /* EXTS.W Rm, Rn */
{
    R[n]=R[m];
    if ((R[m]&0x00008000)==0) R[n]&=0x0000FFFF;
        else R[n]|=0xFFFF0000;
    PC+=2;
}
```
Example of use:
```
    EXTS.B R0, R1        ;R0=H'00000080 before execution
                         ;R1=H'FFFFFF80 after execution
    EXTS.W R0, R1        ;R0=H'00008000 before execution
                         ;R1=H'FFFF8000 after execution
```
EXTU EXTend as Unsigned (arithmetic operation instruction)
Format:
    EXTU.B Rm, Rn
    EXTU.W Rm, Rn Description:
The EXTU instruction extends by zero the content of the general register Rm, and places the result in the register Rn. In the case of byte designation, the instruction transfers 0 to bits 8 through 31 in the register Rn. In the case of word designation, the instruction transfers 0 to bits 16 through 31 in the register Rn.

```
Operation:
    EXTUB (long m, long n)    /* EXTU.B Rm, Rn */
    {
        R[n]=R[m];
        R[n]&=0x000000FF;
        PC+=2;
    }
    EXTUW (long m, long n)    /* EXTU.W Rm, Rn */
    {
        R[n]=R[m];
        R[n]&=0x0000FFFF;
        PC+=2;
    }
Example of use:
    EXTU.B R0, R1      ; R0=H'FFFFFF80 before execution
                       ; R1=H'00000080 after execution
    EXTU.W R0, R1      ; R0=H'FFFF8000 before execution
                       ; R1=H'00008000 after execution
JMP JuMP (branch instruction)
    Format:
        JMP @Rn
```

Description:
The JMP instruction causes a delayed branch to the designated address unconditionally. The branch destination address is given by the 32-bit data in the general register Rn.
Note:
Because the JMP instruction is a delayed branch instruction, the instruction immediately following this instruction is executed prior to the branch. Neither an address error nor an interruption is accepted between this instruction and the instruction that comes immediately thereafter. If the JMP instruction is followed immediately by a branch instruction, the latter instruction is recognized as an illegal slot instruction.

```
Operation:
    JMP (long n)    /* JMP @Rn */
    {
        unsigned long temp;
        temp=PC;
        PC=R[n]+4;
        Delay_Slot (temp+2);
    }
Example of use:
    MOV.L JMP_TABLE, R0    ; address of R0=TRGET
    JMP @R0                ; branch to TRGET
    MOV R0, R1             ; executed prior to branch
    .align 4
    JMP_TABLE: .data.1 TRGET   ; jump table
    ...
    TRGET: ADD #1, R1      ; <- branch destination
JSR Jump to SubRoutine (branch instruction)
    Format:
        JSR @Rn
```

Description:
The JSR instruction causes a delayed branch to the procedure corresponding to the designated address. When executed, the instruction saves the content of the program counter PC into the procedure register PR, and causes the content of the general register Rn to branch to the address designated by 32-bit data. The program counter PC indicates the starting address pointing to the location two instructions after this instruction. In combination with an RTS (return from subroutine) instruction, the JSR instruction is used to call a procedure.
Note:
Because the JSR instruction is a delayed branch instruction, the instruction immediately following this instruction is executed prior to the branch. Neither an address error nor an interruption is accepted between this instruction and the instruction that comes immediately thereafter. If the JSR instruction is followed immediately by a branch instruction, the latter instruction is recognized as an illegal slot instruction.

```
Operation:
    JSR (long n)    /* JSR @Rn */
    {
        PR=PC;
        PC=R[n]+4;
        Delay_Slot (PR+2);
    }
Example of use:
    MOV.L JSR_TABLE, R0    ; address of R0=TRGET
    JSR @R0                ; branch to TRGET
    XOR R1, R1             ; executed prior to branch
    ADD R0, R1             ; <- location to return to
    (content of PR) from procedure
    ...
    .align 4
    JSR_TABLE: .data.1 TRGET   ; jump table
    TRGET: NOP                 ; entry of procedure
    MOV R2, R3                 ;
    RTS                        ; return to ADD above
    MOV #70, R1                ; executed prior to RTS
LDC LoaD to Control register (system control instruction)
    Format:
        LDC Rm, Cn
        LDC.L @Rm+, Cn
```

Description:
The LDC instruction places a source operand into the control register Cn (SR, GBR, VBR).
Note:
No interruption is accepted between the LDC instruction and the instruction that comes immediately thereafter. (An address error is accepted.)

```
Operation:
    LDC (long m, long n)    /* LDC Rm, Cn */
    {
        switch (n){
            case 0: SR=R[m]&0x000003F3; PC+=2; break;
            case 1: GBR=R[m]; PC+=2; break;
            case 2: VBR=R[m]; PC+=2; break;
            default: Error ("Illegal CR number.");
        }
    break;
    }
    LDCM (long m, long n)    /* LDC.L @Rm+, Cn */
    {
        switch (n){
            case 0: SR=Read_Long (R[m])&0x000003F3;
                R[m]+=4; PC+=2; break;
            case 1: GBR=Read_Long (R[m]); R[m]+=4;
                PC+=2; break;
            case 2: VBR=Read_Long (R[m]); R[m]+=4;
                PC+=2; break;
            default: Error ("Illegal CR number.");
        break;
        }
    }
Example of use:
    LDC R0, SR         ; R0=H'FFFFFFFF, SR=H'00000000
    before execution
                       ; SR=H'000003F3 after execution
    LDC.L @R15+, GBR   ; R15=H'10000000 before execution
```

-continued

; R15=H'10000004, GBR=@H'10000000
after execution
LDS LoaD to System register (system control instruction)
Format:
    LDS Rm, Sn
    LDS.L @Rm+, Sn

Description:

The LDS instruction places a source operand into the system register Sn (MACH, MACL, PR).

Note:

No interruption is accepted between the LDS instruction and the instruction that comes immediately thereafter. (An address error is accepted.)

---

Operation:
```
LDS (long m, long n)   /* LDS Rm, Sn */
{
    switch (n){
        case 0: MACH=R[m];
            if ((MACH&0x00000200)==0)
                MACH&=0x000003FF;
            else MACH|=0xFFFFFC00;
            PC+=2; break;
        case 1: MACL=R[m]; PC+=2; break;
        case 2: PR=R[m]; PC+=2; break;
        default: Error ("Illegal SR number.");
    break;
    }
}
LDSM (long m, long n)   /* LDS.L @Rm+, Sn */
{
    switch (n){
        case 0: MACH=Read_Long (R[m]);
            if ((MACH&0x00000200)==0)
                MACH&=0x000003FF;
            else MACH|=0xFFFFFC00
            R[m]+=4; PC+=2; break;
        case 1: MACL=Read_Long (R[m]); R[m]+=4;
            PC+=2; break;
        case 2: PR=Read_Long (R[m]); R[m]+=4;
            PC+=2; break;
        default: Error ("Illegal SR number.");
    break;
    }
}
```
Example of use:
LDS R0, PR    ; R0=H'12345678, PR=H'00000000
before execution
    ; PR=H'12345678 after execution
LDS.L @R15+, MACL  ; R15=H'10000000 before execution
    ; R15=H'10000004,
MACL=@H'10000000 after execution
MAC Multiply and ACcumulate (arithmetic operation instruction)
Format:
    MAC.W @Rm+, @Rn+

Description:

The MAC instruction multiplies a signed 16-bit operand whose address is designated by the contents of the general registers Rm and Rn, adds the resulting 32 bits and the content of the MAC register, and places the result in the MAC register. When the S bit is 1, the addition of the 32 bits to the content of the MAC register amounts to a saturated operation. In the saturated operation, an overflow causes the LSB of the MACH register to 1. If the result produces a negative overflow, the minimum value H'80000000 is placed in the MACL register; if the result produces a positive overflow, the maximum value H'7FFFFFFF is placed in the MACL register. When the S bit is 0, the resulting 42 bits are placed in the coupled MACH/MACL register. The content of bit 9 is transferred to the high-order 22 bits (bits 31 through 10) of the MACH register. After the operation, the contents of the registers Rm and Rn are incremented by 2 each.

---

Operation:
```
MACW (long m, long n)   /* MAC.W @Rm+, @Rn+ */
{
    long tempm, tempn, dest, src, ans;
    unsigned long temp1;
    tempn = (long) Read_Word (R[n]);
    R[n]+=2;
    tempm = (long) Read_Word (R[n]);
    R[m]+=2;
    temp1=MACL;
    tempm = ((long)(short) temp* (long)(short)
tempm);
    if ((long) MACL>=0) dest=0; else dest=1;
    if ((long) tempm>=0) { src=0; tempn=0; }
    else { src=1; tempn=0xFFFFFFFF; }
    src+=dest;
    MACL+=tempn;
    if ((long) MACL>=0) ans=0; else ans=1;
    ans+=dest;
    if (S==1) {
        if (ans==1) {
            if (src==0 || src==2)
    MACH =0x00000001;
            if (src==0) MACL=0x7FFFFFFF;
            if (src==2) MACL=0x80000000;
        }
    } else {
        MACH+=tempn;
        if (temp1>MACL) MACH+=1;
        if ((MACH&0x00000200)==0) MACH&=0x000003FF;
        else MACH|=0xFFFFFC00;
    }
    PC+=2;
}
```

Example of use:

| | |
|---|---|
| MOVA TBLM, R0 | ; table address obtained |
| MOV R0, R1 | ; |
| MOVA TBLN, R0 | ; table address obtained |
| CLRMAC | ; MAC register initialized |
| MAC.W @R0+, @R1+ | ; |
| MAC.W @R0+, @R1+ | ; |
| STS MACL, R0 | ; result placed in R0 |
| ... | |
| .align 2 | ; |
| TBLM .data.w H'1234 | ; |
| .data.w H'5678 | ; |
| TBLN .data.w H'0123 | ; |
| .data.w H'4567 | ; |

MOV MOVe immediate data (data transfer instruction)
Format:
    MOV #imm, Rn
    MOV.W @(disp, PC), Rn
    MOV.L @(disp, PC), Rn

Description:

The MOV instruction places in the general register Rn the immediate data that is sign-extended to a long word. When the data is a word or a long word, the instruction references the data in the table at the address given by adding a displacement to the program counter PC. When the data is a word, an eight-bit displacement is used and is doubled after zero extension. This puts the relative distance to the table within the range of the program counter PC plus 510 bytes. The program counter PC indicates the starting address pointing to the location two instructions after this instruction. When the data is a long word, an eight-bit displacement is used and quadrupled after sign extension. This puts the relative distance to the operand within the range of the program counter PC plus 1,020 bytes. Whereas the program counter PC indicates the starting address pointing to the location two instructions after this instruction, the low-order 2 bits are corrected to B'00 for use in address calculations.

Note:

The table is optimally located at the end of a module or one instruction after an unconditional branch instruction. If the optimum location of the table is not available because of, say, the absence of an unconditional branch instruction within 510 bytes or 1,020 bytes, it is necessary to jump the table using the BRA instruction. When the MOV instruction is placed immediately after a delayed branch instruction, the program counter PC points to "starting address+2" of the branch destination.

Operation:
```
MOVI (long i, long n)   /* MOV #imm, Rn */
{
  if ((i&0x80)==0) R[n]=(0x000000FF & (long)i);
  else R[n]=(0xFFFFFF00 | (long)i);
  PC+=2;
}
MOVWI (long d, long n) /* MOV.W @(disp, PC), Rn */
{
  long disp;
  disp=(0x000000FF & (long)d);
  R[n]=(long) Read_Word (PC+(disp<<1));
  if ((R[n]&0x8000)==0) R[n]&=0x0000FFFF;
  else R[n]|=0xFFFF0000;
  PC+=2;
}
MOVLI (long d, long n) /* MOV.L @(disp, PC), Rn, */
{
  long disp;
  disp=(0x000000FF & (long)d);
  R[n]=Read_Long ((PC&0xFFFFFFFC)+(disp<<2));
  PC+=2;
}
```
Example of use:

| Address | | |
|---|---|---|
| 1000 | MOV #H'80, R1 | ; R1=H'FFFFFF80 |
| 1002 | MOV.W IMM, R2 | ; R2=H'FFFF9ABC (IMM means @(H'08, PC).) |
| 1004 | ADD #-1, R0 | ; |
| 1006 | TST R0, R0 | ; <— position of PC for use by MOV.W instruction for address calculation |
| 1008 | MOVT R13 | ; |
| 100A | BRA NEXT | ; delayed branch instruction |
| 100C | MOV.L @(4, PC), R3 | ; R3=H'12345678 |
| 100E | IMM .data.w H'9ABC | ; |
| 1010 | .data.w H'1234 | ; |
| 1012 | NEXT JMP @R3 | ; branch destination of BRA |
| 1014 | CMP/EQ #0, R0 | ; <— position of PC used by MOV.L instruction for address calculation |
| | .align 4 | ; |
| 1018 | .data.l H'12345678 | ; |

MOV MOVe data (data transfer instruction)
Format:
```
MOV  Rm, Rn
MOV  Rm, @Rn
MOV  @Rm, Rn
MOV  Rm, @-Rn
MOV  @Rm+, Rn
MOV  Rm, @(R0, Rn)
MOV  @(R0, Rm), Rn
```

Description:
The MOV instruction transfers a source operand to a destination. If the operand is in memory, the size of the data to be transferred may be set to a byte, a word or a long word. If the source operand is in memory, the loaded data is sign-extended to a long word and then placed into the register.

Operation:
```
MOV (long m, long n) /* MOV Rm, Rn */
{
  R[n]=R[m]
  PC+=2;
}
MOVBS (long m, long n) /* MOV.B Rm, @Rn */
{
  Write_Byte (R[n], R[m]);
  PC+=2;
}
MOVWS (long m, long n) /* MOV.W Rm, @Rn */
{
  Write_Word (R[n], R[m]);
  PC+=2;
}
MOVLS (long m, long n) /* MOV.L Rm, @Rn */
{
  Write_Long (R[n], R[m]);
  PC+=2;
}
MOVBL (long m, long n) /* MOV.B @Rm, Rn */
{
  R[n]=(long) Read_Byte (R[m]);
  if ((R[n]&0x80)==0) R[n]&=0x000000FF;
  else R[n]|=0xFFFFFF00;
  PC+=2;
}
MOVWL (long m, long n) /* MOV.W @Rm, Rn */
{
  R[n]=(long) Read_Word (R[m]);
  if ((R[n]&0x8000)==0) R[n]&=0x0000FFFF;
  else R[n]|=0xFFFF0000;
  PC+=2;
}
MOVLL (long m, long n) /* MOV.L @Rm, Rn */
{
  R[n]=Read_Long (R[m]);
  PC+=2;
}
MOVBM (long m, long n) /* MOV.B Rm, @-Rn */
{
  Write_Byte (R[n]-1, R[m]);
  R[n]-=1;
  PC+=2;
}
MOVWM (long m, long n) /* MOV.W Rm, @-Rn */
{
  Write_Word (R[n]-2, R[m]);
  R[n]-=2;
  PC+=2;
}
MOVLM (long m, long n) /* MOV.L Rm @-Rn */
{
  Write_Long (R[n]-4, R[m]);
  R[n]-=4;
  PC+=2;
}
MOVBP (long m, long n) /* MOV.B @Rm+, Rn */
{
  R[n]=(long) Read_Byte (R[m]);
  if ((R[n]&0x80)==0) R[n]&=0x000000FF;
  else R[n]|=0xFFFFFF00;
  if (n!=m) R[m]+=1;
  PC+=2;
}
MOVWP (long m, long n) /* MOV.W @Rm+, Rn */
{
  R[n]=(long) Read_Word (R[m]);
  if ((R[n]&0x8000)==0) R[n]&=0x0000FFFF;
  else R[n]|=0xFFFF0000;
  if (n!=m) R[m]+=2;
  PC+=2;
}
MOVLP (long m, long n) /* MOV.L @Rm+, Rn */
{
  R[n]=Read_Long (R[m]);
  if (n!=m) R[m]+=4;
  PC+=2;
}
MOVBS0 (long m, long n) /* MOV.B Rm, @(R0, Rn) */
{
  Write_Byte (R[n]+R[0], R[m]);
  PC+=2;
}
MOVWS0 (long m, long n) /* MOV.W Rm, @(R0, Rn) */
```

-continued

```
{
    Write_Word (R[n]+R[0], R[m]);
    PC+=2;
}
MOVLS0 (long m, long n) /* MOV.L Rm, @(R0, Rn) */
{
    Write_Long (R[n]+R[0], R[m]);
    PC+=2;
}
MOVBL0 (long m, long n) /* MOV.B @(R0, Rm), Rn */
{
    R[n]=(long) Read_Byte (R[m]+R[0]);
    if ((R[n]&0x80)==0) R[n]&=0x000000FF;
    else R[n]|=0xFFFFFF00;
    PC+=2;
}
MOVWL0 (long m, long n) /* MOV.W @(R0, Rm), Rn */
{
    R[n]=(long) Read_Word (R[m]+R[0]);
    if ((R[n]&0x8000)==0) R[n]&=0x0000FFFF;
    else R[n]|=0xFFFF0000;
    PC+=2;
}
MOVLL0 (long m, long n) /* MOV.L @(R0, Rm), Rn */
{
    R[n]=Read_Long (R[m]+R[0]);
    PC+=2;
}
```

Example of use:

| | | |
|---|---|---|
| MOV  R0, R1 before execution | | ; R0=H'FFFFFFFF, R1=H'00000000 |
| MOV.W  R0, @R1 | | ; R1=H'FFFFFFFF after execution ; R0=H'FFFF7F80 before execution ; @R1=H'7F80 after execution |
| MOV.B  @R0, R1 execution | | ; @R0=H'80, R1=H'00000000 before |
| MOV.W  R0, @-R1 before execution | | ; R1=H'FFFFFF80 after execution ; R0=H'AAAAAAAA, R1=H'FFFF7F80 |
| execution | | ; R1=H'FFFF7F7E, @R1=H'AAAA after |
| MOVL  @R0+, R1 after execution | | ; R0=H'12345670 before execution ; R0=H'12345674, R1=@H'12345670 |
| MOV.B  R1, @(R0, R2) R0=H'10000000 before execution | | ; R2=H'00000004, |
| execution | | ; R1=@H'10000004 after |
| MOV.W  @(R0, R2), R1 R0=H'10000000 before execution | | ; R2=H'00000004, |
| execution | | ; R1=@H'10000004 after |

MOV MOVe structure data (data transfer instruction)
Format:
| | |
|---|---|
| MOV.B | R0, @(disp, Rn) |
| MOV.W | R0, @(disp, Rn) |
| MOV.L | Rm, @(disp, Rn) |
| MOV.B | @(disp, Rm), R0 |
| MOV.W | @(disp, Rm), R0 |
| MOV.L | @(disp, Rm), Rn |

Description:

The MOVE instruction transfers a source operand to a destination. This instruction is best suited for gaining access to structured or stacked data. The size of data may be set to a byte, a word or a long word. Where the data size is set to a byte or to a word, the register is fixed to R0. Where the data size is set to a byte, a four-bit displacement is used and zero-extended. This provides for range designation of up to another 15 bytes. Where the data size is set to a word, a four-bit displacement is used and doubled after zero extension. This provides for range designation of up to another 30 bytes. Where the data size is set to a long word, a four-bit displacement is used and quadrupled after zero extension. This provides for range designation of up to another 60 bytes. If the memory operand cannot be reached within the above ranges, it is necessary to use the above-mentioned @(R0, Rn) mode. If the source operand is in memory, the loaded data is sign-extended to a long word and then placed into the register.

Note:

When byte data or word data is to be loaded, the destination register is fixed to R0. Thus if the instruction that comes immediately after the MOVE instruction attempts to reference the register R0, it must wait for the load operation to be completed. Here, optimum reordering of the instructions is available.

| | |
|---|---|
| MOV.B  @(2, R1), R0 | MOV.B  @(2, R1), R0 |
| AND  #80, R0 | ADD  #20, R1 |
| ADD  #20, R1 | AND  #80, R0 |

Operation

```
MOVBS4 (long d, long n) /* MOV.B R0, @(disp, Rn) */
{
    long disp;
    disp=(0x0000000F & (long)d);
    Write_Byte (R[n]+disp, R[0]);
    PC+=2;
}
MOVWS4 (long d, long n) /* MOV.W R0, @(disp, Rn) */
{
    long disp;
    disp=(0x0000000F & (long)d);
    Write_Word (R[n]+(disp<<1), R[0]);
    PC+=2;
}
MOVLS4 (long m, long d, long n) /* MOV.L Rm, @(disp, Rn) */
{
    long disp;
    disp=(0x0000000F & (long)d);
    Write_Long (R[n]+(disp<<2), R[m]);
    PC+=2;
}
MOVBL4 (long m, long d) /* MOV.B @(disp, Rm), R0 */
{
    long disp;
    disp=(0x0000000F & (long)d);
    R[0]=Read_Byte (R[m]+disp);
    if ((R[0]&0x80)==0) R[0]&=0x000000FF;
    else R[0]|=0xFFFFFF00;
    PC+=2;
}
MOVWL4 (long m, long n) /* MOV.W @(disp, Rm), R0 */
{
    long disp;
    disp=(0x0000000F & (long)d);
    R[0]=Read_Word (R[m]+(disp<<1));
    if ((R[0]&0x8000)==0) R[0]&=0x0000FFFF;
    else R[0]|=0xFFFF0000;
    PC+=2;
}
MOVLL4 (long m, long d, long n) /* MOV.L @(disp, Rm), Rn */
{
    long disp;
    disp=(0x0000000F & (long)d);
    R[n]=Read_Long (R[m]+(disp<<2));
    PC+=2;
}
```

Example of use:

| | | |
|---|---|---|
| MOV.L  @(2, R0), R1 execution | | ; @(R0+8)=H'12345670 before |
| execution | | ; R1=@H'12345670 after |
| MOV.L  R0, @(H'F, R1) execution | | ; R0=H'FFFF7F80 before |
| execution | | ; @(R1+60)=H'FFFF7F80 after |

MOV MOVe i/o data (data transfer instruction)
Format:
| | |
|---|---|
| MOV | @(disp, GBR), R0 |
| MOV | R0, @(disp, GBR) |

Description:

The MOV instruction transfers a source operand to a destination. This instruction is best suited for gaining access to data in an I/O area. The size of data may be set to a byte, a word or a long word. The register is fixed to R0. An I/O base address is set in the global base register GBR. When the size of I/O data is set to a byte, an eight-bit displacement is used and only zero-extended. This provides for range designation of up to another 255 bytes. When the size of I/O data is set to a word, an eight-bit displacement is used and doubled after zero extension. This provides for range designation of up to another 510 bytes. When the size of I/O data is set to a long word, an eight-bit displacement is used and quadrupled after zero extension. This provides for range designation of up to another 1,020 bytes. If the memory operand cannot be reached, it is necessary to use the abovementioned @(R0, Rn) mode after the content of the global base register GBR is transferred to a general register. If the source operand is in memory, the loaded data is sign-extended to a long word and then placed in the register.

Note:

For data load operation, the destination register is fixed to R0. Thus if the instruction that comes immediately after the MOVE instruction attempts to reference the register R0, it must wait for the load operation to be completed. Here, optimum reordering of the instructions is available.

```
MOV.B @(12, GBR), R0          MOV.B @(12, GBR), R0
AND #80, R0                   ADD #20, R1
ADD #20, R1                   AND #80, R0
Operation:
    MOVBLG (long d) /* MOV.B @(disp, GBR), R0 */
    {
        long disp;
        disp=(0x000000FF & (long)d);
        R[0]=(long) Read_Byte (GBR+disp);
        if ((R[0]&0x80)==0) R[0]&=0x000000FF;
        else R[0]|=0xFFFFFF00;
        PC+=2;
    }
    MOVWLG (long d) /* MOV.W @(disp, GBR), R0 */
    {
        long disp;
        disp=(0x000000FF & (long)d);
        R[0]=(long) Read_Word (GBR+(disp<<1));
        if ((R[0]&0x8000)==0) R[0]&=0x0000FFFF;
        else R[0]|=0x0000FFFF;
        PC+=2;
    }
    MOVLLG (long d) /* MOV.L @(disp, GBR), R0, */
    {
        long disp;
        disp=(0x000000FF & (long)d);
        R[0]=Read_Long (GBR+(disp<<2));
        PC+=2;
    }
    MOVBSG (long d) /* MOV.B R0, @(disp, GBR) */
    {
        long disp;
        disp=(0x000000FF & (long)d);
        Write_Byte (GBR+disp, R[0]);
        PC+=2;
    }
    MOVWSG (long d) /* MOV.W R0 @(disp, GBR) */
    {
        long disp;
        disp=(0x000000FF & (long)d);
        Write_Word (GBR+(disp<<1), R[0]);
        PC+=2;
    }
    MOVLSG (long d) /* MOV.L R0, @(disp, GBR) */
    {
        long disp;
        disp=(0x000000FF & long)d);
        Write_Long (GBR+(disp<<2), R[0]);
        PC+=2;
    }
```

Example of use:
```
    MOV.L   @(2, GBR), R0        ; @(GBR+8)=H'12345670 before execution
                                 ; R0=@H'12345670 after execution
    MOV.B   R0, @(1, GBR)        ; R0=H'FFFF7F80 before execution
                                 ; @(GBR+1)=H'FFFF7F80 after execution
```
MOVA  MOVe effective Address (data transfer instruction)
Format:
    MOVA    @(disp, PC), R0

Description:

The MOVA instruction places the effective address of a source operand into the general register R0. Because an eight-bit displacement is used and quadrupled after zero extension, the relative distance to the operand falls within a range of the program counter PC plus 1,020 bytes. Whereas the program counter PC indicates the starting address pointing to the location two instructions after this instruction, the loworder 2 bits are corrected to B'00 for use in address calculations.

Note:

When the MOVA instruction is placed immediately after a delayed branch instruction, the program counter PC points to "starting address+2" of the branch destination.

```
Operation:
    MOVA (long d)       /* MOVA @(disp, PC), R0 */
    {
        long disp;
        disp=(0x000000FF & (long)d);
        R[0]=(PC&0xFFFFFFFC)+(disp<<2);
        PC+=2;
    }
```
Example of use:
```
    Address .org H'1006
    1006    MOVA STR, R0         ; address of STR -> R0
    1008    MOV.B @R0, R1        ; R1="X" <- position after
                                   correction of low-order 2 bits in PC
    100A    ADD  R4, R5          ; <- initial position of PC
    upon address calculation by MOVA instruction
            .align 4
    100C    STR:  .sdata "XYZP12"
    ..........
    2002    BRA  TRGET           ; delayed branch instruction
    2004    MOVA @(0, PC), R0    ; address of TRGET + 2 -> R0
    2006    NOP                  ;
```
MOVT  MOVe T bit (data transfer instruction)
Format:
    MOVT    Rn
Description:
    The MOVT instruction places the T bit in the general register Rn.  When T = 1, Rn = 1; when T = 0, Rn = 0.
Operation:
```
    MOVT (long n)       /* MOVT Rn */
    {
        R[n]=(0x00000001 & SR);
        PC+= 2;
    }
```
Example of use:
```
    XOR   R2, R2         ; R2=0
    CMP/PZ R2            ; T=1
    MOVT  R0             ; R0=1
    CLRT                 ; T=0
    MOVT  R1             ; R1=0
```

MULS  MULtiply as Signed (arithmetic operation instruction)
  Format:
    MULS  Rm, Rn Description:

The MULS instruction multiples the contents of the general registers Rn and Rm in 16 bits, and places the resulting 32 bits into the MACL register. The operation may be a signed arithmetic operation. The contents of the registers Rn and MACH remain unchanged.

```
Operation:
    MULS (long m, long n)    /* MULS Rm, Rn */
    {
        MACL=((long)(short)R[n]*(long)(short)R[m]);
        PC+=2;
    }
Example of use:
    MULS   R0, R1          ; R0=H'FFFFFFFE, R1=H'00005555
before execution
                           ; MACL=H'FFFF5556 after execution
    STS    MACL, R0        ; result of operation obtained
```

MULU  MULtiply as Unsigned (arithmetic operation instruction)
  Format:
    MULU  Rm, Rn Description:

The MULU instruction multiplies the contents of the general registers Rn and Rm in 16 bits, and places the resulting 32 bits into the MACL register. The operation may be an unsigned arithmetic operation. The contents of the registers Rn and MACH remain unchanged.

```
Operation:
    MULU  (long m, long n)   /* MULU Rm, Rn */
    {
        MACL=((unsigned long)(unsigned
short)R[n]*(unsigned long)(unsigned short)R[m]);
        PC+=2;
    }
Example of use:
    MULU   R0, R1          ; R0=H'00000002, R1=H'FFFFAAAA
before execution
                           MACL=H'00015554 after execution
    STS    MACL, R0        ; result of operation obtained
```

NEG  NEGate (arithmetic operation instruction)
  Format:
    NEG  Rm, Rn

Description:

The NEG instruction-takes a 2's complement of the content of the general register Rm, and places the result into the register Rn. That is, the content of the register Rm is subtracted from 0, and the result is put in the register Rn.

```
Operation:
    NEG (long m, long n)    /* NEG Rm, Rn */
    {
        R[n]=0-R[m]
        PC+=2;
    }
Example of use:
    NEG    R0, R1          ; R0=H'00000002 before execution
                           ; R1=H'FFFFFFFF after execution
```

NEGC  NEGate with Carry (arithmetic operation instruction)
  Format:
    NEGC  Rm, Rn Description:

The NEGC instruction subtracts the content of the general register Rm and the T bit from 0, and places the result into the register Rn. A borrow is reflected in the T bit depending on the result of the operation. This instruction is used where sign inversion of a value of more than 32 bits is to be carried out.

```
Operation:
    NEGC (long m, long n)   /* NEGC Rm, Rn */
    {
        unsigned long temp;
        teinp=0-R[m];
        R[n]=temp-T;
        if (0<temp) T=1;
        else T=0;
        if (temp<R[n]) T=1;
        PC+=2;
    }
Example of use:
    CLRT                   ; R0: R1 (64 bits) inverted in sign
    NEGC   R1, R1          ; R1=H'00000001, T=0 before execution
                           ; R1=H'FFFFFFFF, T=1 after execution
    NEGC   R0, R0          ; R0=H'00000000, T=1 before execution
                           ; R0=H'FFFFFFFF, T=1 after execution
```

NOP  No OPeration (system control instruction)
  Format:
    NOP

Description:

The NOP instruction only increments the program counter PC and passes control to the next instruction for execution.

```
Operation:
    NOP( )    /* NOP */
    {
        PC+=2;
    }
Example of use:
    NOP                    ; one-cycle time allowed to elapse
```

NOT  NOT-logical complement (logic operation instruction)
  Format:
    NOT  Rm, Rn Description:

The NOT instruction takes a 1's complement of the content of the general register Rm, and places the result into the register Rn. That is, the bits of the register Rm are inverted and placed into the register Rn.

```
Operation:
    NOT (long m, long n)    /* NOT Rm, Rn */
    {
        R[n]=~R[m]
        PC+=2
    }
Example of use:
    NOT    R0, R1          ; R0=H'AAAAAAAA before execution
                           ; R1=H'55555555 after execution
```

OR  OR logical (logic operation instruction)
  Format:
    OR    Rm, Rn
    OR    #imm, R0
    OR.B  #imm, @(R0, GBR)

Description:

The OR instruction OR's the contents of the general registers Rn and Rm, and places the result into the register Rn. In a special format, the OR instruction may OR the content of the general register R0 and zero-extended eight-bit immediate data, or the instruction may OR an eight-bit memory part and eight-bit immediate data relative to the global base register GBR.

Operation:
```
OR (long m, long n)    /* OR Rm, Rn */
{
    R[n]|=R[m];
    PC+=2;
}
ORI (long i)   /* OR #imm, R0 */
{
    R[0]|=(0x000000FF & (long)i);
    PC+=2;
}
ORM (long i)   /* OR.B #imm, @(R0, GBR) */
{
    long temp;
    temp=(long) Read_Byte (GBR+R[0]);
    temp|=(0x000000FF & (long)i);
    Write_Byte (GBR+R[0], temp);
    PC+=2;
}
```
Example of use:
```
OR    R0, R1    ; R0=H'AAAA5555, R1=H'55550000 before execution
                ; R1=H'FFFF5555 after execution
OR    #H'F0, R0 ; R0=H'00000008 before execution
                ; R0=H'000000F8 after execution
OR.B  #H'50, @(R0, GBR) ; @(R0, GBR)=H'A5 before execution
                        ; @(R0, GBR)=H'F5 after execution
```
ROTL/ROTR    ROTate Left/Right (shift instruction)
Format:
   ROTL   Rn
   ROTR   Rn

Description:

The ROTL/ROTR instruction rotates the content of the general register Rn left/right one bit, and places the result into the register Rn. The bit rotated out of the operand is transferred to the T bit.

```
           MSB              LSB
ROTL   T<─┬──[            ]<─┐
          └──────────────────┘

MSB              LSB
ROTR   ┌──>[            ]──┬──>T
       └──────────────────┘
```

Operation:
```
ROTL (long n)    /* ROTL Rn */
{
    if ((R[n]&0x80000000)==0) T=0; else T=1;
    R[n]<<=1;
    if (T==1) R[n]|=0x00000001; else
R[n]&=0xFFFFFFFE;
    PC+=2;
}
ROTR (long n)    /* ROTR Rn */
{
    if ((R[n]&0x00000001)==0) T=0; else T=1;
    R[n]>>=1;
    if (T==1) R[n]|=0x80000000; else
R[n]&=0x7FFFFFFF;
    PC+=2;
}
```
Example of use:
```
ROTL  R0  ; R0=H'80000000, T=0 before execution
          ; R0=H'00000001, T=1 after execution
ROTR  R0  ; R0=H'00000001, T=0 before execution
          ; R0=H'80000000, T=1 after execution
```
ROTCL/ROTCR    ROTate with Carry Left/Right (shift instruction)
Format:
   ROTCL   Rn
   ROTCR   Rn

Description:

The ROTCL/ROTCR instruction rotates the content of the general register Rn including the T bit left/right one bit, and places the result in the register Rn. The bit rotated out of the operand is transferred to the T bit.

```
           MSB              LSB
ROTCL  T<─┬──[            ]<─┐
          └──────────────────┘

MSB              LSB
ROTCR  ┌──>[            ]──┬──>T
       └──────────────────┘
```

Operation:
```
ROTCL (long n)   /* ROTCL Rn */
{
    long temp;
    if ((R[n]&0x80000000)==0) temp=0; else temp=1;
    R[n]<<=1;
    if (T==1) R[n]|=0x00000001; else
R[n]&=0xFFFFFFFE;
    if (temp==1) T=1; else T=0;
    PC+=2;
}
ROTCR (long n)   /* ROTCR Rn */
{
    long temp;
    if ((R[n]&0x00000001)==0) temp=0; else temp=1;
    R[n]>>=1;
    if (T==1) R[n]|=0x80000000; else
R[n]&=0x7FFFFFFF;
    if (temp==1) T=1; else T=0;
    PC+=2;
}
```
Example of use:
```
ROTCL  R0 ; R0=H'80000000, T=0 before execution
          ; R0=H'00000000, T=1 after execution
ROTCR  R0 ; R0=H'00000001, T=1 before execution
          ; R0=H'80000000, T=1 after execution
```
RTE    ReTurn from Exception (system control instruction)
Format:
   RTE

Description:

The RTE instruction effects a return from an interrupt routine. That is, the contents of the program counter PC and status register SR are restored from stacks, and processing is resumed from the address indicated by the restored content of the program counter PC.

Note:

Because the RTE instruction is a delayed branch instruction, the instruction immediately thereafter is executed prior to the branch. Neither an address error nor an interruption is accepted between this instruction and the instruction that comes immediately thereafter. If the RTE instruction is followed immediately by a branch instruction, the latter instruction is recognized as an illegal slot instruction.

```
Operation:
    RTE( )    /* RTE */
    {
        unsigned long temp;
        temp=PC;
        PC=Read_Long (R[15])+4;
        R[15]+=4;
        SR=Read_Long (R[15]&0x000003F3;
        R[15]+=4;
        Delay_Slot (temp+2)
    }
Example of use:
    RTE                     ; return to initial routine
    ADD    #8, R15          ; executed prior to branch
RTS    ReTurn from SubRoutine (branch instruction)
Format:
    RTS
```

Description:
The RTS instruction effects a return from a procedure. That is, the content of the program counter PC is restored from the procedure register PR, and processing is resumed from the address indicated by the restored content of the program counter PC. This instruction permits a return to the source of the call from the procedure called by the BSR or JSR instruction.

Note:
Because the RTS instruction is a delayed branch instruction, the instruction immediately thereafter is executed prior to the branch. Neither an address error nor an interruption is accepted between this instruction and the instruction that comes immediately thereafter. If the RTS instruction is followed immediately by a branch instruction, the latter instruction is recognized as an illegal slot instruction.

```
Operation:
    RTS( )    /* RTS */
    {
        unsigned long temp;
        temp=PC;
        PC=PR+4;
        Delay_Slot (temp+2);
    }
Example of use:
    MOV.L TABLE, R3         ; address of R3=TRGET
    JSR  @R3                ; branch to TRGET
    NOP                     ; executed prior to JSR
    ADD R0, R1              ; <- destination to return to
from procedure (content of PR)
    .........
    TABLE: .data.l TRGET    ; jump table
    .........
    TRGET: MOV R1, R0       ; <- entry of procedure
    RTS                     ; content of PR -> PC
    MOV #12, R0             ; executed prior to branch
SETT                        SET T bit (system control instruction)
Format:
    SETT
Description:
    The SETT instruction sets the T bit.
Operation:
    SETT( )   /* SETT */
    {
        T=1;
        PC+=2;
    }
Example of use:
    SETT                    ; T=0 before execution
                            ; T=1 after execution
SHAL/SHAR    SHift Arithmetic Left/Right (shift instruc-
``` tion)
Format:
    SHAL Rn
    SHAR Rn

Description:
The SHAL/SHAR instruction shifts the content of the general register Rn left/right one bit arithmetically, and places the result into the register Rn. The bit shifted out of the operand is transferred to the T bit.

```
               MSB                LSB
SHAL    T <-  [              ]  <- 0

MSB                LSB
SHAR          [              ]  -> T
```

```
Operation:
    SHAL (long n)   /* SHAL Rn (same as SHLL) */
    {
        if ((R[n]&0x80000000)==0) T=0; else T=1;
        R[n]<<=1;
        PC+=2;
    }
    SHAR (long n)   /* SHAR Rn */
    {
        long temp;
        if ((R[n]&0x00000001)==0) T=0; else T=1;
        if ((R[n]&0x80000000)==0) temp=0; else temp=1;
        R[n]>>=1;
        if (temp==1) R[n]|=0x80000000; else
        R[n]&=0x7FFFFFFF;
        PC+=2;
    }
Example of use:
    SHAL    R0     ; R0=H'80000001, T=0 before execution
                   ; R0=H'00000002, T=1 after execution
    SHAR    R0     ; R0=H'80000001, T=1 before execution
                   ; R0=H'C0000000, T=1 after execution
SHLL/SHLR    SHift Logical Left/Right (shift instruction)
Format:
    SHLL Rn
    SHLR Rn
```

Description:
SHLL/SHLR instruction shifts the content of the general register Rn left/right one bit logically, and places the result into the register Rn. The bit shifted out of the operand is transferred to the T bit.

```
               MSB                LSB
SHLL    T <-  [              ]  <- 0

MSB                LSB
SHLR    0 ->  [              ]  -> T
```

```
Operation:
    SHLL (long n)   /* SHLL Rn (same as SHAL) */
    {
        if ((R[n]&0x80000000)==0) T=0; else T=1;
        R[n]<<=1;
        PC+=2;
    }
```

```
SHLR (long n)   /* SHLR Rn */
{
    if ((R[n]&0x00000001)==0) T=0; else T=1;
    R[n]>>=1;
    R[n]&=0x7FFFFFFF;
    PC+=2;
}
Example of use:
    SHLL   R0    ; R0=H'80000001, T=0 before execution
                 ; R0=H'00000002, T=1 after execution
    SHLR   R0    ; R0=H'80000001, T=0 before execution
                 ; R0=H'40000000, T=1 after execution
SHLLn/SHLRn    n bits SHift Logical Left/Right (shift
instruction)
    Format:
        SHLL2   Rn
        SHLR2   Rn
        SHLL8   Rn
        SHLR8   Rn
        SHLL16  Rn
        SHLR16  Rn
```

Description:

The SHLLn/SHLRn instruction shifts the content of the general register Rn left/right 2, 8 or 16 bits logically, and places the result into the register Rn. The bits moved out of the operand are discarded.

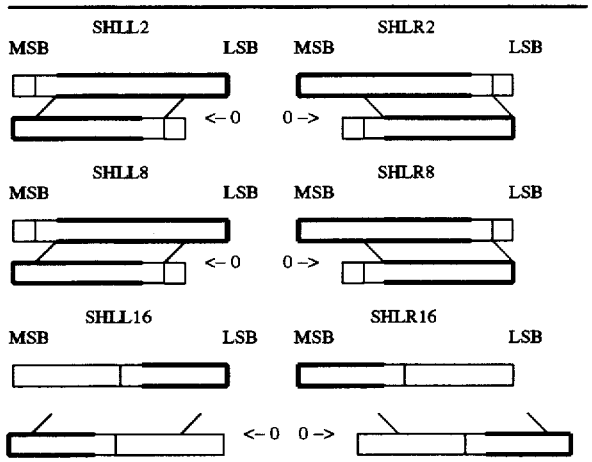

```
Operation:
    SHLL2 (long n)   /* SHLL2 Rn */
    {
        R[n]<<=2;
        PC+=2;
    }
    SHLR2 (long n)   /* SHLR2 Rn */
    {
        R[n]>>=2;
        R[n]&=0x3FFFFFFF;
        PC+=2;
    }
    SHLL8 (long n)   /* SHLL8 Rn */
    {
        R[n]<<=8;
        PC+=2;
    }
    SHLR8 (long n)   /* SHLR8 Rn */
    {
        R[n]>>=8;
        R[n]&=0x00FFFFFF;
        PC+=2;
    }
    SHLL16 (long n)   /* SHLL16 Rn */
    {
        R[n]<<=16;
        PC+=2;
    }
    SHLR16 (long n)   /* SHLR16 Rn */
    {
        R[n]>>=16;
        R[n]&=0x0000FFFF;
        PC+=2;
    }
Example of use:
    SHLL2   R0    ; R0=H'12345678 before execution
                  ; R0=H'48D159E0 after execution
    SHLR2   R0    ; R0=H'12345678 before execution
                  ; R0=H'048D159E after execution
    SHLL8   R0    ; R0=H'12345678 before execution
                  ; R0=H'34567800 after execution
    SHLR8   R0    ; R0=H'12345678 before execution
                  ; R0=H'00123456 after execution
    SHLL16  R0    ; R0=H'12345678 before execution
                  ; R0=H'56780000 after execution
    SHLR16  R0    ; R0=H'12345678 before execution
                  ; R0=H'00001234 after execution
SLEEP        SLEEP (system control instruction)
    Format:
        SLEEP
```

Description:

The SLEEP instruction places the CPU in low power consumption mode, i.e., sleep mode. In sleep mode, the internal status of the CPU is maintained, the instruction that comes immediately after the SLEEP instruction is stopped from getting executed, and an interrupt request is awaited. When an interrupt request occurs, sleep mode is left and exception processing is performed. That is, the contents of the status register SR and program counter PC are saved into stacks, and the processing branches to an interrupt routine in accordance with a predetermined vector. The program counter PC contains the starting address of the instruction that comes immediately after the SLEEP instruction.

```
Operation:
    SLEEP( )   /* SLEEP */
    {
        PC-=2;
        Error ("Sleep Mode.");
    }
Example of use:
    SLEEP                ; transition to low power consumption
mode (sleep mode)
STC                STore Control register (system
control instruction)
    Format:
        STC Cm, Rn
        STC.L Cm, @-Rn
```

Description:

The STC instruction sets the content of the control register Cm (SR, GBR, VBR) to a destination.

Note:

No interruption is accepted between the STC instruction and the instruction that comes immediately thereafter. (An address error is accepted.)

```
Operation:
    STC (long m, long n)       /* STC Cm, Rn */
    {
        switch (m) {
            case 0: R[n]=SR; PC+=2; break;
            case 1: R[n]=GBR; PC+=2; break;
            case 2: R[n]=VBR; PC+=2; break;
            default: Error ("Illegal CR number.");
```

-continued

```
break;
        }
    }
    STCM (long m, long n)       /* STC.L Cm, @-Rn */
    {
        switch (m) {
            case 0: R[n]-=4; Write_Long
(R[n], SR); PC+=2; break;
            case 1: R[n]-=4; Write_Long
(R[n], GBR); PC+=2; break;
            case 2: R[n]-=4; Write_Long
(R[n], VBR); PC+=2; break;
            default: Error ("Illegal CR
number."); break;
        }
    }
Example of use:
    STC SR, R0                  ; R0=H'FFFFFFFF,
SR=H'00000000 before execution;
                                ; R0=H'00000000
after execution
    STC.L GBR, @-R15            ; R15=H'10000004
before execution
                                ; R15=H'10000000,
@R15=GBR after execution
STS                 STore System register (system
control instruction)
    Format:
        STS Sm, Rn
        STS.L Sm, @-Rn
```

Description:

The STS instruction sets the content of the system register Sm (MACH, MACL, PR) to a destination.

Note:

No interruption is accepted between the STS instruction and the instruction that comes immediately thereafter. (An address error is accepted.)

```
Operation:
    STS (long m, long n)        /* STS Sm, Rn */
    {
        switch (m) {
            case 0: R[n]=MACH;
                if ((R[n]&0x00000200)==0
R[n]&=0x000003FF;
                    else R[n]|=0xFFFFFC00;
                PC+=2; break;
            case 1: R[n]=MACL; PC+=2; break;
            case 2: R[n]=PR; PC+=2; break;
            default: Error ("Illegal SR number.");
break;
        }
    }
    STSM (long m, long n)       /* STS.L Sm,
@-Rn */
    {
        switch (m) {
            case 0: R[n]-=4;
                if ((MACH&0x00000200)==0)
Write_Long
(R[n], MACH&0x000003FF);
                    else Write_Long (R[n],
MACH|0xFFFFFC00);
                PC+=2; break;
            case 1: R[n]-=4; Write_Long
(R[n], MACL); PC+=2; break;
            case 2: R[n]-=4; Write_Long
(R[n], PR); PC+=2; break;
            default: Error ("Illegal SR number.");
break;
        }
    }
Example of use:
    STS MACH, R0                ; R0=H'FFFFFFFF,
MACH=H'00000000 before execution
```

```
                                ; R0=H'00000000
after execution
    STS.L PR, @-R15             ; R15=H'10000004
before execution
                                ; R15=H'10000000,
@R15=PR after execution
SUB                 SUBtract binary (arithmetic operation
instruction)
    Format:
        SUB Rm, Rn
```

Description:

The SUB instruction subtracts the content of the general register Rm from that of the general register Rn, and places the result into the register Rn. A subtraction involving immediate data may be replaced by the instruction "ADD #imm, Rn."

```
Operation:
    SUB (long m, long n)        /* SUB Rm, Rn */
    {
        R[n]-=R[m];
        PC+=2;
    }
Example of use:
    SUB R0, R1                  ; R0=H'00000001, R1=H'80000000
before execution
                                ; R1=H'7FFFFFFF after execution
SUBC                SUBtract with Carry (arithmetic operation
instruction)
    Format:
        SUBC Rm, Rn
```

Description:

The SUBC instruction subtracts the content of the general register Rm and the T bit from the content of the general register Rn, and places the result into the register Rn. A borrow is reflected in the T bit depending on the result of the operation. This instruction is used where a subtraction involving more than 32 bits is to be carried out.

```
Operation:
    SUBC (long m, long n)       /* SUBC Rm, Rn */
    {
        unsigned long tmp0, tmp1;
        tmp1=R[n]-R[m]
        tmp0=R[n]; R[n]=tmp1-T;
        if (tmp0<tmp1) T=1; else T=0;
        if (tmp1<R[n]) T=1;
        PC+=2;
    }
Example of use:
    CLRT                        ; R0: R1 (64 bits) − R2: R3 (64 bits)
= R0: R1 (64 bits)
    SUBC R3, R1                 ; T=0; R1=H'00000000,
R3=H'00000001 before execution
                                ; T=1, R1=H'FFFFFFFF after execution
    SUBC R2, R0                 ; T=1, R0=H'000000001,
R2=H'00000000 before execution
                                ; T=1; R0=H'FFFFFFFF after execution
SUBV                SUBtract with (V flag) underflow
check (arithmetic operation instruction)
    Format:
        SUBV Rm, Rn
```

Description:

The SUBV instruction subtracts the content of the general register Rm from that of the general register Rn, and places the result into the register Rn. If an underflow occurs, the T bit is set.

```
Operation:
    SUBV (long m, long n)        /* SUBV Rm, Rn */
    {
        longest, src, ans;
        if ((long)R[n]>=0) dest=0; else dest=1;
        if ((long)R[m]>=0) src=0; else src=1;
        src+=dest;
        R[n]-=R[m];
        if ((long)R[n]>=0) ans=0; else ans=1;
        ans+=dest;
        if (src==1) { if (ans==1) T=1; else T=0; }
            else T=0;
        PC+=2;
    }
Example of use:
    SUBV R0, R1      ; R0=H'00000002,
R1=H'80000001 before execution
                     ; R1=H'7FFFFFFF,
T=1 after execution
    SUBV R2, R3      ; R2=H'FFFFFFFE,
R3=H'7FFFFFFE before execution
                     ; R3=H'80000000,
T=1 after execution
```

SWAP            SWAP register halves (data transfer instruction)

Format:
    SWAP.B Rm, Rn
    SWAP.W Rm, Rn

Description:

The SWAP instruction swaps the high-order and low-order bits in the content of the general register Rm, and places the result into the register Rn. In the case of byte designation, bits 0 through 7 in the register Rm are swapped for bits 8 through 15 therein. The high-order 16 bits of the register Rm are transferred unchanged to the high-order 16 bits of the register Rn. In the case of word designation, bits 0 through 15 in the register Rm are swapped for bits 16 through 31 therein.

```
Operation:
    SWAPB (long m, long n)        /* SWAP.B Rm, Rn */
    {
        unsigned long temp0, temp1;
        temp0=R[m]&0xffff0000;
        temp1=(R[m]&0x000000ff)<<8;
        R[n]=(R[m]&0x0000ff00)>>8;
        R[n]=R[n]|temp1|temp0;
        PC+=2;
    }
    SWAPW (long m, long n)        /* SWAP.W Rm, Rn */
    {
        unsigned long temp;
        temp=(R[m]>>16)&0x0000FFFF;
        R[n]=R[m]<<16;
        R[n]|=temp;
        PC+=2;
    }
Example of use:
    SWAP.B R0, R1    ; R0=H'12345678 before execution
                     ; R1=H'12347856 after execution
    SWAP.W R0, R1    ; R0=H'12345678 before execution
                     ; R1=H'56781234 after execution
```

TAS             Test And Set (logical operation instruction)
Format:
    TAS.B @Rn Description:

The TAS instruction regards the content of the general register Rn as the address, reads the byte data pointed to by that address, and sets the T bit to 1 or 0 if the data is zero or not zero, respectively. Thereafter, the instruction sets bit 7 to 1 and writes the result to the same address. The bus right is not relinquished throughout the operation.

```
Operation:
    TAS (long n)                  /* TAS.B @Rn */
    {
        long temp;
        temp=(long) Read_Byte (R[n]);      /* Bus lock enable */
        if (temp==0) T=1; else T=0;
        temp|=0x00000080;
        Write_Byte (R[n], temp);            /* Bus lock disable */
        PC+=2;
    }
Example of use:
    _LOOP TAS.B @R7    ; R7=1000
    BF _LOOP           ; loop continued until address 1000 reaches zero
```

TST             TeST logical (logical operation instruction)
Format:
    TST Rm, Rn
    TST #imm, R0
    TST.B #imm, @(R0, GBR)

Description:

The TST instruction AND's the contents of the general registers Rn and Rm, sets the T bit if the result is zero, and clears the T bit if the result is not zero. The content of the register Rn remains unchanged. In a special format, the TST instruction is capable of AND'ing the content of the general register R0 and zero-extended eight-bit immediate data, or of AND'ing an eight-bit memory part and eight-bit immediate data. The content of the register R0 or of the memory is left unchanged.

```
Operation:
    TST (long m, long n)          /* TST Rm, Rn */
    {
        if ((R[n]&R[m])==0) T=1; else T=0;
        PC+=2;
    }
    TSTI (long i)                 /* TST "imm, R0 */
    {
        long temp;
        temp=R[n]&(0x000000FF & (long)i);
        if (temp==0) T=1; else T=0;
        PC+=2;
    }
    TSTM (long i)                 /* TST.B "imm, @(R0, GBR) */
    {
        long temp;
        temp=(long) Read_Byte (GBR+R[0]);
        temp&=(0x000000FF & (long)i);
        if (temp==0) T=1; else T=0;
        PC+=2;
    }
Example of use:
    TST R0, R0           ; R0=H'00000000 before execution
                         ; T=1 after execution
    TST #H'80, R0        ; R0=H'FFFFFF7F before execution
                         ; T=1 after execution
    TST.B #H'A5, @(R0, GBR) ; @(R0, GBR)=H'A5 before execution
                         ; T=0 after execution
```

TRAPA           TRAP Always (system control instruction)
Format:
    TRAPA #imm

Description:

The TRAPA instruction initiates trap exception processing, i.e., saves the contents of the program counter PC and status register SR into stacks and branches to the address pointed to by the content of a designated vector. The vector is a memory address obtained by quadrupling eight-bit immediate data following zero extension. The program counter PC indicates the starting address of the next instruction. In combination with the RTE instruction, the TRAPA instruction is used to perform a system call.

```
Operation:
        TRAPA (long i)    /* TRAPA "imm */
        {
                long imm;
                imm=(0x000000FF & i);
                R[15]-=4;
                Write_Long (R[15], SR);
                R[15]-=4;
                Write_Long (R[15], PC-2);
                PC=Read_Long (VBR+(imm<<2))+4;
        }
Example of use:
        Address
        VBR+H'80 .data.1 10000000       ;
        ..........
                        TRAPA #H'20     ; branch to address
VBR+H'80
                        TST #0, R0      ; <- destination to return
to from trap routine (stacked content of PC)
        ..........
        10000000 XOR R0, R0             ; entry of trap routine
        10000002 RTE                    ; return to the TST above
        10000004 NOP                    ; executed prior to RTE
XOR                     exclusive OR logical (logical
operation instruction)
        Format:
                XOR Rm, Rn
                XOR #imm, R0
                XOR.B #imm, @(R0, GBR)
```

Description:

The XOR instruction exclusive-OR's the contents of the general registers Rn and Rm, and places the result into the register Rn. In a special format, the XOR instruction is capable of exclusive-OR'ing the content of the general register R0 and zero-extended eight-bit immediate data, or of exclusive-OR'ing an eight-bit memory part and eight-bit immediate data relative to the global base register GBR.

```
Operation:
        XOR (long m, long n)    /* XOR Rm, Rn */
        {
                R[n]*=R[m];
        PC+=2;
        }
        XORI (long i)           /* XOR "imm, R0 */
        {
                R[0]*=(0x000000FF & (long)i);
                PC+=2;
        }
        XORM (long i)           /* XOR.B "imm, @(R0,
GBR) */
        {
                long temp;
                temp=(long) Read_Byte (GBR+R[0]);
                temp*=(0x000000FF & (long)i);
                Write_Byte (GBR+R[0], temp);
                PC+=2;
        }
Example of use:
        XOR R0, R1      ; R0=H'AAAAAAAA,
R1=H'55555555 before execution
                        ; R1=H'FFFFFFFF after execution
        XOR #H'F0, R0   ; R0=H'FFFFFFFF before execution
                        ; R0=H'FFFFFF0F after execution
        XOR.B #H'A5, @(R0, GBR) ; @(R0, GBR)=H'A5
before execution
                        ; @(R0, GBR)=H'00
after execution
```

XTRCT    eXTRaCT (data transfer instruction)
    Format:
        XTRCT Rm, Rn

Description:
The XTRCT instruction takes the middle 32 bits out of the 64 bits constituted by the coupled general registers Rm and Rn, and places the extracted bits into the register Rn.

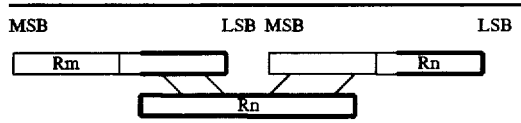

```
Operation:
        XTRCT (long m, long n)   /* XTRCT Rm, Rn */
        {
                unsigned long temp;
                temp=(R[m]<<16)&0xFFFF0000;
                R[n]=(R[n]>>16)&0x0000FFFF;
                R[n]|=temp;
                PC+=2;
        }
Example of use:
        XTRCT R0, R1    ; R0=H'01234567, R1=H'89ABCDEF
before execution
                        ; R1=H'456789AB after execution
```

Although the description above contains many specificities, these should not be construed as limiting the scope of the invention but as merely providing illustrations of the presently preferred embodiments of this invention. For example, the duty factor of the CAS* signal may be less than 40% instead of 35%.

The major benefits of the present invention may be summarized as follows:

(1) The microcomputer incorporates interfaces accommodating the dynamic RAM, static RAM, other memories and peripheral circuits. This feature allows the microcomputer to be utilized flexibly in building a desired system.

(2) Self-refresh mode may be designated selectively in place of CBR refresh mode. When selected, self-refresh mode supports dynamic RAM refresh operations that are optimally suitable for the low power consumption mode of the system such as battery backup mode.

(3) The duty factor of the column address strobe signal is set for less than 40% (e.g., 35%). This makes it possible to access the dynamic RAM, which supports highspeed page mode with an access time of 45 ns, in units of clock cycles at an operating frequency of 16 MHz.

(4) Incorporating the function for performing parity check on the dynamic RAM, the microcomputer readily addresses systems requiring high levels of reliability such as hard disk drives.

(5) The linear address space is divided into a plurality of areas that are assigned chip select signals. The chip select signal corresponding to a necessary area is output through multiplexing with the strobe signal for the dynamic RAM. There is provided an address signal output terminal arrangement which outputs a non-multiplexed or multiplexed address signal as needed. There is also provided a data I/O terminal arrangement capable of outputting the address signal selectively. These arrangements combine to minimize the otherwise growing number of external terminals while allowing the advanced features of the microcomputer to be implemented.

(7) A predetermined bit in the access-oriented address signal is used to select the unit number of bits in which to access the areas (e.g., access to be made in units of 8 bits or 16 bits). The switching between, say, 8 bits and 16 bits as the unit number of bits for access allows any number of 8-bit or 16-bit memory parts to coexist in a given area.

What is claimed is:

1. A microcomputer system comprising:

an address non-multiplexed type memory having address input terminals, data terminals and a chip select signal input terminal;

a device having address and data multiplexed terminals and a chip select signal input terminal; and a single-chip microcomputer having address output terminals coupled to the address input terminals of the address non-multiplexed type memory, external terminals coupled to the data terminals of the address non-multiplexed type memory and coupled to the address and data multiplexed terminals of the device, a first chip select signal output terminal coupled to the chip select signal input terminal of the address non-multiplexed type memory, and a second chip select output terminal coupled to the chip select input terminal of the device, wherein the single-chip microcomputer further comprises:

a central processing unit;

an internal bus coupled to the central processing unit, and including an address bus and a data bus;

a first address output circuit, coupled to the address bus, selectively providing an address signal on the internal bus to the address output terminals in response to an access to the address non-multiplexed type memory, wherein the first address output circuit selectively providing multiplexed address signals as row and column address signals, which are multiplexed and which are for an address multiplexed type memory, to ones of the address terminals in response to a control signal indicating an access to the address multiplexed type memory;

an interface circuit including a data input circuit having inputs coupled to the external terminals and outputs coupled to the data bus, and including a first data aligner for performing data alignment when reading data into the single-chip microcomputer having a bit length smaller than a bit length of the data bus;

a multiplexer having outputs coupled to the external terminals and first and second inputs;

a second address output circuit coupled between the address bus and the first inputs of the multiplexer; and a data output circuit coupled between the data bus and the second inputs of the multiplexer, and including a second data aligner for performing data alignment when outputting data having a bit length smaller than a bit length of the data bus out from the single-chip microcomputer;

wherein the first and second data aligners in the interface circuit enable the single-chip microcomputer to communicate between a device having a different data bit length than the bit length of the data bus of the single-chip microcomputer;

a strobe signal generation circuit selectively providing a first chip select signal to the first chip select signal output terminal in response to the access to the address non-multiplexed type memory and selectively providing a second chip select signal to the second chip select signal output terminal in response to the access to the device; and, a controller coupled to the internal bus and selectively controlling the multiplexer in the interface circuit and the strobe signal generation circuit in response to the access to the device so that the multiplexer outputs an address of the device and data for the device in sequence, the controller further including a control bit having a predetermined state indicating that the first address output circuit does not provide the multiplexed address signal to the address output terminals.

* * * * *

UNITED STATES PATENT AND TRADEMARK OFFICE
CERTIFICATE OF CORRECTION

PATENT NO.    : 5,748,977
DATED         : May 5, 1998
INVENTOR(S)   : Shumpei Kawasaki, et al.

Page 1 of 1

It is certified that error appears in the above-identified patent and that said Letters Patent is hereby corrected as shown below:

Title page,
Item [63]: Continuing data should read:

Continuation of Ser. No. 517,151, Aug. 21, 1995, Pat. No. 5,530,965 which is a Continuation of Ser. No. 143,465, Oct. 26, 1993, now abandoned.

Signed and Sealed this

Second Day of October, 2001

Attest:

*Nicholas P. Godici*

NICHOLAS P. GODICI
*Attesting Officer*   *Acting Director of the United States Patent and Trademark Office*